US010191867B1

(12) United States Patent
Stark

(10) Patent No.: US 10,191,867 B1
(45) Date of Patent: Jan. 29, 2019

(54) MULTIPROCESSOR SYSTEM HAVING POSTED TRANSACTION BUS INTERFACE THAT GENERATES POSTED TRANSACTION BUS COMMANDS

(71) Applicant: Netronome Systems, Inc., Santa Clara, CA (US)

(72) Inventor: Gavin J. Stark, Cambridge (GB)

(73) Assignee: Netronome Systems, Inc., Santa Clara, CA (US)

( * ) Notice: Subject to any disclaimer, the term of this patent is extended or adjusted under 35 U.S.C. 154(b) by 296 days.

(21) Appl. No.: 15/256,583

(22) Filed: Sep. 4, 2016

(51) Int. Cl.
| | |
|---|---|
| *G06F 13/14* | (2006.01) |
| *G06F 13/16* | (2006.01) |
| *G06F 9/4401* | (2018.01) |
| *G06F 9/44* | (2018.01) |

(52) U.S. Cl.
CPC ........ *G06F 13/1673* (2013.01); *G06F 9/4418* (2013.01)

(58) Field of Classification Search
CPC ............................. G06F 13/1673; G06F 9/4418
USPC ........................................................ 710/310
See application file for complete search history.

(56) References Cited

U.S. PATENT DOCUMENTS

| | | | | |
|---|---|---|---|---|
| 6,243,781 | B1* | 6/2001 | Gandhi | G06F 13/4036 |
| | | | | 710/313 |
| 6,405,276 | B1* | 6/2002 | Chen | G06F 13/4031 |
| | | | | 710/109 |
| 6,433,785 | B1* | 8/2002 | Garcia | G06F 3/14 |
| | | | | 345/531 |
| 6,668,317 | B1 | 12/2003 | Bernstein et al. | 712/245 |
| 8,775,686 | B2 | 7/2014 | Stark | 710/5 |
| 8,930,872 | B2 | 1/2015 | Stark | 716/130 |
| 8,972,630 | B1 | 3/2015 | Stark | G06F 9/467 |
| 9,069,602 | B2 | 6/2015 | Stark | G06F 9/467 |
| 9,237,095 | B2 | 1/2016 | Stark et al. | H04L 45/50 |
| 9,405,713 | B2* | 8/2016 | Stark | G06F 13/385 |
| 2005/0278511 | A1* | 12/2005 | Myers | G06F 9/466 |
| | | | | 712/225 |
| 2008/0183979 | A1* | 7/2008 | Larson | G06F 9/526 |
| | | | | 711/154 |

(Continued)

OTHER PUBLICATIONS

Intel IXP2800 Network Processor Hardware Reference Manual, pp. 1-430 (Aug. 2004).

*Primary Examiner* — Christopher B Shin
(74) *Attorney, Agent, or Firm* — Imperium Patent Works LLP; T. Lester Wallace; Mark D. Marrello

(57) ABSTRACT

A multiprocessor system includes several processors, a Shared Local Memory (SLMEM), and an interface circuit for interfacing the system to an external posted transaction bus. Each processor has the same address map. Each fetches instructions from SLMEM, and accesses data from/to SLMEM. A processor can initiate a read transaction on the posted transaction bus by doing an AHB-S bus write to a particular address. The AHB-S write determines the type of transaction initiated and also specifies an address in a shared memory in the interface circuit. The interface circuit uses information from the AHB-S write to generate a command of the correct format. The interface circuit outputs the command onto the posted transaction bus, and then receives read data back from the posted transaction bus, and then puts the read data into the shared memory at the address specified by the processor in the original AHB-S bus write.

20 Claims, 32 Drawing Sheets

MULTIPROCESSOR SYSTEM

(56) References Cited

U.S. PATENT DOCUMENTS

| | | | |
|---|---|---|---|
| 2009/0172225 A1* | 7/2009 | Wiedenman | G06F 13/4022 710/107 |
| 2012/0011283 A1* | 1/2012 | Freking | G06F 13/36 710/5 |
| 2013/0124764 A1* | 5/2013 | Fenzl | G06F 13/24 710/110 |
| 2013/0219103 A1 | 8/2013 | Stark | 710/317 |
| 2014/0173148 A1* | 6/2014 | Ma | G06F 13/4027 710/113 |
| 2014/0189187 A1* | 7/2014 | Acharya | G06F 13/385 710/310 |
| 2016/0085477 A1 | 3/2016 | Mirza et al. | G06F 3/0647 |
| 2017/0289063 A1* | 10/2017 | Adler | H04L 49/101 |
| 2018/0181432 A1* | 6/2018 | Adler | G06F 9/467 |

\* cited by examiner

NETWORK FLOW PROCESSOR
INTEGRATED CIRCUIT

MICROENGINE (ME) ISLAND

MULTIPROCESSOR SYSTEM

SHARED ADDRESS MAP
(SAME ADDRESS MAP FOR CPU#1 AND CPU#2)

THE "READ REQUEST STATE MACHINE" IN THE FSM
BLOCK OF THE SYSTEM INTERFACE BLOCK

THE "WRITE REQUEST STATE MACHINE" IN THE
FSM BLOCK OF THE SYSTEM INTERFACE BLOCK

CPP INTERFACE BLOCK

REQUEST STATE MACHINE

FETCH STATE MACHINE

ONE 151-BIT WORD AS STORED IN SRAM IN THE SLMEM

```
include "afpc_lmem.h"
module afpc_lmem_ecc_generate(input t_data_16_8 input_data, output bit[16] parities,
output bit[5] syndrome )
{  comb bit[8][16] data;  comb bit[21]    Sgtr;
    ecc_calculate "Calculate ECC": {
        data[0] = input_data.data_0;      data[1] = input_data.data_1;
        data[2] = input_data.data_2;      data[3] = input_data.data_3;
        data[4] = input_data.data_4;      data[5] = input_data.data_5;
        data[6] = input_data.data_6;      data[7] = input_data.data_7;
        data[8] = input_data.data_8;      data[9] = input_data.data_9;
        data[10] = input_data.data_10;    data[11] = input_data.data_11;
        data[12] = input_data.data_12;    data[13] = input_data.data_13;
        data[14] = input_data.data_14;    data[15] = input_data.data_15;
        Sgtr = 0;
        if (data[ 0][ 0]) { Sgtr = Sgtr ^ 0x060001;} if (data[ 1][ 0]) { Sgtr = Sgtr ^ 0x060002; }
        if (data[ 2][ 0]) { Sgtr = Sgtr ^ 0x060004;} if (data[ 3][ 0]) { Sgtr = Sgtr ^ 0x060008; }
        if (data[ 4][ 0]) { Sgtr = Sgtr ^ 0x060010;} if (data[ 5][ 0]) { Sgtr = Sgtr ^ 0x060020; }
        if (data[ 6][ 0]) { Sgtr = Sgtr ^ 0x060040;} if (data[ 7][ 0]) { Sgtr = Sgtr ^ 0x060080; }
        if (data[ 8][ 0]) { Sgtr = Sgtr ^ 0x060100;} if (data[ 9][ 0]) { Sgtr = Sgtr ^ 0x060200; }
        if (data[10][ 0]) { Sgtr = Sgtr ^ 0x060400;} if (data[11][ 0]) { Sgtr = Sgtr ^ 0x060800;}
        if (data[12][ 0]) { Sgtr = Sgtr ^ 0x061000;} if (data[13][ 0]) { Sgtr = Sgtr ^ 0x062000.}
        if (data[14][ 0]) { Sgtr = Sgtr ^ 0x064000;} if (data[15][ 0]) { Sgtr = Sgtr ^ 0x068000;}
        if (data[ 0][ 1]) { Sgtr = Sgtr ^ 0x0f0001;} if (data[ 1][ 1]) { Sgtr = Sgtr ^ 0x0f0002; }
        if (data[ 2][ 1]) { Sgtr = Sgtr ^ 0x0f0004;} if (data[ 3][ 1]) { Sgtr = Sgtr ^ 0x0f0008; }
        if (data[ 4][ 1]) { Sgtr = Sgtr ^ 0x0f0010;} if (data[ 5][ 1]) { Sgtr = Sgtr ^ 0x0f0020; }
        if (data[ 6][ 1]) { Sgtr = Sgtr ^ 0x0f0040;} if (data[ 7][ 1]) { Sgtr = Sgtr ^ 0x0f0080; }
        if (data[ 8][ 1]) { Sgtr = Sgtr ^ 0x0f0100;} if (data[ 9][ 1]) { Sgtr = Sgtr ^ 0x0f0200; }
        if (data[10][ 1]) { Sgtr = Sgtr ^ 0x0f0400;} if (data[11][ 1]) { Sgtr = Sgtr ^ 0x0f0800; }
        if (data[12][ 1]) { Sgtr = Sgtr ^ 0x0f1000;} if (data[13][ 1]) { Sgtr = Sgtr ^ 0x0f2000; }
        if (data[14][ 1]) { Sgtr = Sgtr ^ 0x0f4000;} if (data[15][ 1]) { Sgtr = Sgtr ^ 0x0f8000; }
        if (data[ 0][ 2]) { Sgtr = Sgtr ^ 0x1e0001;} if (data[ 1][ 2]) { Sgtr = Sgtr ^ 0x1e0002; }
        if (data[ 2][ 2]) { Sgtr = Sgtr ^ 0x1e0004;} if (data[ 3][ 2]) { Sgtr = Sgtr ^ 0x1e0008; }
        if (data[ 4][ 2]) { Sgtr = Sgtr ^ 0x1e0010;} if (data[ 5][ 2]) { Sgtr = Sgtr ^ 0x1e0020; }
        if (data[ 6][ 2]) { Sgtr = Sgtr ^ 0x1e0040;} if (data[ 7][ 2]) { Sgtr = Sgtr ^ 0x1e0080; }
        if (data[ 8][ 2]) { Sgtr = Sgtr ^ 0x1e0100;} if (data[ 9][ 2]) { Sgtr = Sgtr ^ 0x1e0200; }
        if (data[10][ 2]) { Sgtr = Sgtr ^ 0x1e0400;} if (data[11][ 2]) { Sgtr = Sgtr ^ 0x1e0800;}
        if (data[12][ 2]) { Sgtr = Sgtr ^ 0x1e1000;} if (data[13][ 2]) { Sgtr = Sgtr ^ 0x1e2000;}
        if (data[14][ 2]) { Sgtr = Sgtr ^ 0x1e4000;} if (data[15][ 2]) { Sgtr = Sgtr ^ 0x1e8000;}
        if (data[ 0][ 3]) { Sgtr = Sgtr ^ 0x0a0001;} if (data[ 1][ 3]) { Sgtr = Sgtr ^ 0x0a0002; }
        if (data[ 2][ 3]) { Sgtr = Sgtr ^ 0x0a0004;} if (data[ 3][ 3]) { Sgtr = Sgtr ^ 0x0a0008; }
        if (data[ 4][ 3]) { Sgtr = Sgtr ^ 0x0a0010;} if (data[ 5][ 3]) { Sgtr = Sgtr ^ 0x0a0020; }
```

CDL CODE FOR A CIRCUIT THAT
GENERATES PARITY AND ECC BITS

FIG. 18A

```
if (data[ 6][ 3]) { Sgtr = Sgtr ^ 0x0a0040;}  if (data[ 7][ 3]) { Sgtr = Sgtr ^ 0x0a0080; }
if (data[ 8][ 3]) { Sgtr = Sgtr ^ 0x0a0100;}  if (data[ 9][ 3]) { Sgtr = Sgtr ^ 0x0a0200; }
if (data[10][ 3]) { Sgtr = Sgtr ^ 0x0a0400;}  if (data[11][ 3]) { Sgtr = Sgtr ^ 0x0a0800;}
if (data[12][ 3]) { Sgtr = Sgtr ^ 0x0a1000;}  if (data[13][ 3]) { Sgtr = Sgtr ^ 0x0a2000;}
if (data[14][ 3]) { Sgtr = Sgtr ^ 0x0a4000;}  if (data[15][ 3]) { Sgtr = Sgtr ^ 0x0a8000;}
if (data[ 0][ 4]) { Sgtr = Sgtr ^ 0x180001;}  if (data[ 1][ 4]) { Sgtr = Sgtr ^ 0x180002;}
if (data[ 2][ 4]) { Sgtr = Sgtr ^ 0x180004;}  if (data[ 3][ 4]) { Sgtr = Sgtr ^ 0x180008;}
if (data[ 4][ 4]) { Sgtr = Sgtr ^ 0x180010;}  if (data[ 5][ 4]) { Sgtr = Sgtr ^ 0x180020;}
if (data[ 6][ 4]) { Sgtr = Sgtr ^ 0x180040;}  if (data[ 7][ 4]) { Sgtr = Sgtr ^ 0x180080;}
if (data[ 8][ 4]) { Sgtr = Sgtr ^ 0x180100;}  if (data[ 9][ 4]) { Sgtr = Sgtr ^ 0x180200;}
if (data[10][ 4]) { Sgtr = Sgtr ^ 0x180400;}  if (data[11][ 4]) { Sgtr = Sgtr ^ 0x180800;}
if (data[12][ 4]) { Sgtr = Sgtr ^ 0x181000;}  if (data[13][ 4]) { Sgtr = Sgtr ^ 0x182000;}
if (data[14][ 4]) { Sgtr = Sgtr ^ 0x184000;}  if (data[15][ 4]) { Sgtr = Sgtr ^ 0x188000;}
if (data[ 0][ 5]) { Sgtr = Sgtr ^ 0x170001;}  if (data[ 1][ 5]) { Sgtr = Sgtr ^ 0x170002;}
if (data[ 2][ 5]) { Sgtr = Sgtr ^ 0x170004;}  if (data[ 3][ 5]) { Sgtr = Sgtr ^ 0x170008;}
if (data[ 4][ 5]) { Sgtr = Sgtr ^ 0x170010;}  if (data[ 5][ 5]) { Sgtr = Sgtr ^ 0x170020;}
if (data[ 6][ 5]) { Sgtr = Sgtr ^ 0x170040;}  if (data[ 7][ 5]) { Sgtr = Sgtr ^ 0x170080;}
if (data[ 8][ 5]) { Sgtr = Sgtr ^ 0x170100;}  if (data[ 9][ 5]) { Sgtr = Sgtr ^ 0x170200;}
if (data[10][ 5]) { Sgtr = Sgtr ^ 0x170400;}  if (data[11][ 5]) { Sgtr = Sgtr ^ 0x170800;}
if (data[12][ 5]) { Sgtr = Sgtr ^ 0x171000;}  if (data[13][ 5]) { Sgtr = Sgtr ^ 0x172000;}
if (data[14][ 5]) { Sgtr = Sgtr ^ 0x174000;}  if (data[15][ 5]) { Sgtr = Sgtr ^ 0x178000;}
if (data[ 0][ 6]) { Sgtr = Sgtr ^ 0x1d0001;}  if (data[ 1][ 6]) { Sgtr = Sgtr ^ 0x1d0002;}
if (data[ 2][ 6]) { Sgtr = Sgtr ^ 0x1d0004;}  if (data[ 3][ 6]) { Sgtr = Sgtr ^ 0x1d0008;}
if (data[ 4][ 6]) { Sgtr = Sgtr ^ 0x1d0010;}  if (data[ 5][ 6]) { Sgtr = Sgtr ^ 0x1d0020;}
if (data[ 6][ 6]) { Sgtr = Sgtr ^ 0x1d0040;}  if (data[ 7][ 6]) { Sgtr = Sgtr ^ 0x1d0080;}
if (data[ 8][ 6]) { Sgtr = Sgtr ^ 0x1d0100;}  if (data[ 9][ 6]) { Sgtr = Sgtr ^ 0x1d0200;}
if (data[10][ 6]) { Sgtr = Sgtr ^ 0x1d0400;}  if (data[11][ 6]) { Sgtr = Sgtr ^ 0x1d0800;}
if (data[12][ 6]) { Sgtr = Sgtr ^ 0x1d1000;}  if (data[13][ 6]) { Sgtr = Sgtr ^ 0x1d2000;}
if (data[14][ 6]) { Sgtr = Sgtr ^ 0x1d4000;}  if (data[15][ 6]) { Sgtr = Sgtr ^ 0x1d8000;}
if (data[ 0][ 7]) { Sgtr = Sgtr ^ 0x0c0001;}  if (data[ 1][ 7]) { Sgtr = Sgtr ^ 0x0c0002;}
if (data[ 2][ 7]) { Sgtr = Sgtr ^ 0x0c0004;}  if (data[ 3][ 7]) { Sgtr = Sgtr ^ 0x0c0008;}
if (data[ 4][ 7]) { Sgtr = Sgtr ^ 0x0c0010;}  if (data[ 5][ 7]) { Sgtr = Sgtr ^ 0x0c0020;}
if (data[ 6][ 7]) { Sgtr = Sgtr ^ 0x0c0040;}  if (data[ 7][ 7]) { Sgtr = Sgtr ^ 0x0c0080;}
if (data[ 8][ 7]) { Sgtr = Sgtr ^ 0x0c0100;}  if (data[ 9][ 7]) { Sgtr = Sgtr ^ 0x0c0200;}
if (data[10][ 7]) { Sgtr = Sgtr ^ 0x0c0400;}  if (data[11][ 7]) { Sgtr = Sgtr ^ 0x0c0800;}
if (data[12][ 7]) { Sgtr = Sgtr ^ 0x0c1000;}  if (data[13][ 7]) { Sgtr = Sgtr ^ 0x0c2000;}
if (data[14][ 7]) { Sgtr = Sgtr ^ 0x0c4000;}  if (data[15][ 7]) { Sgtr = Sgtr ^ 0x0c8000;}
parities = Sgtr[16;0];
syndrome = Sgtr[5;16]; } }
```

KEY TO FIG. 18

| FIG. 18A |
| FIG. 18B |

CDL CODE FOR A CIRCUIT THAT GENERATES PARITY AND ECC BITS

FIG. 18B

```
include "afpc_lmem.h"
module afpc_lmem_ecc_synd_check(input bit[16] parities, input bit[5] synd,
output bit S_bit_err, output bit M_bit_err, output bit[16]
incorrect_byte_mask, output bit[8] correct_mask )
{ comb bit S_par_err;   comb bit  M_par_err; comb bit S_data_err;
   comb bit  S_synd_err; comb bit M_synd_err;
   ecc_syndrom_logic "ECC Synd logic": {
      S_par_err = 0; M_par_err = 0; full_switch (parities) {
      case 16b0: { S_par_err=0; M_par_err=0; }
      case 16b1000000000000000: { S_par_err=1; }
      case 16b0100000000000000: { S_par_err=1; }
      case 16b0010000000000000: { S_par_err=1; }
      case 16b0001000000000000: { S_par_err=1; }
      case 16b0000100000000000: { S_par_err=1; }
      case 16b0000010000000000: { S_par_err=1; }
      case 16b0000001000000000: { S_par_err=1; }
      case 16b0000000100000000: { S_par_err=1; }
      case 16b0000000010000000: { S_par_err=1; }
      case 16b0000000001000000: { S_par_err=1; }
      case 16b0000000000100000: { S_par_err=1; }
      case 16b0000000000010000: { S_par_err=1; }
      case 16b0000000000001000: { S_par_err=1; }
      case 16b0000000000000100: { S_par_err=1; }
      case 16b0000000000000010: { S_par_err=1; }
      case 16b0000000000000001: { S_par_err=1; } default: { M_par_err=1; } }
      correct_mask = 0; S_data_err = 0; S_synd_err = 0;  M_synd_err = 0;
      full_switch (synd) {
      case 5h00: { S_synd_err=0; S_data_err=0; M_synd_err=0; }
      case 5h01: { S_synd_err=1; }  case 5h02: { S_synd_err=1; }
      case 5h04: { S_synd_err=1; }  case 5h08: { S_synd_err=1; }
      case 5h10: { S_synd_err=1; }  case 5h06: { S_data_err=1; correct_mask[0]=1; }
      case 5h0f: { S_data_err=1; correct_mask[1]=1; }
      case 5h1e: { S_data_err=1; correct_mask[2]=1; }
      case 5h0a: { S_data_err=1; correct_mask[3]=1; }
      case 5h18: { S_data_err=1; correct_mask[4]=1; }
      case 5h17: { S_data_err=1; correct_mask[5]=1; }
      case 5h1d: { S_data_err=1; correct_mask[6]=1; }
      case 5h0c: { S_data_err=1; correct_mask[7]=1; }
      default: { M_synd_err=1; } } S_bit_err = 0; M_bit_err = 0;
      full_switch (bundle(S_data_err, S_synd_err, S_par_err, M_synd_err,
M_par_err)) {
         case 5b00000: { S_bit_err=0; M_bit_err=0; } // No errors
         case 5b01000: { S_bit_err=1; M_bit_err=0; } // Single error in syndrome
         case 5b00100: { S_bit_err=1; M_bit_err=0; } // Single error in parity bits
         case 5b10100: { S_bit_err=1; M_bit_err=0; } // Single error in data (=> incorrect
parity, syndrome delta of erred bit) default: { S_bit_err=0; M_bit_err=1; } }
      incorrect_byte_mask = parities; } }
```

CDL CODE FOR A CIRCUIT THAT EXAMINES CALCULATED ECC AND STORED ECC AND CORRECTS DATA IF POSSIBLE AND DETERMINES ERROR INDICATOR BIT VALUES

FIG. 19

A CLOCK GAPPING CIRCUIT (FOR CPU#1)

OPERATION OF A CLOCK GAPPING CIRCUIT (FOR CPU#1)

ATOMICS BLOCK
(ATOMIC METERING ASPECT)

MONITOR CIRCUIT

HOW INFORMATION FROM AN AHB-S BUS WRITE INTO THE SYSTEM INTERFACE BLOCK IS CONVERTED INTO A REQUEST FOR THE ATOMICS BLOCK THAT CAUSES THE ATOMICS BLOCK TO PERFORM AN ATOMIC METERING OPERATION

| TC INDICATOR | TP INDICATOR | INCOMING COLOR VALUE | RESULT COLOR | ACTION |
|---|---|---|---|---|
| TRUE | TRUE | GREEN | GREEN | DECREMENT LT AND ST BY BYTE COUNT |
| TRUE | TRUE | YELLOW | YELLOW | DECREMENT ST BY BYTE COUNT |
| TRUE | TRUE | RED | RED | DO NOT DECREMENT LT OR ST |
| FALSE | TRUE | GREEN | YELLOW | DECREMENT ST BY BYTE COUNT |
| FALSE | TRUE | YELLOW | YELLOW | DECREMENT ST BY BYTE COUNT |
| FALSE | TRUE | RED | RED | DO NOT DECREMENT LT OR ST |
| TRUE | FALSE | GREEN | RED | DO NOT DECREMENT LT OR ST |
| TRUE | FALSE | YELLOW | RED | DO NOT DECREMENT LT OR ST |
| TRUE | FALSE | RED | RED | DO NOT DECREMENT LT OR ST |
| FALSE | FALSE | GREEN | RED | DO NOT DECREMENT LT OR ST |
| FALSE | FALSE | YELLOW | RED | DO NOT DECREMENT LT OR ST |
| FALSE | FALSE | RED | RED | DO NOT DECREMENT LT OR ST |

TC INDICATOR = TRUE, IF LT - BYTE COUNT IS GREATER THAN ZERO, OTHERWISE FALSE.
TP INDICATOR = TRUE, IF ST - BYTE COUNT IS GREATER THAN ZERO, OTHERWISE FALSE.

TRUTH TABLE FOR HOW THE RESULT COLOR BITS AND THE ACTION ARE DETERMINED IN AN ATOMIC METERING OPERATION

FIG. 25

ATOMICS BLOCK
(RINGS ASPECT)

RING DESCRIPTORS

RING OF BUFFERS

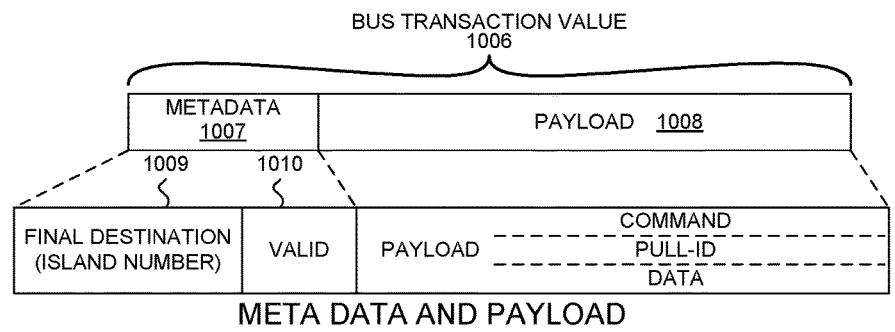

META DATA AND PAYLOAD

FIG. 30

| FIELD | WIDTH | DESCRIPTION |
|---|---|---|
| TARGET | 4 | CPP TARGET FOR THE COMMAND. |
| ACTION | 5 | ACTION RECOGNIZED BY THE CPP TARGET INDICATING WHAT SHOULD BE PERFORMED. |
| TOKEN | 2 | SUBTYPE OF ACTION RECOGNIZED BY THE CPP TARGET, INDICATING THE FLAVOR OF THE COMMAND. |
| LENGTH | 5 | LENGTH OF THE COMMAND, DEPENDENT ON THE ACTION/TOKEN, INTERPRETED BY THE CPP TARGET. |
| ADDRESS | 40 | ADDRESS THAT THE COMMAND SHOULD OPERATE ON. |
| BYTE_MASK | 8 | FURTHER OPTIONS OF A COMMAND (A BYTE MASK). |
| DATA_MASTER_ISLAND | 6 | ISLAND OF DATA MASTER TO PULL/PUSH DATA FROM/TO. |
| DATA_MASTER | 4 | PUSH/PULL-ID WITHIN THE ISLAND OF DATA MASTER TO PULL/PUSH FROM/TO. |
| DATA_REF | 14 | REFERENCE INDICATING TO THE DATA MASTER WHERE TO PUSH/PULL FROM. |
| SIGNAL_MASTER | 10 | EXTENSION FOR DATA_REF AS A DATA MASTER ONLY; FOR OTHER MASTERS INDICATING WHICH MASTER WITHIN THE DATA MASTER'S ISLAND SHOULD BE SIGNALED FOR THE COMMAND. |
| SIGNAL_REF | 7 | USED WITHIN THE SIGNAL MASTER TO IDENTIFY A SIGNAL. SHOULD BE INDICATED WITH THE COMMAND'S PULL OR PUSH. |

COMMAND PAYLOAD

FIG. 31

| FIELD | WIDTH | DESCRIPTION |
|---|---|---|
| TARGET_ISLAND | 6 | ISLAND TO RETURN PULL DATA TO. |
| TARGET_PORT | 2 | IDENTIFIES THE SUB-CIRCUIT IN THE FINAL DESTINATION ISLAND THAT IS THE TARGET (OF A MULTI-TARGET ISLAND). |
| TARGET_REF | 14 | TARGET SPECIFIC REFERENCE; RETURNED WITH PULL DATA. |
| DATA_MASTER | 4 | PULL-ID WITHIN THE ISLAND OF DATA MASTER TO PULL DATA FROM. |
| DATA_REF | 14 | REFERENCE WITHIN DATA MASTER AS TO WHERE TO PULL FROM; NORMALLY COPIED FROM THE INVOKING COMMAND. |
| SIGNAL_MASTER | 8 | EXTENSION FOR DATA_REF AS A DATA MASTER ONLY; FOR OTHER MASTERS INDICATING WHICH MASTER WITHIN THE DATA MASTER'S ISLAND SHOULD BE SIGNALED WHEN THE LAST DATA IS PULLED. |
| SIGNAL_REF | 7 | REFERENCE USABLE BY THE MASTER TO DETERMINE WHICH SIGNAL SHOULD BE INDICATED WITH THE LAST PULL DATA. |
| LENGTH | 5 | NUMBER OF 64-BIT DATA WORDS TO PULL FROM THE DATA MASTER, STARTING AT THE SPECIFIED DATA_REF. |

PULL-ID PAYLOAD

FIG. 32

| FIELD | WIDTH | DESCRIPTION |
|---|---|---|
| DATA_IS_PULL | 1 | ASSERTED FOR PULL DATA. |
| DATA_MASTER_OR_TARGET_PORT | 4 | DATA MASTER FOR PUSH DATA OR TARGET PORT FOR PULL DATA. |
| DATA_OR_TARGET_REF | 14 | DATA REF FOR PUSH DATA OR TARGET REF FOR PULL DATA. |
| SIGNAL_MASTER | 8 | ONLY USED FOR PUSH DATA; MASTER IN ISLAND TO SIGNAL IF DATA_MASTER IS NOT CTM; EXTENSION OF DATA_REF FOR DATA_MASTER OF CTM. |
| SIGNAL_REF_OR_CYCLE | 7 | SIGNAL_REF FOR PUSH DATA OR CYCLE FOR PULL DATA. |
| LAST | 1 | ASSERTED WITH THE LAST WORD OF DATA FOR PULL OR PUSH DATA. |
| DATA | 64 | 64-BITS OF PULL/PUSH DATA. |
| DATA_ERROR | 2 | ONE BIT PER 32-BITS OF DATA TO INDICATE AN UNCORRECTABLE ERROR. |
| DATA_VALID | 2 | ONE BIT PER 32-BITS OF DATA TO INDICATE, ON PUSH, THAT THE DATA IS TO BE WRITTEN TO THE DATA_MASTER. |
| NO_SPLIT | 1 | FOR PUSH DATA ONLY, ASSERTED FOR SIGNALING TO INDICATE THAT BOTH SIGNAL_REF AND SIGNAL_REF1 ARE TO BE INDICATED TO THE SIGNALED MASTER. |

DATA PAYLOAD

FIG. 33

| FIELD | WIDTH | DESCRIPTION |
|---|---|---|
| DATA_IS_PULL | 1 | ASSERTED FOR PULL DATA. |
| TARGET_PORT | 2 | IDENTIFIES THE SUB-CIRCUIT IN THE FINAL DESTINATION ISLAND THAT IS THE TARGET (OF A MULTI-TARGET ISLAND). |
| TARGET_REF | 14 | TARGET SPECIFIC REFERENCE, RETURNED WITH PULL DATA. |
| CYCLE-OF_PULL | 7 | CYCLE OF PULL DATA. |
| LAST | 1 | ASSERTED WITH THE LAST WORD OF PULL DATA. |
| DATA | 64 | 64-BITS OF PULLED DATA FROM THE DATA MASTER. |
| DATA_ERROR | 2 | ONE BIT PER 32-BITS OF PULLED DATA TO INDICATE AN UNCORRECTABLE ERROR FROM THE DATA_MASTER DATA SOURCE. |

DATA PAYLOAD (FOR A PULL)

FIG. 34

| FIELD | WIDTH | DESCRIPTION |
|---|---|---|
| DATA_IS_PULL | 1 | DEASSERTED FOR PUSH DATA. |
| DATA_MASTER | 4 | PUSH ID WITHIN THE ISLAND OF DATA MASTER THE DATA IS DESTINED FOR. |
| DATA_REF | 14 | REFERENCE WITHIN DATA MASTER AS TO WHERE TO PUSH FROM. |
| SIGNAL_MASTER | 8 | FOR CTM AS A DATA MASTER ONLY THIS IS AN EXTENSION FOR DATA_REF; FOR OTHER MASTERS INDICATING WHICH MASTER WITHIN THE DATA MASTER'S ISLAND SHOULD BE SIGNALED WHEN THE LAST DATA IS PUSHED. |
| SIGNAL_REF | 7 | REFERENCE WITHIN THE SIGNAL MASTER AS TO WHICH SIGNAL SHOULD BE INDICATED WITH THE LAST PUSH DATA. |
| LAST | 1 | ASSERTED WITH THE LAST WORD OF PUSH DATA. |
| DATA | 64 | 64-BITS OF PUSH DATA FROM THE DATA MASTER. |
| DATA_ERROR | 2 | ONE BIT PER 32-BITS OF PUSHED DATA TO INDICATE AN UNCORRECTABLE ERROR FROM THE DATA_MASTER DATA SOURCE. |
| DATA_VALID | 2 | ONE BIT PER 32-BITS OF DATA TO INDICATE THAT THE DATA IS TO BE WRITTEN TO THE DATA_MASTER. |
| NO_SPLIT | 1 | ASSERTED FOR SIGNALING TO INDICATE THAT BOTH SIGNAL_REF AND SIGNAL_REF1 ARE TO BE INDICATED TO THE SIGNALED MASTER. |

DATA PAYLOAD (FOR A PUSH)

FIG. 35

MULTIPROCESSOR SYSTEM HAVING POSTED TRANSACTION BUS INTERFACE THAT GENERATES POSTED TRANSACTION BUS COMMANDS

TECHNICAL FIELD

The described embodiments relate generally to multiprocessor systems, and more particularly to multiprocessor systems where the multiple processors of such a system have shared resources.

REFERENCE TO ASCII TEXT FILE APPENDIX

This application includes an ASCII text file appendix containing source code that embodies the inventions described herein. The ASCII text includes a hardware description language description in CDL source code. The CDL hardware description is of an embodiment of a multiprocessor system involving six processors. A portion of the disclosure of this patent document contains material that is subject to copyright protection. All the material in the ASCII text file appendix is hereby expressly incorporated by reference into the present application. The copyright owner of that material has no objection to the facsimile reproduction by anyone of the patent document or the patent disclosure, as it appears in the Patent and Trademark Office patent files or records, but otherwise reserves all copyright rights. The ASCII text file appendix includes the following text files that are readable in the MS-Windows operating system: 1) the file named "afpc_atomic_cdl.txt", is 52 KB large, created Aug. 31, 2016; 2) the file named "afpc_atomic_h.txt", is 6 KB, created Aug. 31, 2016; 3) the file named "afpc_atomic_master_command_fifo_cdl.txt", is 1 KB, created Aug. 31, 2016; 4) the file named "afpc_atomic_master_hash_fifo_cdl.txt", is 1 KB, created Aug. 31, 2016; 5) the file named "afpc_atomic_sram_4096×64ecc_cdl.txt", is 4 KB, created Aug. 31, 2016; 6) the file named "afpc_core_cdl.txt", is 17 KB, created Aug. 31, 2016; 7) the file named "afpc_core_h.txt", is 3 KB, created Aug. 31, 2016; 8) the file named "afpc_core_apb_cdl.txt", is 12 KB, created August, 2016; 9) the file named "afpc_core_apb_h.txt", is 2 KB, created Aug. 31, 2016; 10) the file named "afpc_coretexm3_h.txt", is 5 KB, created Aug. 31, 2016; 11) the file named "afpc_cpp_cdl.txt", is 60 KB, created Aug. 31, 2016; 12) the file named "afpc_cpp_h.txt", is 10 KB, created Aug. 31, 2016; 13) the file named "afpc_cpp_cmd_fifo_cdl.txt", is 5 KB, created Aug. 31, 2016; 14) the file named "afpc_cpp_master_cmd_fifo_cdl.txt", is 1 KB, created Aug. 31, 2016; 15) the file named "afpc_cpp_master_read_fifo_cdl.txt", is 1 KB, created Aug. 31, 2016; 16) the file named "afpc_cpp_pull_data_fifo_cdl.txt", is 5 KB, created Aug. 31, 2016; 17) the file named "afpc_cpp_pull_id_fifo_cdl.txt", is 4 KB, created Aug. 31, 2016; 18) the file named "afpc_cpp_push_data_fifo_cdl.txt", is 4 KB, created Aug. 31, 2016; 19) the file named "afpc_dcode_cdl.txt", is 16 KB, created Aug. 31, 2016; 20) the file named "afpc_dcode_h.txt", is 3 KB, created Aug. 31, 2016; 21) the file named "afpc_group_cdl.txt", is 24 KB, created Aug. 31, 2016; 22) the file named "afpc_group_h.txt", is 3 KB, created Aug. 31, 2016; 23) the file named "afpc_icode_cdl.txt", is 19 KB, created Aug. 31, 2016; 24) the file named "afpc_icode_h.txt", is 3 KB, created Aug. 31, 2016; 25) the file named "afpc_lmem_cdl.txt", is 53 KB, created Aug. 31, 2016; 26) the file named "afpc_lmem_h.txt", is 3 KB, created Aug. 31, 2016; 27) the file named "afpc_lmem_ecc_generate_cdl.txt", is 10 KB, created August 321, 2016; 28) the file named "afpc_lmem_ecc_syndrome_check_cdl.txt", is 4 KB, created Aug. 31, 2016; 29) the file named "afpc_scode_cdl.txt", is 36 KB, created Aug. 31, 2016; 30) the file named "afpc_scode_h.txt", is 3 KB, created Aug. 31, 2016; 31) the file named "afpc_types_h.txt", is 7 KB, created Aug. 31, 2016; 32) the file named "code_table.txt", is 6 KB, created Aug. 31, 2016.

BACKGROUND INFORMATION

U.S. Pat. No. 9,237,095, entitled "Island/Based Network Flow Processor Integrated Circuit", filed Feb. 17, 2012, by Gavin J. Stark et al. describes an Island-Based Network Flow Processor (IB-NFP) integrated circuit. The integrated circuit is a multiprocessor system involving a plurality of processors. A type of island referred to as an ME island has twelve "MicroEngine" processors, and there are multiple such ME islands in the IB-NFP. The IB-NFP also includes shared resources that are usable by the processors. One of the processors can access one of the shared resources via a Command/Push/Pull (CPP) posted transaction bus. The IB-NFP is a high-performance integrated circuit that works well in its intended environment performing its intended functions.

SUMMARY

A network flow processor integrated circuit is organized as a peripheral ring of input/output blocks, and a central two-dimensional array of rectangular-shaped islands. The functional circuits within the islands are all interconnected to one another by a mesh-shaped posted transaction bus. The mesh-shaped posted transaction bus interconnects and extends over all the islands. The different islands have different types of functional circuits. One type of island has a plurality of identical multiprocessor systems. In one example, each of these multiprocessor systems occupies a rectangular area within the island. The multiprocessor system includes many small single-threaded processors and a set of shared resources, one of which is a bus interface circuit via which the processors can engage in bus communications with the posted transaction bus. Through this bus interface circuit a processor can read information from a target outside the multiprocessor system, and outside the island, so that the information is communicated from the target across the posted transaction bus and is received onto the island and onto the multiprocessor system via the bus interface circuit, and is then received by a requesting one of the small single-threaded processors within the multiprocessor system. Alternatively, the processor can write information out of the multiprocessor system and out of the island via the bus interface circuit so that the data is communicated across the posted transaction bus and is written into the target. The target can be located outside the island, or the target can be located within the same island as the multiprocessor system.

The bus interface circuit includes a system interface block portion and a CPP bus interface portion. Each of the processors has an instruction code bus interface, a data code bus interface, and a system code bus interface. Each of the processors is coupled via a separate system code bus (AHB-S bus) to the system interface block portion. All the processors have the same address map. In order to initiate a bus transaction on the posted transaction bus, a processor performs a write across its AHB-S bus to the system interface block portion. The system interface block portion captures portions of the address and data of the AHB-S bus transaction and uses these portions to fashion a request. The request is forwarded to the CPP bus interface portion. The CPP bus interface portion translates information from the request into a CPP bus transaction value command that is of the appropriate form for initiating a CPP bus transaction on the posted transaction bus. The CPP bus interface portion then handles outputting the CPP bus transaction value command and engaging in the CPP bus transaction with the posted transaction bus.

In a first novel aspect, a processor can initiate a posted transaction bus read operation to read information from a target on the posted transaction bus by performing an AHB-S bus write into the system interface block portion. The CPP bus interface portion has a shared memory in shared address space of all the processors. The AHB-S bus write includes an address value. The overall bus interface circuit in response to the AHB-S bus write generates a posted transaction bus read command, and causes a posted transaction bus read transaction to occur using the generated posted transaction bus read command such that read data is obtained from outside the multiprocessor system via the posted transaction bus and is then stored into the shared memory in the CPP bus interface portion at a memory location indicated by processor in the original AHB-S bus write. The address to which the processor writes in the original AHB-S bus write is a location in shared memory space. The address determines both: 1) the type of CPP posted transaction bus operation that the overall bus interface circuit will initiate, and 2) the address in the shared memory of the CPP bus interface portion where the read data will be written.

In a second novel aspect, the overall bus interface circuit is a detection mechanism that detects occurrences on the external posted transaction bus. The overall bus interface circuit includes one peripheral circuit for each respective one of the processors. The peripheral circuit for a particular processor is configurable to send a single-bit alert signal to the processor under certain programmable conditions. In one example, a processor initiates a CPP posted transaction bus operation by performing an AHB-S bus write into the system interface block portion of the bus interface circuit. The resulting CPP posted transaction bus command that is output onto the posted transaction bus includes a signal reference value determined by the processor in the original AHB-S bus write. The signal reference value includes a processor number portion that identifies the originating processor. In the posted transaction bus operation that occurs on the posted transaction bus, the target returns the signal reference value as part of a bus transaction value that is communicated from the target to the multiprocessor system via the posted transaction bus. The interface circuit detects the incoming bus transaction value carrying the signal reference value and forwards the signal reference value to the peripheral circuits. Each peripheral circuit receives the signal reference value. The particular peripheral circuit that is coupled to supply a single-bit alert signal to a particular processor is configured to respond only to signal reference values whose processor number portions match the processor number of the particular processor. If appropriately configured, a peripheral circuit will respond to its receiving of a signal reference value containing its associated processor number by sending a single-bit alert signal to its corresponding processor. In response to receiving the single-bit alert signal, the processor can use its PPB bus interface and a PPB bus connection to the peripheral circuit to read a register in its associated peripheral circuit. The register contains a value that indicates the reason why the single-bit alert signal was sent to the processor. In the case that the reason is the detection, on the posted transaction bus, of a bus transaction value carrying the signal reference value, the processor reads a signal number from the register. This signal number matches the signal number that the processor originally caused to be put into the posted transaction bus command. Due to this match, the processor is alerted to the occurrence (the receipt of a bus transaction value carrying a particular signal reference value) on the external posted transaction bus.

In a third novel aspect, the multiprocessor system includes, for each processor, a Clock Gapping Circuit (CGC). The multiprocessor system also includes an instruction code interface block and a Shared Local Memory (SLMEM). All of the processors have the same shared address map, and all fetch their instructions from the SLMEM. The instruction code interface block includes a plurality of instruction prefetch circuit portions, and an instruction fetch request arbiter. Each processor is coupled via its instruction code bus interface and an AHB-I bus to its corresponding instruction prefetch circuit portion within the instruction code interface block. The instruction fetch request arbiter receives read requests from the various instruction prefetch circuit portions and supplies read requests to the SLMEM. Instructions read out of the SLMEM are returned to the instruction prefetch circuit portion of the requesting processor, and from the instruction prefetch circuit portion the instructions are supplied via the AHB-I instruction code bus of the processor back to the requesting processor. The CGC for a processor receives a base clock signal SCLK, and supplies a "gapped" clock signal FCLK to its corresponding processor.

A CGC generates its output FCLK such that: 1) FCLK is only be high for a maximum one half of a period of SCLK starting at the time SCLK goes high at the beginning of an SCLK period, 2) the maximum frequency of FCLK is one half of the frequency of SCLK, and 3) FCLK will not go high on a given rising edge of SCLK if FCLK is to be "gapped". If FCLK is to be gapped, then rather than FCLK going high at that time it is held low throughout the next complete period of SCLK.

A novel method comprises: (a) Storing a plurality of instruction values in the SLMEM. (b) Receiving SCLK into the CGC circuits and generating therefrom: 1) a first clock signal FCLK1 that is supplied to a first processor, and 2) a second clock signal FCLK2 that is supplied to a second processor. (c) Receiving onto the first prefetch buffer circuit of the instruction code interface block a first address from a first instruction fetch instruction from the first processor. The first fetch instruction includes the first address. The first prefetch buffer circuit stores a set of consecutively addressed instruction values. (d) Determining that an instruction value associated with the first address is not stored in the first prefetch buffer circuit. (e) In response to the determining of (d): 1) causing the instruction fetch request arbiter to supply an address to the SLMEM, and 2) gapping FCLK1 thereby preventing the first processor from receiving a rising edge of FCLK1. (f) In response to the supplying of the address by the instruction fetch request arbiter in (e) receiving a set of consecutively addressed instruction values from the SLMEM and storing the set into the first prefetch buffer circuit. One of the instruction values of the set received in (f) is the instruction value associated with the first address. (g) Supplying the instruction value associated with the first address to the first processor via the processor's instruction code interface. (h) Stopping the gapping of FCLK1 thereby allowing the first processor to receive a rising edge of the first gapped clock signal FCLK1. The rising edge of FCLK1 causes the first processor to clock in the instruction value. (i) Receiving onto the second prefetch buffer circuit a second address from a second instruction fetch instruction from the second processor. The second fetch instruction includes the second address. The second prefetch buffer circuit stores a set of consecutively addressed instruction values. (j) Determining that an instruction value associated with the second address is not stored in the second prefetch buffer circuit. (k) In response to the determining of (j): 1) causing the instruction fetch request arbiter to supply an address to the SLMEM, and 2) gapping FCLK2 thereby preventing the second processor from receiving a rising edge of FCLK2. (l) In response to the supplying of the address by the instruction fetch request arbiter in (k) receiving a set of consecutively addressed instruction values from the SLMEM and storing the set into the second prefetch buffer circuit. One of the instruction values of the set received in (l) is the instruction value associated with the second address. (m) Supplying the instruction value associated with the second address to the second processor. (n) Stopping the gapping of FCLK2 thereby allowing the second processor to receive a rising edge of FCLK2. The rising edge of CLK2 causes the second processor to clock in the instruction value supplied in (m). Both first address received onto the instruction code interface block from the first processor and the second address received onto the instruction code interface block from the second processor are in a shared address space shared by the first and second processors.

Through this instruction code interface block, the processors of the multiprocessor system are tightly coupled to the SLMEM. If a processor requests an instruction value from the instruction code interface block and the addressed instruction value is at that time stored in the instruction prefetch circuit for the processor, then the instruction prefetch circuit supplies the requested instruction value back to the requesting processor without the processor's FCLK being gapped.

In another aspect, the multiprocessor system also has a prefetching data code interface block through which all of the processors perform data accesses (data reads from SLMEM and data writes to SLMEM). The data code interface block prefetches data values for the processors. A processor can write into the data code interface block without its FCLK being gapped such that the written data is later transferred by the data code interface block to the SLMEM. A processor can also read data values from the data code interfaced block. If a processor requests a data value from the data code interface block and the addressed data is at that time stored in data code interface block, then a data prefetch circuit within the data code interface block supplies the requested data value back to the requesting processor without the processor's FCLK being gapped. If, however, the requested data value is not at that time stored in the data prefetch circuit for the processor, then the FCLK of the requesting processor is gapped so that the data code interface block can retrieve the data from the SLMEM. The requested data value is then returned to the requesting processor, and gapping of the processor's FCLK is stopped so that the processor can then clock in the data value from its data code bus interface. The data code interface block supports no-wait single-byte data value writes from the processors, and also supports no-wait multi-byte data value writes.

In a fourth novel aspect, the SLMEM receives read requests from the instruction code interface block and in response returns instruction values back to the instruction code interface block. The SLMEM also receives access requests from the data code interface block and in response either stores data received from the data code interface block or returns data to the data code interface block. The SLMEM has a memory that stores a plurality of relatively wide words. Each wide word includes a plurality of bytes of data, a parity bit for each byte of data, a plurality of ECC bits, and a state indicator value. The words are wide as compared to the width of the data that can be transferred in a single AHB bus cycle on a processor's AHB-D bus. The state indicator value of a word indicates whether the word has a so-called "clean" or a so-called "dirty" state. The SLMEM also has an Error Correction and detection Code (ECC)/parity check circuit that receives a word read out of the memory and if the state indicator value for the word indicates that the word is dirty then the ECC/parity check circuit uses the parity bits of the word to check the data bytes of the word for errors, whereas if the state indicator value for the word indicates that the word is clean then the ECC/parity check circuit uses the ECC bits of the word to check the data bytes of the word for errors. The data is therefore said to be "ECC protected", unless the read data is "dirty" in which case the protection is "degraded to parity". When degraded to parity, there is only single error detection and there is not error correction capability.

The SLMEM also has a write requests buffer. The write requests buffer receives data access requests from the data code interface block. The write requests buffer stores an address value, a plurality of bytes of data associated with the address value, and a plurality of write enable bit values. There is one write enable bit value for each byte of the data. Data bytes to be written into the memory are first written into this write requests buffer, and are then later transferred from the write requests buffer into the memory. The write enable bit of a byte being set indicates that the byte contains new valid data that is to be written into the memory.

The SLMEM also has a Parity/Error Correction and detection Code (ECC) Generating Circuit (PECCGC). The PECCGC receives buffered write request information from the write requests buffer and if all write enable bit values are set then the PECCGC determines an error correction code (ECC) value for the entire plurality data bytes and outputs a write request that includes the plurality of bytes of data, a correct parity bit value for each byte of data, the determined ECC value, and a state indicator value that indicates that the word of the write request is a clean word. The write request is supplied to the memory to write the "clean" word into the memory. If, on the other hand, all write enable bit values are not set then a proper ECC covering all the data cannot be generated because the values of the other bytes (the ones without set write enable bits) are in memory and are not known to the ECC generating circuit. The PECCGC therefore generates a parity bit value for each byte of data and outputs a write request that includes the plurality of bytes of data, a correct parity bit value for each byte of data, an incorrect ECC value of all zeros, and a state indicator value that indicates that the word of the write request is a dirty word. The write request is supplied to the memory to write the "dirty" word into the memory. This use of the write enable bits allows time-consuming read-modify-write memory access operations to be avoided.

If a processor requests a data value from a word that is indicated by its state bits to be "dirty", then the returned data can only be checked for errors using the parity bits. Such an occurrence is, however, unlikely. The reason is that the SLMEM also has a scrub circuit. The scrub circuit maintains a list of all the addresses that are dirty. At a next opportunity when the memory is not being accessed, the scrub circuit causes the memory word corresponding to a dirty address to be read out of the memory. The data bytes of the word are then checked for errors, and if no errors are detected then a correct ECC value is determined. The word is not output from the SLMEM, but rather is written back into the memory at the same address, but this time the data bytes of the word have an associated and correct ECC value, and the state indicator bits indicate that the word is clean. This address now contains a clean word, with correct parity bits and ECC bits and state bits indicating the word is "clean", and the address is removed from the list of dirty addresses maintained by the scrub circuit.

Associated with each access request to the memory portion of the SLMEM is a source indicator and a tag. The source indicator is used to return data read out of the memory back to either the instruction code interface block (if the access request was a read request to read instruction information) or the data code interface block (if the access request was request to read data). The tag is supplied along with the returned information. The tag indicates the number of the processor to which the information is to be returned. Each processor of the multiprocessor system has an associated processor number. The instruction and data code interface blocks use the tag to supply the information back to the correct processor.

In a fifth novel aspect, the multiprocessor system includes an atomics block that in turn includes a pipeline and an associated memory. The atomics block can be made to carry out atomic operations, including an atomic metering operation. The atomics block is an efficient and shared atomic operation resource for the processors of the multiprocessor system. The processors access and interact with the atomics block via the same system interface block through which they interact with the CPP bus interface. The system interface block is coupled to a first processor via the first processor's system bus interface and a first AHB-S bus. The system interface block is coupled to a second processor via the second processor's system bus interface and a second AHB-S bus. The system interface block supplies atomic requests to the atomic block and receives back responses. The system interface block has a first register that is readable by the first processor via the first AHB-S bus and a second register that is readable by the second processor via the second AHB-S bus. The system interface block receives information from one of the first and second buses in a write operation and uses that information to generate an atomic request. The atomic request has a command portion, an address portion, and a data value portion. The atomics block receives the atomic request and in response carries out an atomic metering operation. The memory of the atomic block stores pairs of credit values. The pipeline of the atomic block uses the address portion to read the proper pair of credit values (first credit value and second credit value) from the memory. The pipeline then uses the first and second credit values along with the data value portion as input values to perform the atomic meter operation. The pipeline outputs a result color value as a result of the atomic meter operation. This result color value is communicated from the atomic block to the system interface block in the form of an atomics response, and is stored into one of the first and second registers in the system interface block. The pipeline also causes the first and second credit values to be written back into the memory in updated form if appropriate in accordance with results of the atomic metering operation. The processor that initiated the atomic metering operation (by writing to the proper address across its AHB-S bus) can then use its AHB-S bus to read the contents of its register from the system interface block, thereby obtaining the result color value. The atomics block can perform several different operations. The particular address to which a processor writes (using its AHB-S bus) determines which particular atomic operation it is that the atomics block will carry out. The system interface block uses address and data information from the AHB-S bus write operation to form the appropriate atomic request that is then sent from the system interface block to the atomics block to cause the atomics block to perform the desired atomics operation.

In a sixth novel aspect, the atomics block can be made to carry out several ring operations, such as a "put" onto ring operation and a "get" from ring operation. The memory of the atomics block comprises a plurality of ring buffers. The pipeline of the atomics block maintains a plurality of ring descriptors. Each ring descriptor contains information about a corresponding ring of the ring buffers. The atomics block also includes a monitor circuit. The monitor circuit interfaces with a ring op stage of the pipeline and with the ring descriptors, and thereby detects an occurrence of any one of the rings becoming "not empty". Upon detecting that a ring has become "not empty", the monitor circuit can be programmed to output a preloaded signal reference value. The signal reference value is supplied from the atomic block to the peripheral circuits. There is a first peripheral circuit that upon a predetermined condition will output an alert signal to a first processor. There is a second peripheral circuit that upon a predetermined condition will output an alert signal to a second processor.

In one example, an overall task to be performed involves the first processor doing a part of the overall task and the second processor doing another part of the overall task. The second processor can only begin performing its part of the overall task after the first processor has completed its part. The second processor initially has no tasks to perform, so it executes a WFE instruction and begins operating in a low power sleep mode. Meanwhile the first processor is operating in a non-sleep mode and is performing its part of the overall task. When the first processor completes its part of the overall task, it communicates information to the second processor so that the second processor will exit its sleep mode and will begin doing its part of the overall task. The first processor does this by performing an AHB-S bus write to a particular address. Writing to this particular address causes the system interface block to generate a particular atomic request and to send that atomic request to the atomics block. The atomics request causes the atomics block to "put" a data value onto a particular ring specified by the original AHB-S write. At this point the ring becomes "not empty". The monitor circuit of the atomics block detects the ring becoming "not empty", and in response sends a preloaded signal reference value to the peripheral circuits. The preloaded signal reference value contains processor number that identifies the second processor. The peripheral circuit for the first processor receives the signal reference value but does not respond because the processor number of the signal reference value does not match the processor number of the first processor. The peripheral circuit for the second processor, however, does respond to the signal reference value because the processor number of the signal reference value does match the processor number of the second processor. The peripheral circuit for the second processor therefore sends an alert signal to the second processor. The alert signal is received onto the RXEV terminal of the second processor. This causes the second processor to exit sleep mode operation, and to begin working in the non-sleep mode. Upon waking up, the second processor executes an instruction that causes it to read (via the second PPB bus) the status value stored in the status register of the second peripherals circuit. This status value indicates the reason that the alert signal was sent to the second processor. In this way, the second processor learns that it received the alert signal due to a particular ring becoming "not empty". In response, the second processor initiates an AHB-S write operation to a particular address. This write causes the system interface block to generate an atomic request that in turn causes the atomics block to perform a "get" from ring operation. The atomics block retrieves the value from the ring that the first processor had put onto the ring, and then sends the value to the system interface block. The value is written into the dataline register of the system interface block. The second processor can then perform another AHB-S read to read the value out of the dataline register. Once the second processor has the value, it can begin carrying out its part of the overall task. The value passed from the first to second processor in this way may, for example, be an amount of partially processed data. The value passed from the first to second processor may be a message.

The atomics block manages the ring buffers, and ring pointers, the putting of values onto rings, the getting of values from rings, and the detection by the monitor circuit of particular occurrences involving the rings (for example, an occurrence of a ring becoming "not empty"). The rings mechanism of the atomics block is a general purpose inter-processor communication resource usable by the processors of the multiprocessor system to communicate tasks and/or data between processors.

Further details and embodiments and methods and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 4 is a more detailed diagram of a part of the multiprocessor system of FIG. 3.

FIG. 6 is a more detailed diagram of the system interface block in the multiprocessor system of FIG. 3.

FIG. 11 is a more detailed diagram of one of the peripheral circuits in the multiprocessor system of FIG. 3.

FIG. 18 is a listing of CDL code for a circuit that generates parity and ECC bits in the SLMEM of FIG. 16.

FIG. 18A is part of larger FIG. 18.

FIG. 18B is part of larger FIG. 18.

FIG. 19 is a listing of CDL code for a circuit that examines calculated ECC values and stored ECC value and correct data if possible and determined error indictor values in the SLMEM of FIG. 16.

FIG. 25 is a table that set forth how the result color bits and the action are determined in an atomics metering operation.

FIG. 30 is a diagram of the format of a bus transaction value that passes over the configurable mesh data bus.

FIG. 31 is a table describing the payload of a bus transaction value in the situation in which the bus transaction value is a command.

FIG. 32 is a table describing the payload of a bus transaction value in the situation in which the bus transaction value is a pull-id.

FIG. 33 is a table describing the payload of a bus transaction value in the situation in which is a data pull or push.

FIG. 34 is a table describing the payload of a bus transaction value in the situation in which the bus transaction value is a data pull.

FIG. 35 is a table describing the payload of a bus transaction value in the situation in which the bus transaction value is a data push.

DETAILED DESCRIPTION

Reference will now be made in detail to background examples and some embodiments of the invention, examples of which are illustrated in the accompanying drawings.

Figure 1:
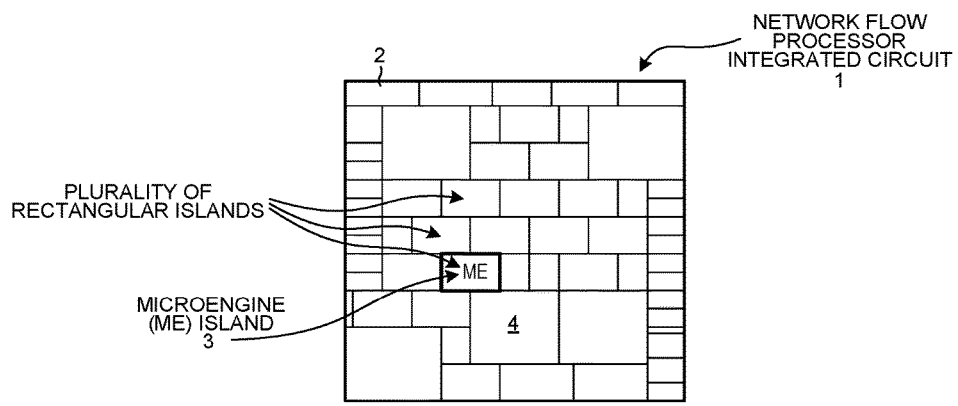
FIG. 1 is a diagram of a network flow processor integrated circuit in accordance with one novel aspect.

FIG. 1 is a simplified top-down diagram of an Island-Based Network Flow Processor (IB-NFP) integrated circuit die 1. The die comprises a plurality of peripherally located input/output blocks, a first tiling area made up of a plurality of rectangular islands, and a second tiling area of larger blocks. One of the input/output blocks is identified by reference numeral 2. One of the rectangular islands is identified by reference numeral 3. One of the larger blocks is identified by reference numeral 4. Each of the rectangular islands of the first tiling area is either of a full rectangular shape, such as island 3, or is half the size of the full rectangular shape. In each island there is functional circuitry. The functional circuitry of these rectangular islands are intercoupled together by a mesh-shaped posted transaction bus. More specifically, the mesh-shaped posted transaction bus is a mesh-shaped Command/Push/Pull (CPP) bus. The mesh-shaped CPP bus involves four meshes: 1) a command mesh bus, 2) a pull-id mesh bus, 3) a data0 mesh bus, and 4) a data1 mesh bus. In each island, a crossbar switch portion of each mesh is located roughly in the center of the island, and the mesh interconnects to the functional circuitry of the island roughly at this central island location. For additional information on the IB-NFP integrated circuit die 1 and on the structure and operation of the CPP bus, see: U.S. Pat. No. 9,237,095, entitled "Island/Based Network Flow Processor Integrated Circuit", filed Feb. 17, 2012, by Gavin J. Stark et al. (the entire subject matter of which is incorporated herein by reference). Operation of the CPP bus is also explained below in connection with FIGS. 29-36.

Figure 2:
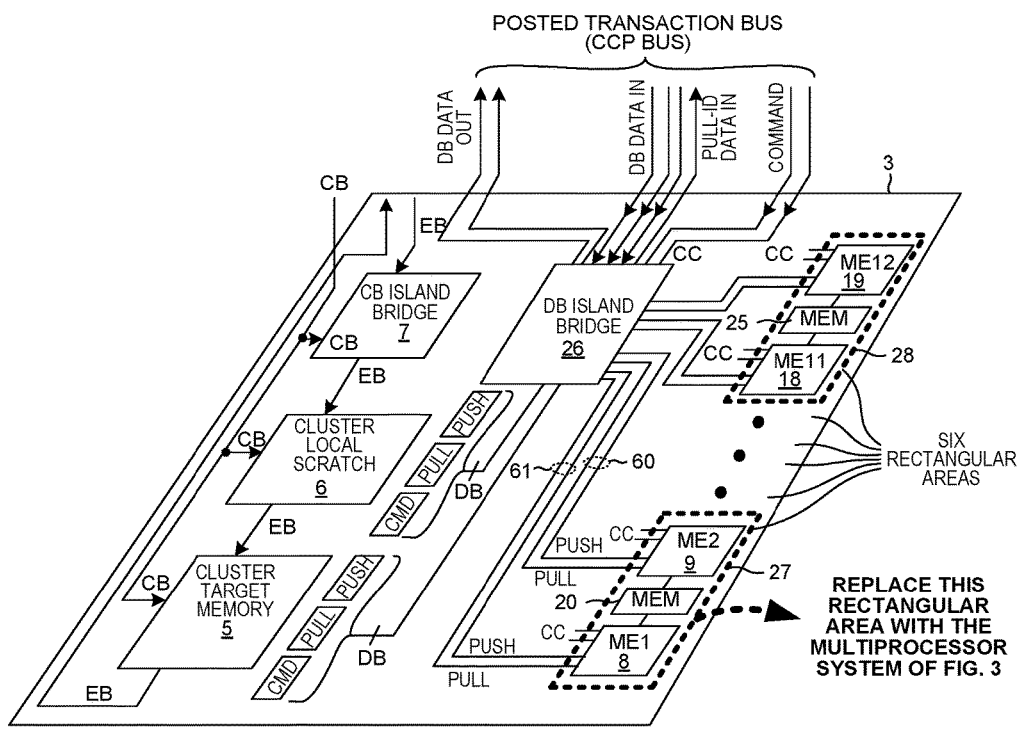
FIG. 2 is a simplified perspective diagram of a MircoEngine (ME) island of the network flow processor integrated circuit of FIG. 1.

FIG. 2 is a stylized perspective diagram of an ME island as set forth in U.S. Pat. No. 9,237,095. This ME island includes a Cluster Target Memory (CTM) 5, a Cluster Local Scratch (CLS) 6, a Control Bus (CB) island bridge 7, twelve Microengine (ME) processors 8-19 organized in pairs, six memories 20-25, and a Data Bus (DB) island bridge 26. Each "microengine" or "ME" is a 32-bit multi-threaded RISC processing core having a RISC instruction set tailored to networking and communication applications. For further detail on the ME, its architecture, capabilities and instruction set, see: 1) the Intel IXP2800 Network Processor Hardware Reference Manual, pp. 1-430 (August 2004), and 2) U.S. Pat. No. 6,668,317, entitled "Microengine For Parallel Processor Architecture", by Bernstein et al. (the subject matter of which is incorporated herein by reference). Each pair of MEs and its associated memory is disposed in a corresponding rectangular area of silicon. Two of these rectangular areas 27 and 28 are illustrated in FIG. 2 with dashed lines. The novel ME island 3 of the novel integrated circuit 1 of FIG. 1 is identical to the prior art ME island of FIG. 2, except that each of the six rectangular areas is replaced with an instance of the novel multiprocessor system shown in FIG. 3. The ME island of FIG. 2 is therefore identified by reference numeral 3, and it is understood that each of the six rectangular areas of FIG. 2 has the structure shown in FIG. 3. For additional information on CTM 5, see: U.S. Patent Application Publication US2016/0085477, entitled "Addressless Merge Command With Data Item Identifier", by Salma Mirza and Gavin Stark, filed Sep. 20, 2014 (the entire subject matter of which is incorporated herein by reference).

Figure 3:
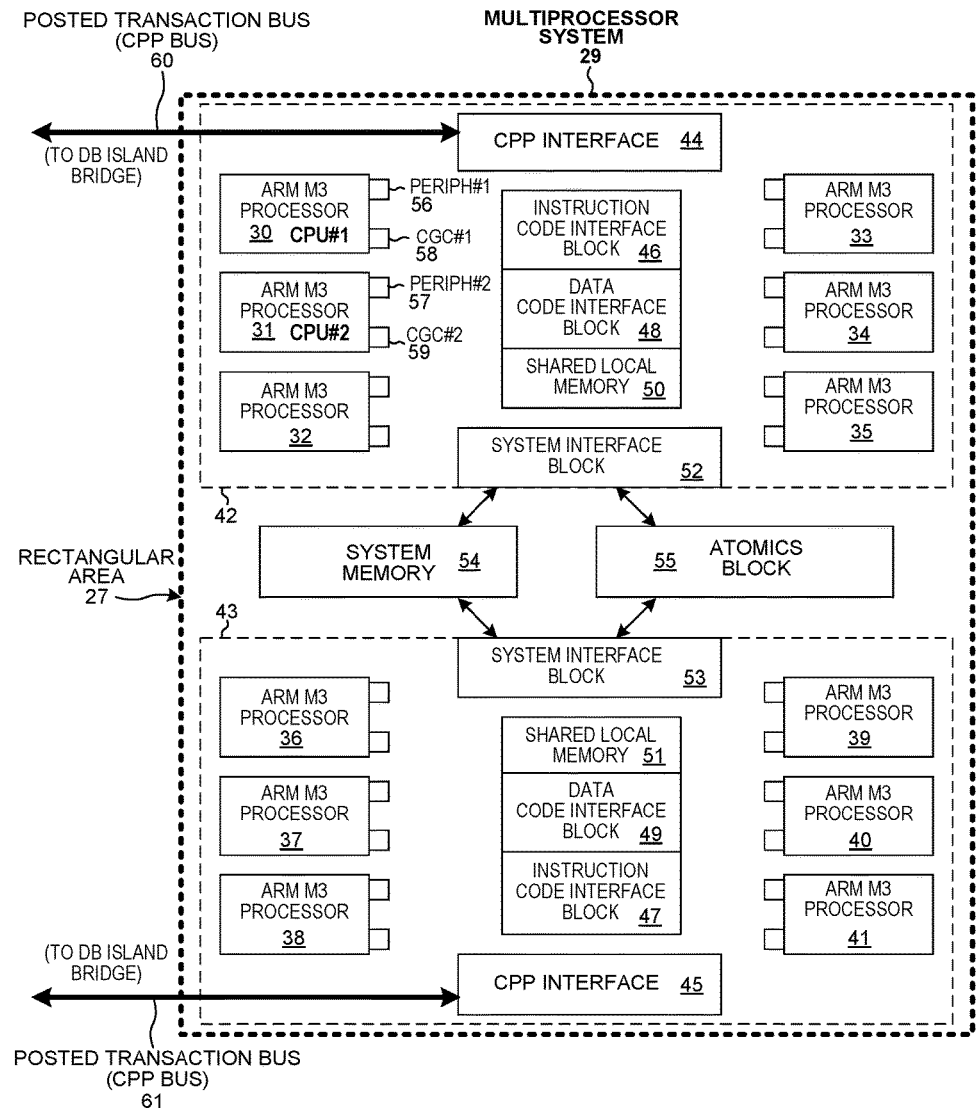
FIG. 3 is a diagram of a multiprocessor system that replaces a rectangular area in the ME island of FIG. 2.

FIG. 3 is a simplified top-down layout diagram of the multiprocessor system 29 of rectangular area 27. Each of the six areas 20-25 of FIG. 2 is replaced with an identical instance of the multiprocessor system of FIG. 3. Multiprocessor system 29 comprises twelve processors 30-41, six in the upper half 42 of the circuit, and six in the lower half 43 of the circuit. The processors, which are single-threaded ARM Cortex-M3 processors (specified and licensed from ARM Holdings plc of Cambridge, England), are also referred to in the description below as CPUs (Central Processing Units). Processor 30 is the first processor, or processor#1, or CPU#1. Processor 31 is the second processor, or processor#2, or CPU#2. In addition to the processors, the multiprocessor system 29 includes two CPP bus interface circuits 44 and 45, two instruction code interface blocks 46 and 47 (also called "ICode" interface blocks), two data code interface blocks 48 and 49 (also called "DCode" interface blocks), two shared local memories 50 and 51, two system interface blocks 52 and 53 (also called "SCode" interface blocks), a system memory 54 and an atomics block 55. Each processor has an associated peripheral circuit and an associated Clock Gapping Circuit (CGC). Only two of the peripherals 56 and 57 are labeled in FIG. 3, and only two of the clock gapping circuits 58 and 59 are labeled in FIG. 3. The illustration of FIG. 3 is a simplified illustration of the layout of the circuit. All the interconnections between the various sub-circuits of the multiprocessor system 29 are not illustrated. The heavy line 60 represents CPP bus lines that extend to the DB island bridge 26. The heavy line 61 represents other CPP bus lines that extend to the DB island bridge 26.

Figure 4A:
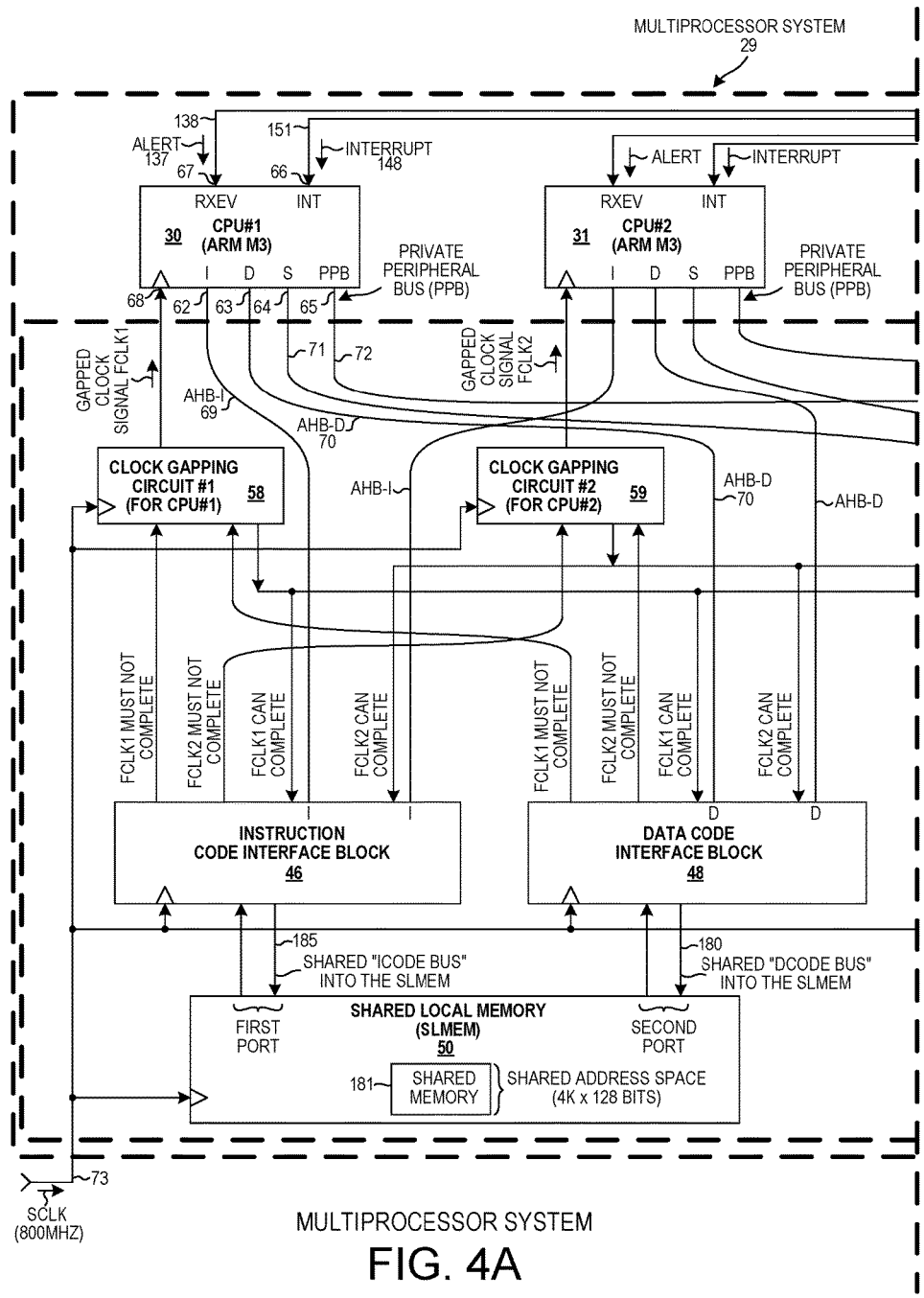
FIG. 4A is a left part of a larger FIG. 4.
Figure 4B:
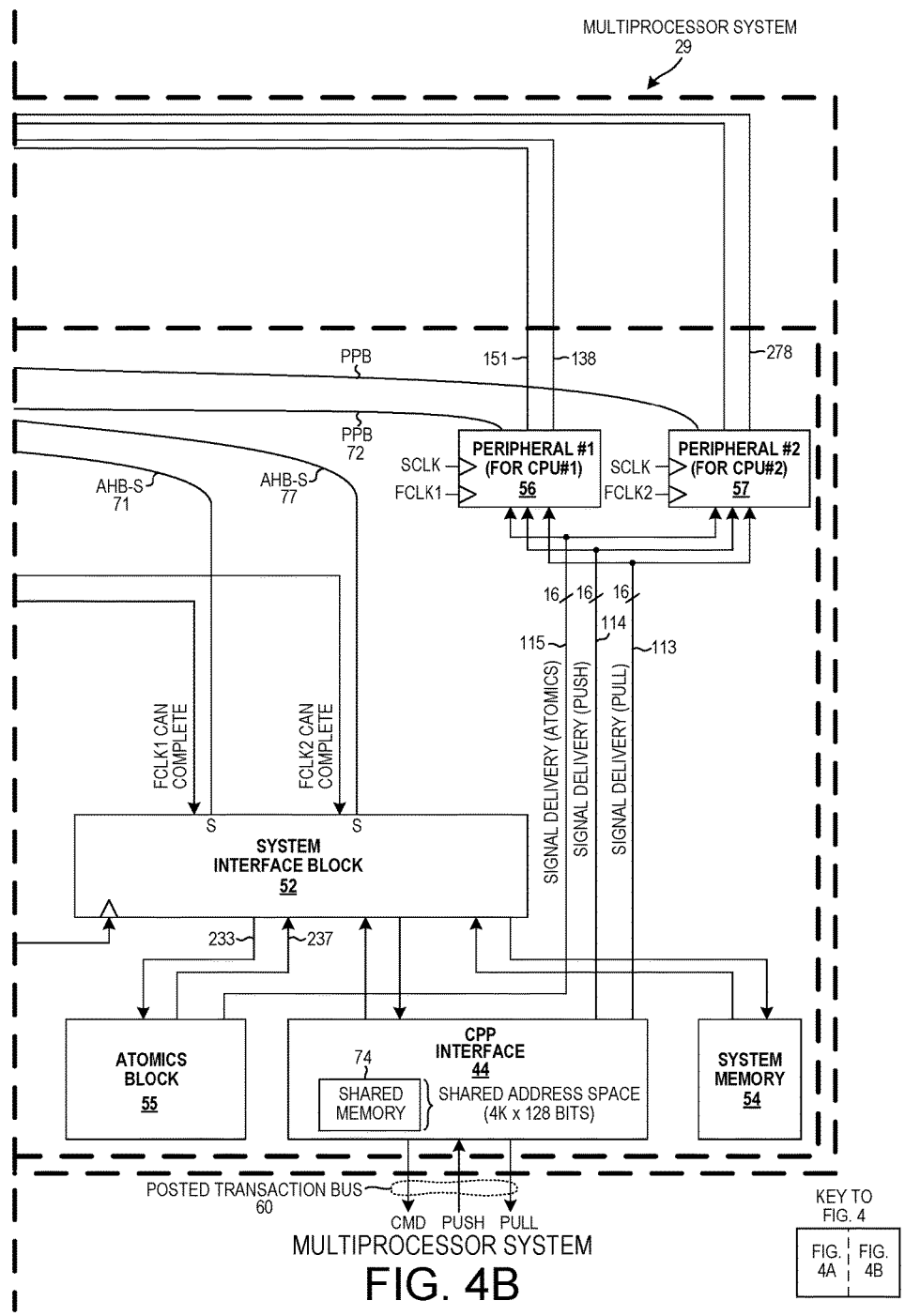
FIG. 4B is a right part of the larger FIG. 4.

FIG. 4A and FIG. 4B together form the larger diagram of FIG. 4. FIG. 4 is a more detailed diagram of part of the multiprocessor system 29 of FIG. 3. The two processors 30 and 31 are identical processors, so only the interfaces of processor 30 are described. First processor 30 has an instruction code bus interface 62 (also referred to as an "ICode" bus interface or an AHB-I bus interface), a data code bus interface 3 (also referred to as a "DCode" bus interface or an AHB-D bus interface), a system bus interface 64 (also referred to as "SCode" bus interface or an AHB-S bus interface), and a Private Peripheral Bus (PPB) interface 65. The instruction code bus interface, the data code bus interface, and the system interface are 32-bit AHB-Lite bus interfaces. The PPB interface is a 32-bit APB bus interface.

First processor 30 also has an interrupt input terminal 66 INT, and an alert signal input terminal 67 RXEV. Through the instruction code bus interface 62 and the AHB-I bus 69, first processor 30 can read and write to the instruction code interface block 46. Through the data code bus interface 63 and the AHB-D bus 70, first processor 30 can read and write to the data code interface block 48. Through the system memory interface 64 and the AHB-S bus 71, first processor 30 can read and write to the system interface block 52. Through the PPB interface 65 and the PPB bus 72, first processor 30 can read and write to the peripheral block 56. First processor 30 is clocked by a clock signal FCLK1 received onto its clock input terminal 68 from clock gapping circuit 58. This is a different clock signal than the clock signal FCLK2 that is supplied onto the clock input terminal of the second processor 31. The base clock signal SCLK received via input conductor 73 is an 800 MHz square wave clock signal. The clock signals FLCK1 and FCLK2 are gapped clock signals that are derived from the base clock signal SCLK.

Figure 5:
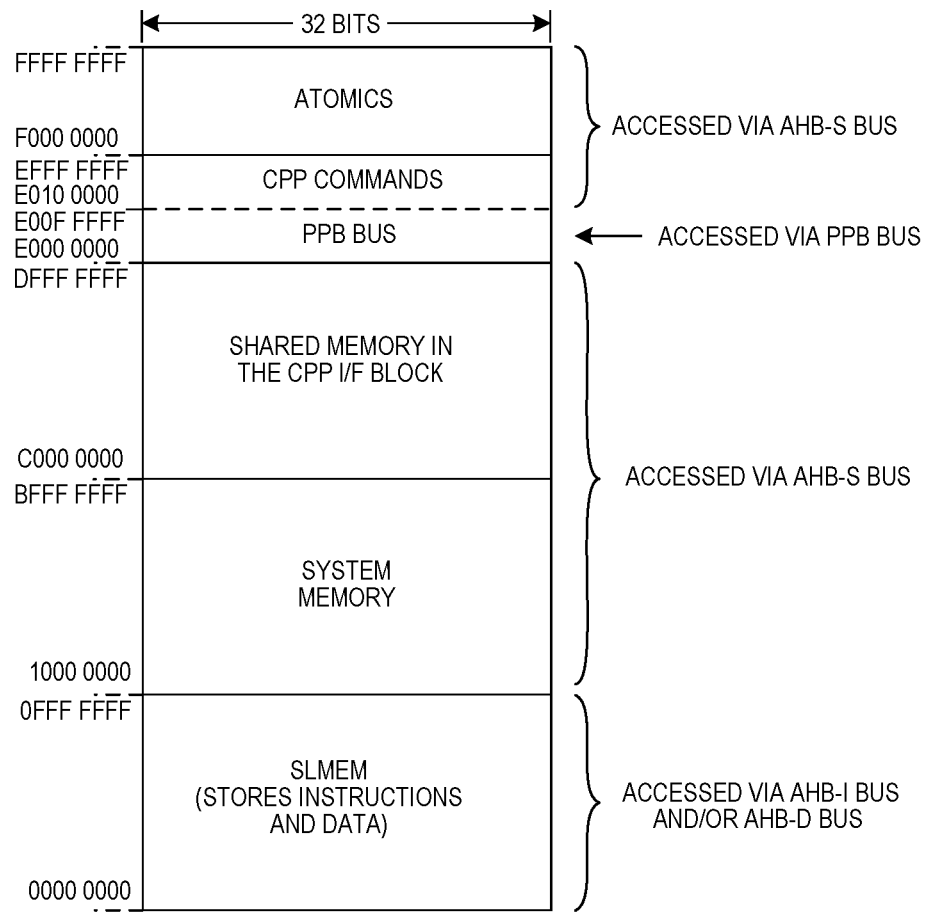
FIG. 5 is a diagram that illustrates the address map of the six processors in the upper half of the multiprocessor system of FIG. 3.

FIG. 5 is a diagram that illustrates the address map of the six processors 30-35 in the upper half 42 of the multiprocessor system 29 of FIG. 3. Each of the six processors has the same identical address map. The address map is therefore said to be shared by the processors. The first processor 30 can access (read and write each address) addresses in the address space from 0000.0000 to 0FFF.FFFF via both the AHB-I bus 69 and the AHB-D bus 70. If the first processor 30 is fetching instructions, then it will use the AHB-I bus 69 to read from an address in this space. If the first processor 30 is reading or writing data, then it will use the AHB-D bus 70 to read from or write to an address in this space. The address space from 1000.0000 to BFFF.FFFF allows reading and writing from/to system memory 54. If the first processor 30 is accessing the system memory 54, then it will use the AHB-S bus 71. The address space from C000.0000 to DFFF.FFFF is address space that allows reading from and writing to the shared memory 74 in the CPP interface block 44. The first processor 30 can access any address in the address space from 1000.0000 to DFFF.FFFF via the AHB-S bus 71 (the processor's AHB-S bus). The first processor 30 accesses address space from E000.0000 to E00F.FFFF via the PPB bus 72. The first processor 30 uses this address space to access registers in the so-called "peripheral" circuit 56. The address space from E010.0000 to EFFF.FFFF is used to initiate bus operations on the CPP posted transaction bus and to read result information back. The first processor 30 accesses this address space via the AHB-S bus 71. The first processor 30 uses the address space from F000.0000 to FFFF.FFFF to initiate atomic operations performed by the atomics block 55 and for obtaining the results back from the atomic block 55. The first processor 30 accesses this address space via the AHB-S bus 71.

Figure 6A:
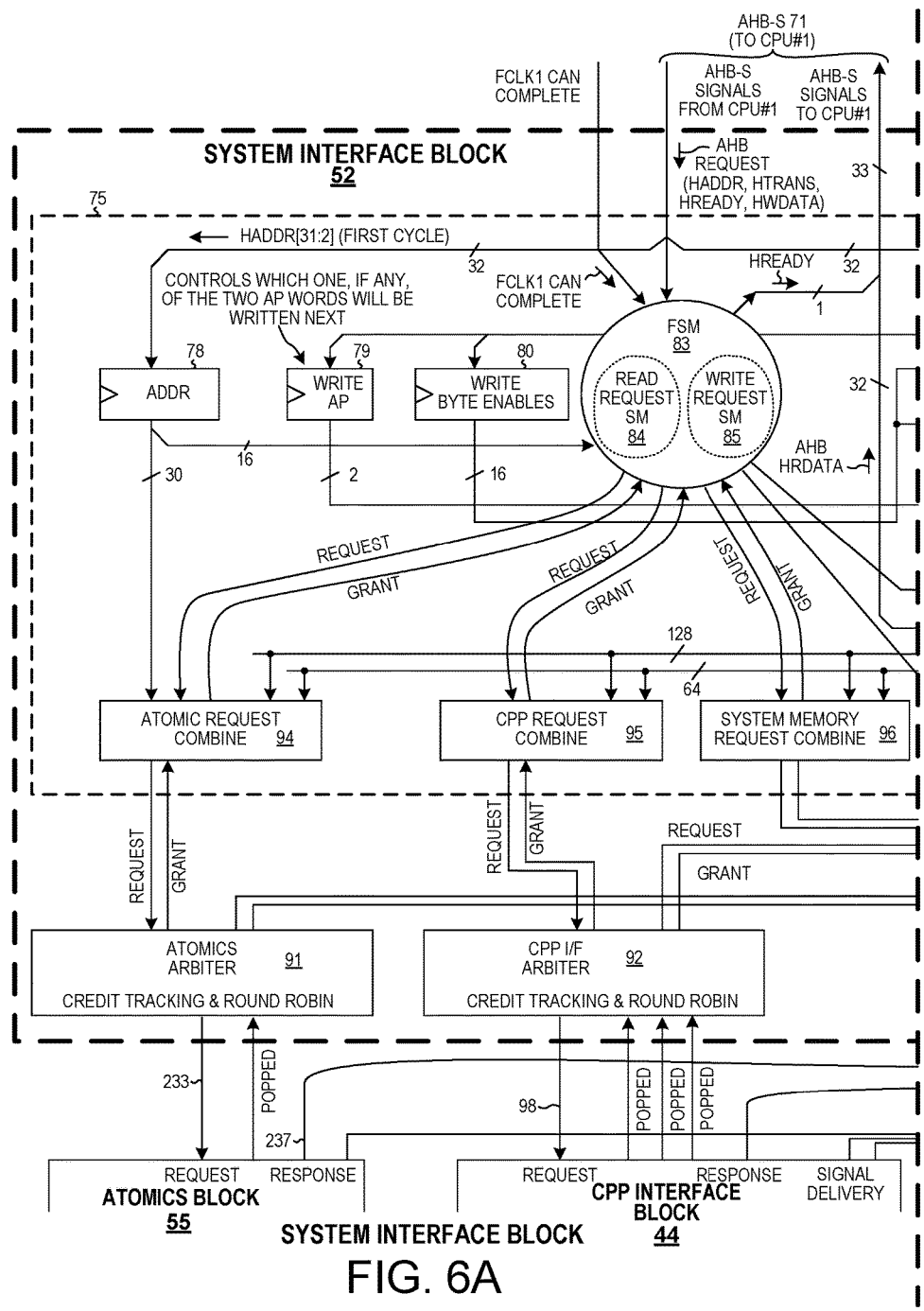
FIG. 6A is a left part of a larger FIG. 6.
Figure 6B:
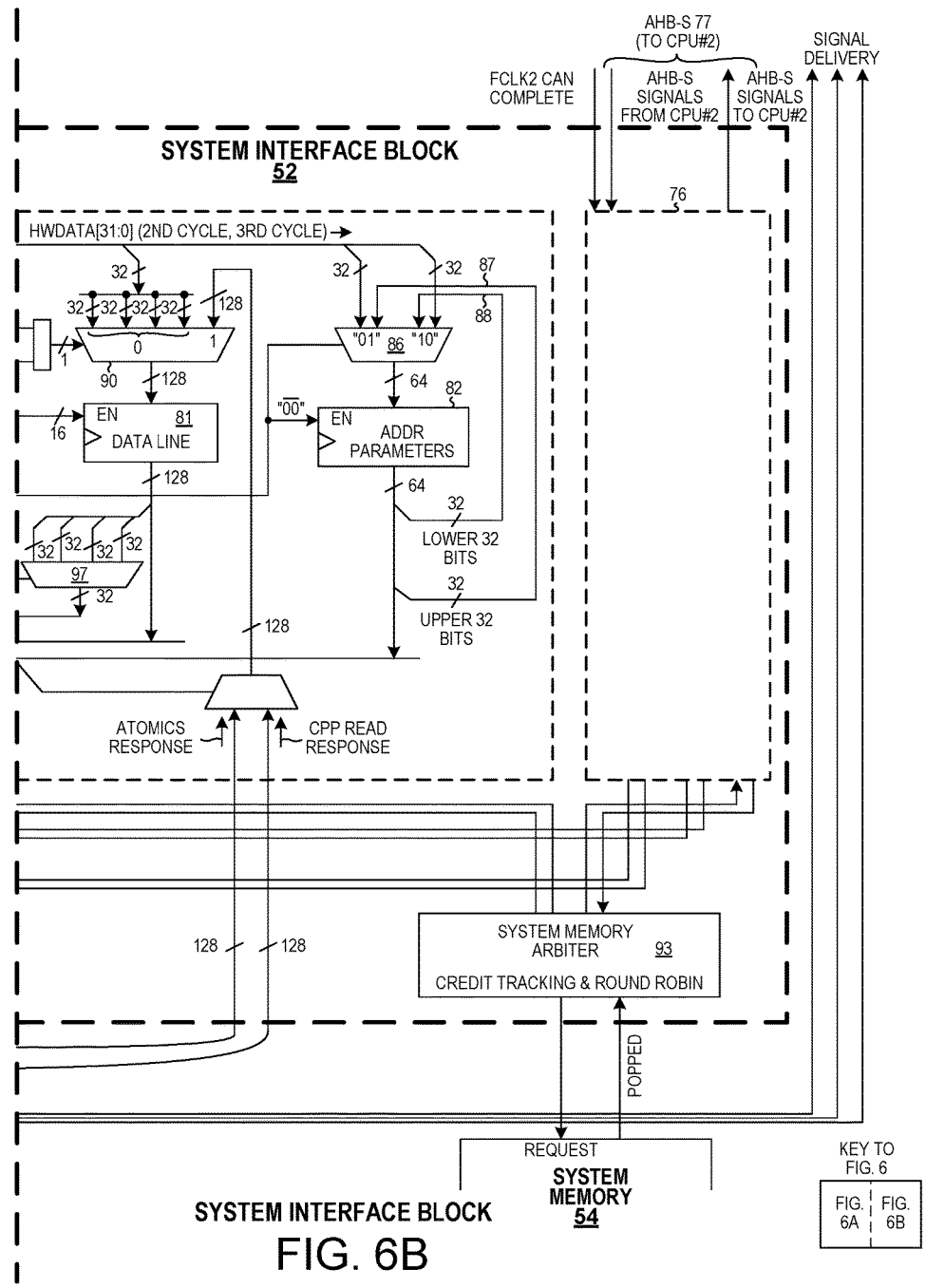
FIG. 6B is a right part of the larger FIG. 6.

FIG. 6A and FIG. 6B together form the larger FIG. 6. FIG. 6 is a more detailed diagram of the system interface block 52 of FIG. 4. The six processors 30-35 of the upper half 42 of the multiprocessor system 29 of FIG. 4 access, and interact with, and control, the atomics block 55, the system memory 54, and the CPP interface block 44 via the system interface block 52. System interface block 52 includes an interface circuit 75 for interfacing to the AHB-S bus 71 from the first processor 30, and also includes an identical interface circuit 76 for interfacing to the AHB-S bus 77 from the second processor 31. Although not shown in FIG. 6, there is actually one such interface circuit for interfacing to each respective other ones of the six processors 30-35. Only two interface circuits are illustrated in FIG. 6 due to space limitations in the drawings, and the internal details of only one of the interface circuits are illustrated. In response to an incoming AHB-S bus transaction with its processor, the interface circuit for the processor outputs either a request for the atomics block, a request for the CPP interface block, or a request for the system memory. There are multiple such interface circuits, so the requests for the atomic block 55 from the various interface circuits are supplied to an arbiter 91 which in turn supplies requests to the atomics block 5 one at a time. Likewise, there are multiple such interface circuits, so the requests for the CPP interface block 44 from the various interface circuits are supplied to an arbiter 92 which in turn supplies the requests to the CPP interface block 44 one at a time. Likewise, there are multiple such interface circuits, so the requests for the system memory 54 from the various interface circuits are supplied to an arbiter 93 which in turn supplies the requests to the system memory 54 one at a time.

Operation of the interface circuit 75 for the first processor 30 is as follows. Interface circuit 75 includes input capture registers 78-82 and a Finite State Machine (FSM) circuit 83. FSM 83 in turn includes a read request state machine 84 and a write request state machine 85. The first processor 30 can use the AHB-S bus 71 both to write to as well as to read from the system interface block 52. In the case of the first processor 30 writing to the system interface block 52, consider an (AHB-S bus write bus operation in which there is a first address cycle followed by a data cycle. In the address cycle, the address to be written to is supplied from the processor 30 across the AHB-S bus 71 to the system interface block 52 of FIG. 6. The address bits HADDR[31:2] are captured in register 78. FSM 83 determines, based on the incoming AHB-S bus information (address and transaction type), the type of AHB bus operation it is and whether the first address cycle will be followed by one or more data cycles. Based on its determination, FSM 83 causes the write address parameters register 76 to be loaded with a 2-bit AP value. Based on the value of bit 23 of the incoming address, FSM 83 determines whether only thirty-two bits of address parameters from the first data cycle will be captured in the bottom thirty-bit positions of the 64-bit address parameter register 82, or whether those thirty-two bits will be captured in the address parameter register 82 on the first data cycle and then in addition another thirty-two bits from a next data cycle will be captured in the upper thirty-two bits of the 64-bit of address parameters register 82. Accordingly, the 2-bit AP value controls multiplexer 86. If the 2-bit AP value is "01", then the incoming thirty-two bit values of data bits of the first data cycle are loaded into the lower thirty-two bits of address parameter register 82 and the upper thirty-two bit values that were already in register 82 are looped around via conductors 87 so that the values in those upper bit positions in the address parameters register 82 are not changed. If the 2-bit AP value is "10", then the incoming thirty-two bit values of data bits of a second data cycle are loaded into the upper thirty-two bits of the address parameter register 82 and the lower thirty-two bit values that were already in the address parameters register 82 are looped around via conductors 88 so that the values in those lower bit positions will not be changed. If the 2-bit AP value is not "00" (it is "01" or "10"), then the address parameters input register 82 is enabled and can be parallel loaded, otherwise loading of register 82 is disabled. Address parameters register 82 outputs sixty-four bits of captured address parameter values that are captured in one or two data cycles in this way.

If the AHB-S bus operation is a write operation, then thirty-two bits of data incoming from the thirty-two AHB-S bus lines are captured into one 32-bit portion of the 128-bit "data line" register 81. The data line register 81 receives four enable bit values, one for each 32-bit portion of register 81. The incoming 32-bit data value is replicated into four 32-bit values, which pass in parallel onto the left 128-bit input of multiplexer 90. The multiplexer 90 is controlled to supply the leftmost 128-bit value onto the inputs of the data line register 81. According to the AHB-S bus protocol, the bytes of the 128-bit data line register 81 are writable on a byte-by-byte basis. Each byte-portion of the data line register 81 therefore receives its own input enable EN bit value. The request state machine 84 sets the sixteen enable EN bit values and therefore controls which byte or bytes are written. If the AHB-S bus operation is a write, the write could be: 1) a prompt to generate a CPP command, 2) a write to the shared memory 74 in the CPP interface block, 3) a prompt to send a request to the atomics block, 4) a read or write of certain configuration registers in the atomics block, or 5) a write to the system memory. The FSM 83 determines which one of these it is from the incoming address, and then when the data of the AHB-S bus operation has been loaded into data line register 81, then the FSM 83 causes the appropriate request to be generated. The request is supplied to the appropriate one of the combine blocks 94-96. The combine block that receives the request combines the data as output by the data line register 81 and the request, and outputs the overall request to the appropriate one of the three arbiters 91-93. Each such arbiter arbitrates such requests received from the six interface circuits of the six processors, and supplies the requests one at a time. Arbiter 91 supplies atomics requests to the atomics block 55. Arbiter 92 supplied CPP requests to the CPP interface block 44. Arbiter 93 supplies system memory requests to system memory 54.

If the AHB-S bus operation is a read operation, then the data to be read is in the data line register 81. The read request state machine detects that the AHB-S bus operation is a read, and from the address determines which of the four 32-bit portions of the data line value will be returned to the processor. The read request state machine outputs a 2-bit control value onto the select input lines of multiplexer 97 so that the proper 32-bit portion will be output onto the thirty-two lines of the AHB-S bus.

Figure 7:
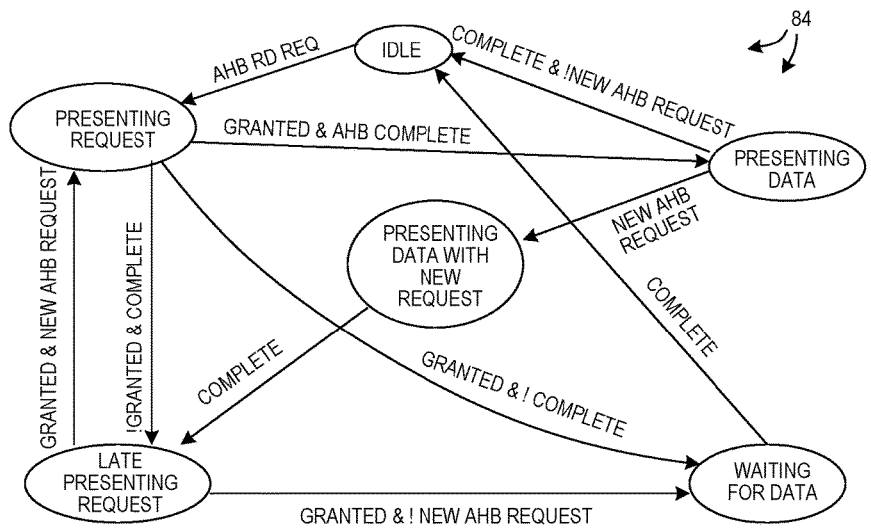
FIG. 7 is a state diagram of the read request state machine in the system interface block of FIG. 6.

FIG. 7 is a state diagram that shows the operation of the read request state machine 84.

Figure 8:
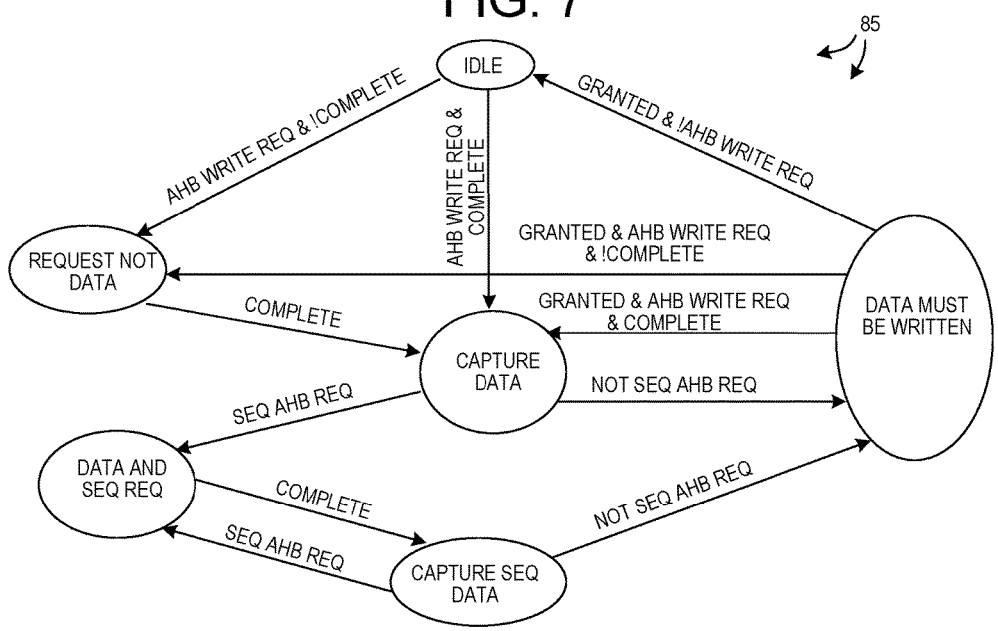
FIG. 8 is a state diagram of the write request state machine in the system interface block of FIG. 6.

FIG. 8 is a state diagram that shows the operation of the write request state machine 85.

Figure 9:
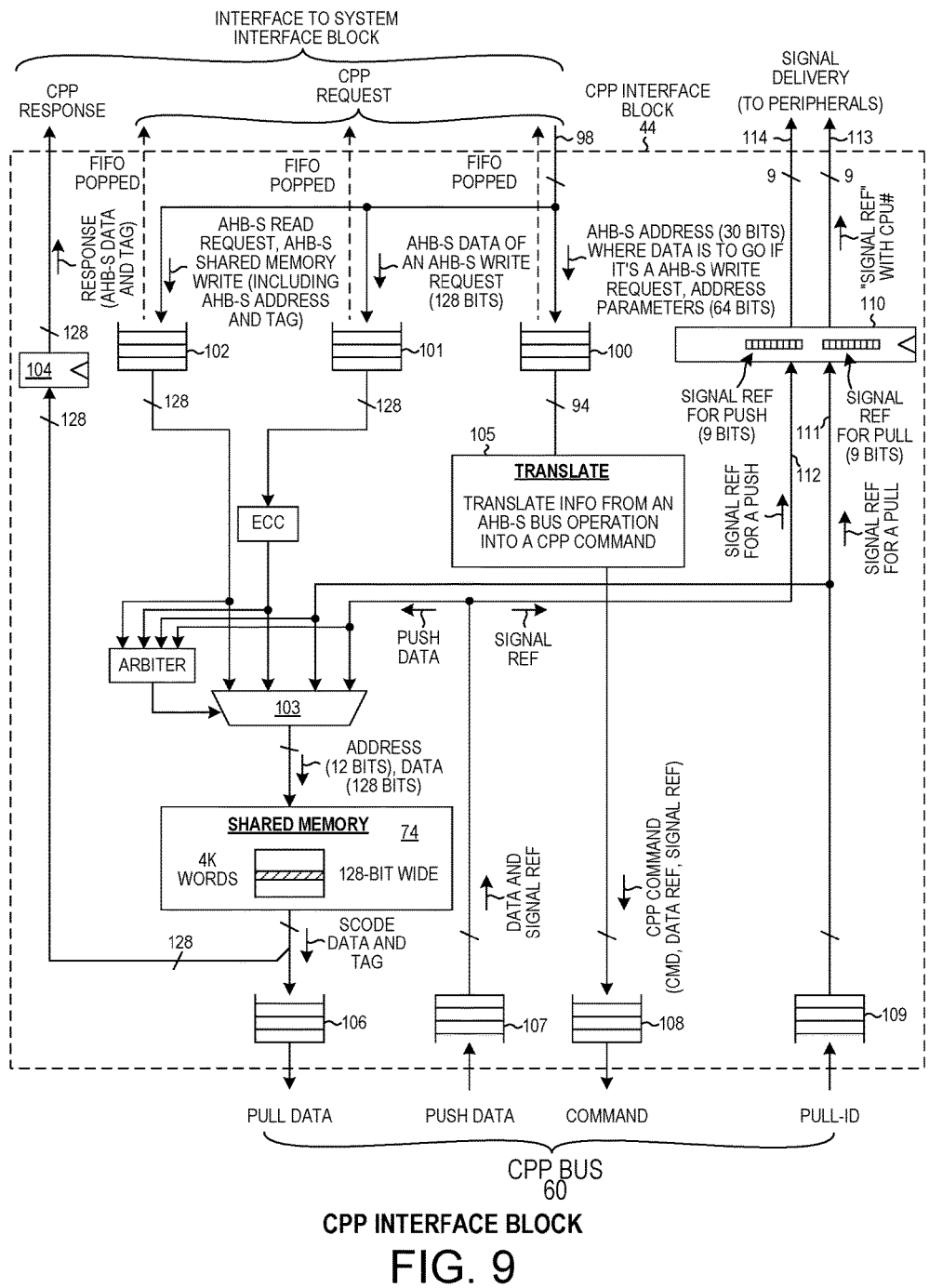
FIG. 9 is a diagram of the CPP interface block of the multiprocessor system of FIG. 3.

FIG. 9 is a diagram of the CPP interface block 44. Requests from the CPP interface arbiter 92 of the system interface block 52 of FIG. 6 are received via input conductors 98. The AHB-S request coming into the CPP interface block 44 of FIG. 9 from the system interface block 52 of FIG. 6 can be a read request or a write request, and depending on the address of the request (see the address map of FIG. 5), the access could be a prompt to the CPP interface block to generate a CPP command or could be to read or write the shared memory 74 in the CPP interface block. If the AHB-S operation is an AHB-S write into the address space for generating a CPP command to initiate a CPP bus transaction, then thirty bits of address (from address capture register 78) along with sixty-four bits of address parameters (from address parameters register 82) are ninety-four bits which are loaded into FIFO 100. If the AHB-S operation is a write into the shared memory 74 in the CPP interface block, the 128-bit data value for the write is loaded into FIFO 101. If the AHB-S operation is a read into the shared memory 74 in the CPP interface block, then the read request along with the AHB-S address and tag are loaded into FIFO 102. If the AHB-S operation is a write to shared memory 74 in the CPP interface block, then the address from FIFO 102 and the data from FIFO 101 are supplied through multiplexer 103 in the form of a write request to shared memory 74. Upon receiving the write request, the shared memory 74 writes the 128 bits of data into the location indicated by the address. If the AHB-S operation is a read of shared memory 74 in the CPP interface block, then the address from FIFO 102 is supplied through multiplexer 103 in the form of a read request to shared memory 74. Shared memory 74 outputs the addressed data which is then clocked into output register 104 before being returned to data line register 81. If, however, the AHB-S operation is a write to the address space that causes a CPP bus transaction to be initiated, then the translate circuit 105 generates a CPP bus command out of the information in FIFO 100. FIFOs 106-109 are for interfacing to the CPP posted transaction bus 60 (see FIG. 3).

In the case of a write CPP bus transaction, the CPP interface block 44 is a CPP bus master. The overall write CPP bus transaction is to write data into a CPP bus target circuit at an address indicated by the CPP command. The CPP write command is output from the command FIFO 108 onto the command mesh of the CPP bus. The CPP write command includes a 40-bit address value, a 14-bit data reference value, and a 7-bit signal reference value. The 14-bit data reference value is later usable by the master to determine where in the master the data is to be found. The target on the CPP bus receives the write command from the command mesh, and responds by posting a pull-id bus transaction value onto the pull-id mesh. The pull-id bus transaction value that is posted includes both the 14-bit data reference value that was sent to the target in the original CPP command as well as the 7-bit signal reference value from the original CPP command. The pull-id bus transaction value is communicated across the pull-id mesh of the CPP bus and is received onto the CPP interface block via FIFO 109. The 7-bit signal reference value of the pull-id bus transaction value is loaded into signal reference register 110. The 14-bit data reference field value is supplied via multiplexer 103 to the shared memory 74. Shared memory 74 uses the 14-bit data reference value as an address in the shared memory 74. The shared memory 74 uses the address to do a memory read access, thereby obtaining the data. The data is packaged into one or more CPP bus transaction values. Each of these CPP bus transaction values includes the 14-bit target reference value. The CPP bus transaction values (carrying the data) pass through FIFO 106, and back across a data mesh of the CPP bus to the target. The target receives the CPP bus transaction values (carrying the data). The target uses the 14-bit target reference value to identify the original CPP command. The original CPP command had the 40-bit address. The target then writes the data (the data portion of the CPP bus transaction values) into target memory at the location indicated by the 40-bit address field of the original CPP write command.

In the case of a read CPP bus transaction, the overall CPP bus transaction is to read data from a CPP bus target and to communicate that data across the CPP bus and to load that data into a particular place in shared memory 74. A CPP command is generated and is supplied into FIFO 108. The CPP command includes a 40-bit address value, a 5-bit length value, a 14-bit data reference value, and a 7-bit signal reference value. The 40-bit address value is the address in the target where the data is to be found. The master knows where in shared memory 74 the data to read should then be written into the master, so the master includes the 14-bit data reference value in the CPP command. This CPP command passes through FIFO 108 and across the command mesh of the CPP bus to the target. The target receives the CPP command and uses the 40-bit address value and the 5-bit length value to read the requested data. When the target has the data, it pushes the data back to the master (the CPP interface block) in one or more push data CPP bus transaction values. Each of these push data CPP bus transaction values has the 14-bit data reference value from the original CPP command. The last push data CPP bus transaction value also has the 7-bit signal reference value from the original CPP command. These push data CPP bus transaction values pass through FIFO 107. The 7-bit signal reference value is loaded into signal reference register 110. The 14-bit data reference value and the data passes to multiplexer 103. The 14-bit data reference value is an address into shared memory 74. The master then writes the data into this location in shared memory 74.

As illustrated in FIG. 9, if the overall CPP bus transaction was a pull and involved a signal reference value for a pull, then this signal reference value is communicated via conductors 111 and is loaded into a first part of signal reference register 110. The signal reference value as stored in register 110 for a pull is nine bits, rather than just seven bits, because it includes a valid bit and a double signal bit as well as the 7-bit signal ref value. If the overall CPP bus transaction was a push and involved a signal reference value for a push, then this signal reference value is communicated via conductors 112 and is loaded into a second part of signal reference register 110. The signal reference value for a push is nine bits, rather than just seven bits, because it includes a valid bit and a double signal bit as well as the signal ref value. The last two 9-bit push and pull signal reference values are therefore supplied out of signal reference register 110 and to the peripherals 56 and 57 as illustrated on FIG. 4.

Figure 10:
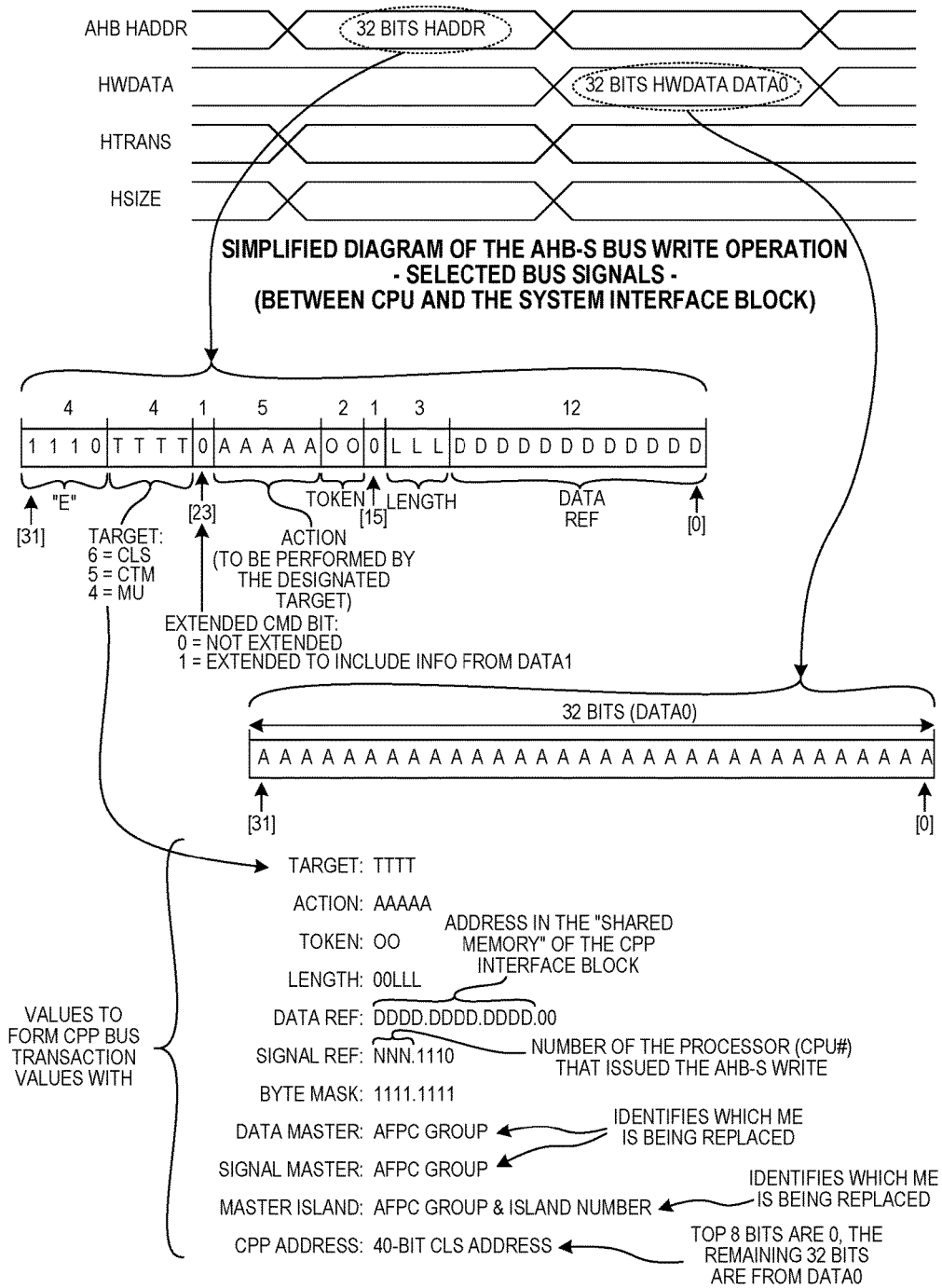
FIG. 10 is a diagram that illustrates how the system interface block form a CPP command bus transaction value from a single AHB-S bus write.

FIG. 10 is a diagram that illustrates how, in one example, the CPP interface block 44 of FIG. 9 converts information from an AHB-S write bus operation on the AHB-S bus (originating from a processor) into a CPP command that is then output via FIFO 108 onto the command mesh of the CPP posted transaction bus 60. At the top of the diagram of FIG. 10 is an illustration of a two-cycle write bus transaction on the AHB-S bus. In the first bus cycle, the processor outputs the 32-bit address value HADDR. In the second bus cycle, the processor outputs the 32-bit HWDATA data value. The middle part of the diagram illustrates the form of the 32-bit HADDR address value, and the form of the 32-bit HWDATA value. At the bottom of the diagram are illustrated the various fields of the resulting CPP command (a CPP bus transaction value). The various parts of the 32-bit address HADDR are used as indicated to form the various fields of the CPP command. See FIG. 30 for the form of a CPP command bus transaction value. The translate block 105 of FIG. 9 takes in the HADDR address value, and from these bits generates the CPP fields, and then outputs the CPP fields in the form of an assembled CPP command. The processor that originates the original AHB-S write, by controlling the address and data of the AHB-S bus write, also controls all the fields of the CPP command and therefore also determines the particular type of CPP command that is generated and control the location in shared memory 74 where return data will be written if the CPP command is a CPP bus read.

Figure 11A:
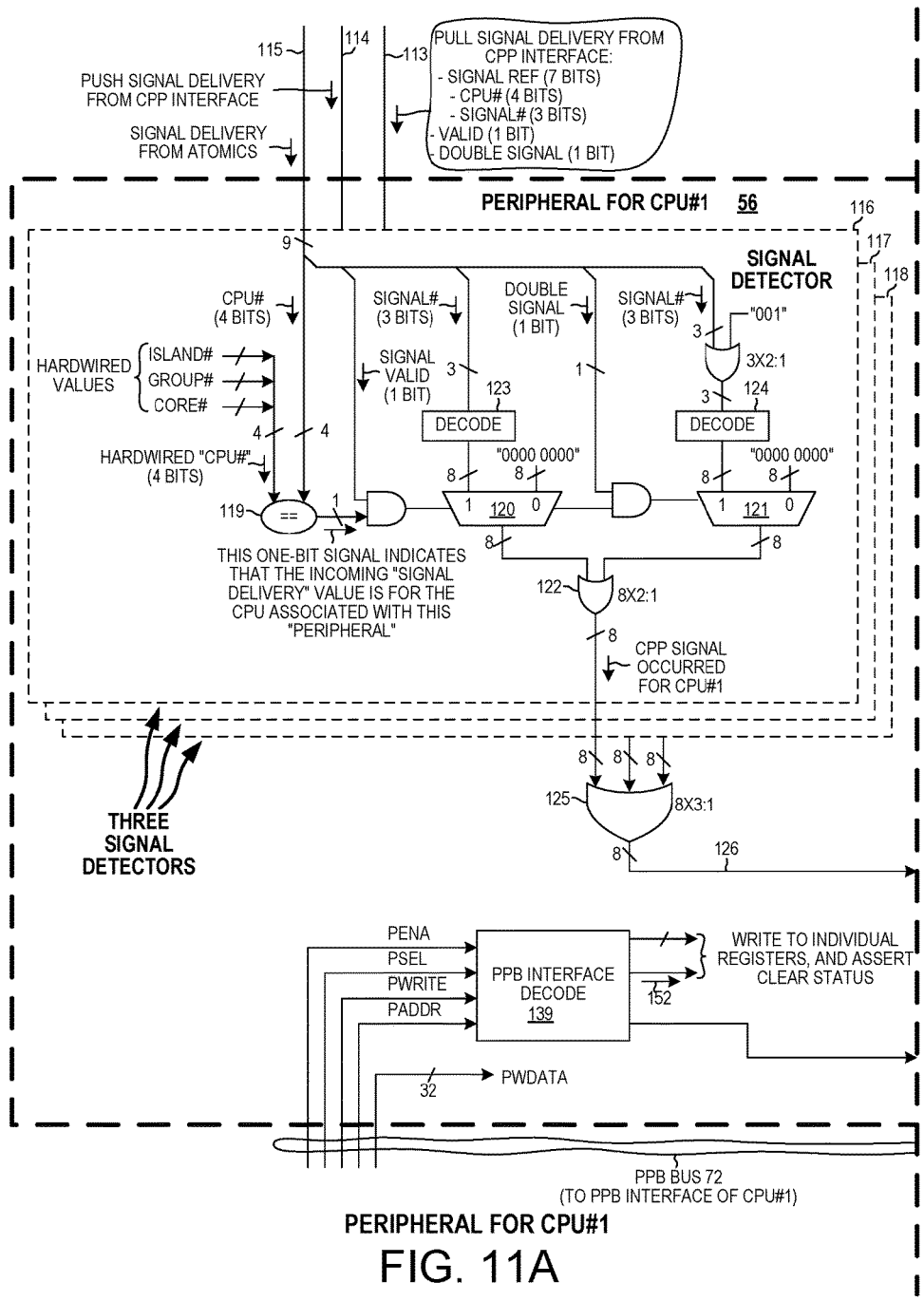
FIG. 11A is a left part of a larger FIG. 11.
Figure 11B:
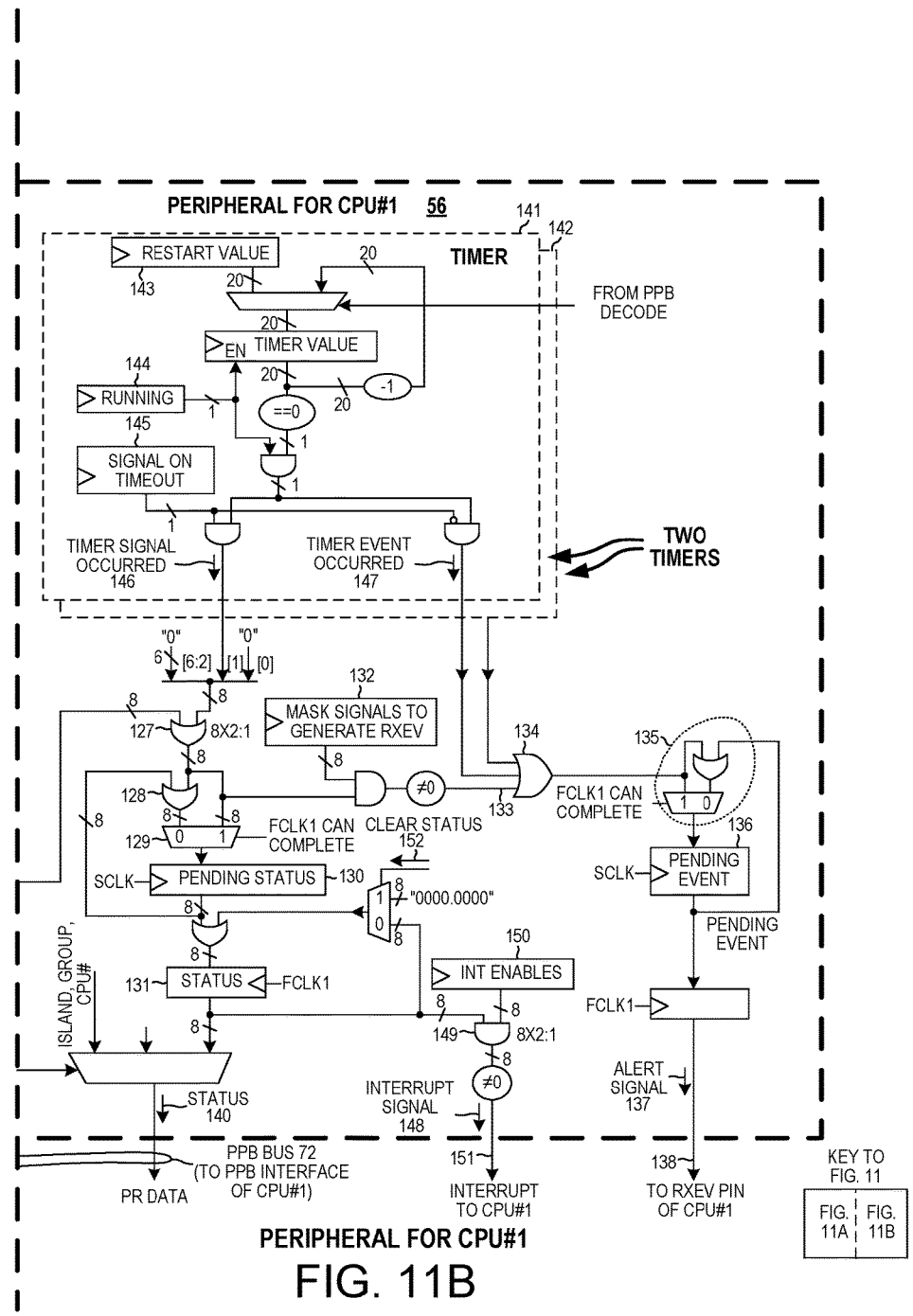
FIG. 11B is a right part of the larger FIG. 11.

FIG. 11 is a more detailed diagram of one of the peripheral circuits, peripheral circuit 56. All the peripheral circuits are of identical construction. Peripheral circuit 56 receives a 16-bit pull signal delivery value from the CPP interface block 44 via conductors 113, receives a 16-bit push signal delivery value from the CPP interface block 44 via conductors 114, and receives a 16-bit atomics signal delivery value from the atomics block 55 via conductors 115. As illustrated, each 16-bit signal delivery value includes: 1) a signal reference value (7 bits), 2) a valid bit (1 bit), and 3) a double signal bit (1 bit). The 7-bit signal reference value itself includes: 1) a CPU# (4 bits) and 2) a signal number (3 bits). As indicated on FIG. 4, all the peripheral circuits receive all the atomics signal delivery signal values, all the push signal delivery values, and all the pull signal delivery values. A particular peripheral circuit is associated with a particular CPU, and has a corresponding hardwired CPU number value (4 bits). Each incoming signal delivery value has a CPU number value (4 bits). The peripheral circuit ignores signal delivery values that do not have the CPU number that is hardwired into the peripheral circuit. The peripheral circuit therefore only acts on signal delivery values for the CPU that is associated with that particular peripheral circuit.

As illustrated in FIG. 11, peripheral circuit 56 includes a signal detector 116 for atomics signal delivery values, a signal detector 117 for push signal delivery values, and a signal detector 118 for pull signal delivery values. The three signal detector circuits 116-118 are identical, so the details of only one of them (signal detector 116) is illustrated. Comparator 119 compares the hardwired 4-bit CPU number of the peripheral circuit with the 4-bit CPU number of the incoming signal delivery value, and if they do not match then the comparator 119 outputs a digital zero value. This causes multiplexer 120 to output a "0000.0000" value and also causes multiplexer 121 to output a "0000.0000" value. The eight 2:1 OR gates 122 outputs the bit-wise OR of these values, and therefore also outputs a "0000.0000" value. This is an indication that no CPP signal occurred. If, however, the comparator 119 detects that the 4-bit CPU number of the incoming signal delivery value matches the hardwired 4-bit CPU number of the peripheral circuit, then the comparator 119 outputs a digital one value. Multiplexers 120 and 121 can then output non-zero values. The signal number (3 bits) of the signal delivery value is decoded by decoder 123 into an 8-bit value. If the valid bit of the incoming signal delivery value is asserted, then the decoded 8-bit value passes through multiplexer 120 and to the OR gates 122. The 3-bit signal number with its most significant bit asserted is decoded by decoder 124 into an 8-bit value. If the double signal bit is asserted, then the decoded 8-bit value passes through multiplexer 121 and to the OR gates 122. The OR gates 122 effectively combine the decode values for two detected signals. This same detection is performed by each of the other two signal detectors 117 and 118. The 8-bit output values of the three signal detectors 116-118 are bit-wise ORed by the 8×3:1 OR gates 125. OR gates 125 effectively combine the decoded signal detect signals from the three signal detectors. The particular bit or bits of the eight bits on conductors 126 that are set indicate the signal numbers of the signal delivery value that were detected. This is because in any one cycle, all three detectors can set signal bits, and also "double signal" can be set, so a plurality of signals can be delivered in a single cycle on conductors 126.

This 8-bit signal (that indicates the signal delivery occurrence) passes through OR gates 127, and OR gates 128, and multiplexer 129, and into the pending status register 130. Bits indicating detected signals are collected in this pending status register 130 over time. Upon the next FCLK1, the pending status value is clocked into the status register 131. Each of the eight bits of the value coming out of OR gates 127 is independently maskable by a corresponding mask bit in mask register 132. For example, by masking out all bits but one, the peripheral circuit may be made only to awaken the first processor 30 if a particular signal number is detected to have occurred. If any such unmasked signal bits is asserted, then the digital value on conductor 133 is asserted. This signal passes through OR gate 134, and circuitry 135, and into the pending event register 136. On the next FCLK1, the signal is communicated to first processor 30 in the form of an asserted alert signal 137. The pending event signal as it is output from pending event register 136, if asserted, will be deasserted due to circuitry 135, so that upon the next FCLK1 the alert signal 137 will return to the digital logic low level. The alert signal 137 therefore is asserted to a digital high logic level, and on the next FCLK1 it returns to the digital low logic level. The alert signal 137 is supplied via conductor 138 onto the RXEV input terminal 67 of the first processor 30 (see FIG. 4). The alert signal 137 received onto the RXEV terminal 67 causes the first processor 30 to stop operating in its sleep mode and to start operating in a non-sleep mode. First processor 30 can be programmed so that when first processor 30 awakens, it performs a PPB bus read to read the content of the status register 131 out of peripheral circuit 56 via PPB bus 72 and thereby to determine the cause of its being awakened. Upon the PPB bus read, if the address on the PPB bus 72 is correct, then the PPB interface decode circuit 139 enables the status value 140 onto the bus lines of PPB bus 72 so that the status value 140 will be returned to the first processor 30 as part of the PRDATA. In this way, the first processor 30 reads the status value 140 across PPB bus 72 and determines the signals that have occurred since the last reading of the status register 131.

The peripheral circuit 56 also includes two timers 141 and 142. The two timers are identical, so only the internal circuitry of timer 141 is illustrated. Each of the registers or bits 143-145 can be independently written by the first processor 30 via the PPB bus 72. The timer is programmable to operate in a single count down mode so that it automatically stops upon reaching a count of zero, or to operate in a continuous mode so that upon reaching a zero count it reloads the restart value and then begins counting down again. The timer can be started and stopped by writing to the running bit 144. The value on the signal on timeout bit 145 indicates whether, upon a timeout, a timer signal occurred signal 146 will be generated or whether a timer event signal 147 will be generated. Asserting the timer signal occurred signal 146 causes bit number one of the 8-bit value output by OR gates 127 to be asserted. Asserting of the timer event occurred signal 147 causes the alert signal 137 to be asserted.

Peripheral circuit 56 is also programmable to generate an interrupt signal 148 upon one or more of the status bits having been asserted. The 8-bit status value from status register 131 is supplied to the 8×2:1 AND gates 149. Each of the eight bits in the interrupt enables register 150 can mask (disable) a corresponding status bit from causing the interrupt signal 148 to be asserted. If any status bit as output by status register 131 is asserted and is not masked by its corresponding interrupt enable bit in the interrupt enables register 150, then the interrupt signal 148 will be asserted. The interrupt signal 148 is supplied to the first processor 30 via conductor 151. After servicing the interrupt, the first processor 30 can, via the PPB bus 72, write to a particular address and thereby cause the clear status signal 152 to be asserted, thereby clearing the status register 131 on the next FCLK1. The first processor 30, through the PPB bus 72, can write data into registers 132 and 150.

Figure 12:
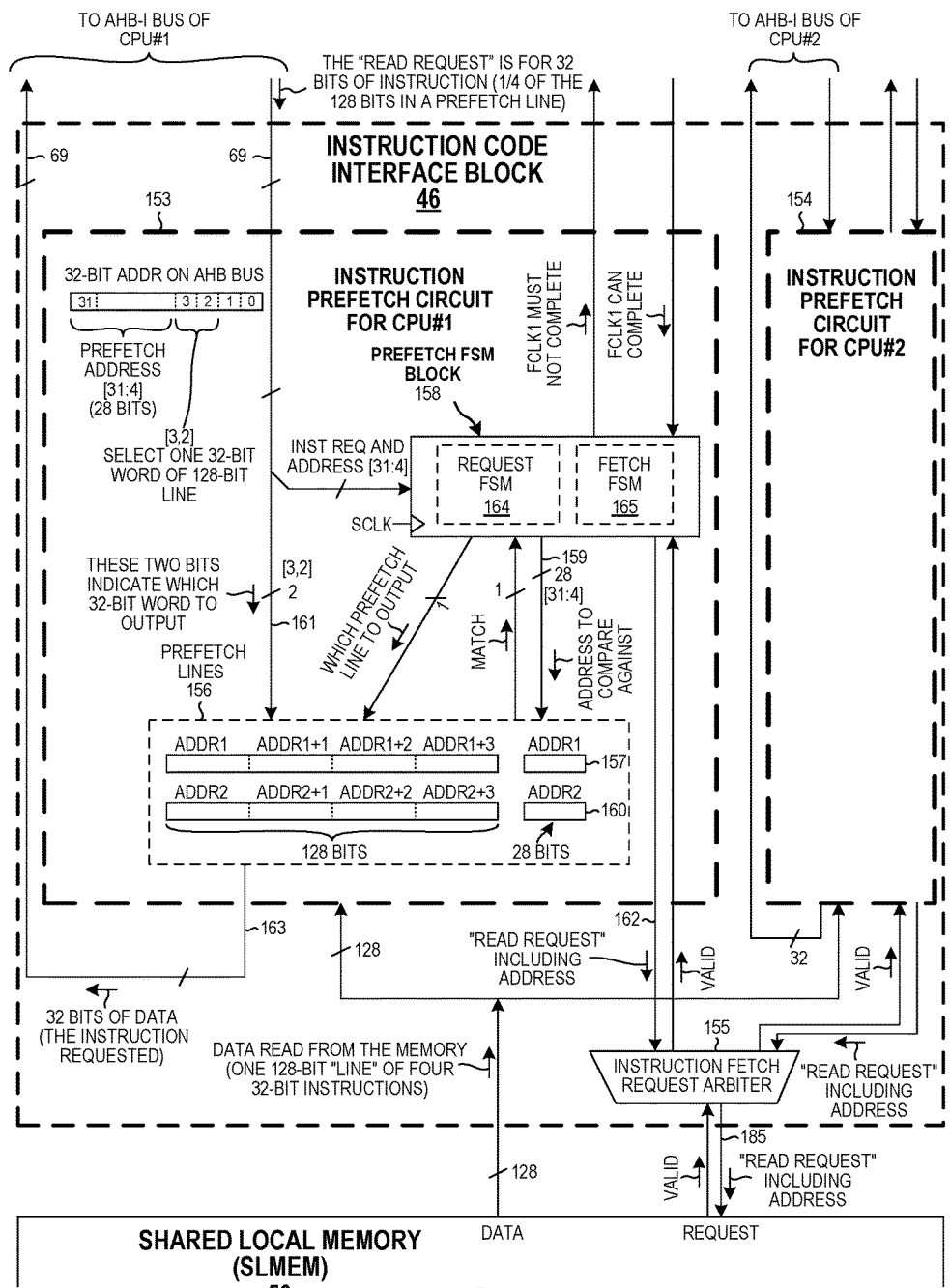
FIG. 12 is a diagram of the instruction code interface block of the multiprocessor system of FIG. 3.

FIG. 12 is a more detailed diagram of the instruction code interface block 46. The instruction code interface block 46 includes one instruction prefetch circuit for each processor. Two such instruction prefetch circuits 153 sand 154 are illustrated in FIG. 12. The internal circuitry of the instruction prefetch circuit 153 for the first processor 30 is illustrated. In addition to the instruction prefetch circuits, the instruction code interface block 46 also includes an instruction fetch request arbiter 155. If first processor 30 wishes to fetch an instruction, it presents a read request for the address of the instruction. This read request includes the address of the 32-bit instruction. The read request is a standard AHB-I read request that is received from the first processor 30 via the AHB-I bus 69. This request includes thirty-two bits of address, a transaction type, a size of transaction, a length of transaction. In response to this read request in a first FCLK1 cycle, the instruction code interface block 46 will return the 32-bit instruction requested by the end of the next FCLK1 cycle. If the requested 32-bit instruction is in the prefetch lines 156, then the instruction code interface block 46 will not cause FCLK1 to be gapped. But if the requested 32-bit instruction is not already present in prefetch lines 156, and if the instruction code interface block 46 has to read the instruction from the shared local memory (SLMEM) 50 before it can be supplied out of the prefetch lines 156 back to the first processor 30, then the instruction code interface block 46 will cause the clock signal FCLK1 to be gapped (held low) until the requested instruction is ready in the prefetch lines and is being output back to the first processor 30. When the requested instruction is being output on the conductors of the AHB-I bus 69 back to the first processor 30, then the instruction code interface block 46 will allow the clock signal FCLK1 to transition high to terminate the second FCLK cycle. The low-to-high transition of FCLK1 clocks the instruction into the first processor and completes the AHB-I bus fetch operation carried out by the first processor 30.

The instruction prefetch circuit 153 for first processor 30 stores two 128-bit values in the prefetch lines 156. Each 128-bit value is four consecutively addressed 32-bit instructions. The address of the first of these four 32-bit values is stored in a register 157 to the right of the associated upper prefetch line. For example, the address value ADDR1 is the address in this register 157. ADDR1 is the address for the first 32-bit value in the upper prefetch line, and the next three 32-bit values of that upper prefetch line have consecutive addresses of ADDR1+1, ADDR1+2, ADDR1+3. The prefetch FSM block 158 presents the address of the instruction being requested on conductors 159. The prefetch lines circuit 156 compares the address received to the ADDR1 value in register 157 and to the ADDR2 values in register 160 to determine if the 32-bit instruction value whose address has been presented (via conductors 159) is present in the prefetch lines circuit 156. If it is, then the single-bit "match" signal is asserted. The prefetch FSM block 158 indicates via the "which prefetch line to output" signal which of the two prefetch lines contains the requested value. The prefetch lines circuit 156 uses the two least significant address bits from conductors 161 along with the "which prefetch line to output" signal to output the proper 32-bit value onto conductors 163 so that the 32-bit value is in turn returned to the first processor 30 via the AHB-I bus 69. This all occurs without gapping the FCLK1 clock signal. The proper 32-bit value requested is present at the first processor 30 on the next rising edge of FCLK1.

If, however, upon presenting the address to the prefetch lines circuit 156 via conductors 159 the match signal is not asserted (indicating that the requested 32-bit instruction is not in the prefetch lines), then the "FCLK1 must not complete" signal is asserted. This causes the FCLK1 signal that is supplied to the first processor to be gapped (the next rising edge of FLCK1 to be delayed). Meanwhile, a "read request" that includes the address of the first 32-bit value of a 128-bit line is supplied via conductors 162 to arbiter 155. There is one such "instruction prefetch circuit" for each processor, so all such "read requests" from all the "instruction prefetch circuits" are received by the arbiter 155. The arbiter 155 outputs the "read request" to SLMEM 50. SLMEM 50 returns the 128-bit line (four 32-bit values) and asserts the "valid" signal. The 128-bit value is loaded into a line of the prefetch lines circuit 156. When the 128-bit line (four 32-bit values) is loaded into the prefetch lines circuit 156, then the address value in the associated register (157 or 160) is updated so that it is the address of the first 32-bit value of the 128-bit line. When the 128-bit line is in the prefetch lines circuit 156 and the associated register has been updated to contain the address of the first 32-bit value of the line, then the match is detected and the match signal is asserted. This causes the prefetch FSM block 158 to deassert the "FCLK1 must not complete" signal. The prefetch lines 156 uses the two least significant address bits from conductors 161 along with the "which prefetch line to output" signal to output the proper 32-bit value onto conductors 163 so that the 32-bit value is in turn returned via the AHB-I bus 69 to the first processor 30. The deasserting of the "FCLK1 can complete" signal allows the FCLK1 to transition high. The 32-bit requested instruction value is clocked into the first processor at this time to conclude the fetch transaction on the AHB-I bus 69.

The prefetch FSM block 158 actually includes two state machines, the request state machine 164 and the fetch state machine 165. The AHB-I bus 69 is a pipelined bus in that one request can be getting its data back in the same FCLK1 cycle that a second request is being initiated. The two state machines 164 and 165 are provided to handle this pipelining. The two state machines 164 and 165 are tightly coupled. The request state machine 164 is driven by the AHB-I bus 69. It tracks what the AHB-I bus has asked for. The fetch state machine 165 is driven by the SLMEM 50. It tracks requests that go to the SLMEM until those requests are handled.

Figure 13:
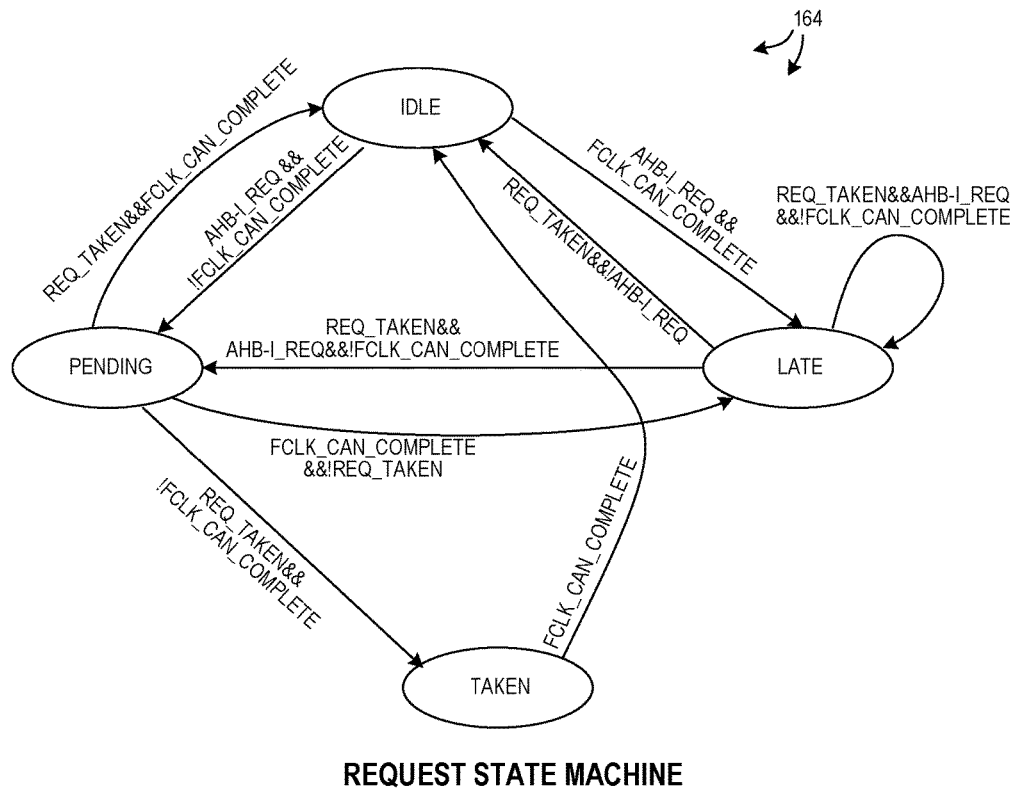
FIG. 13 is a diagram of the request state machine of the instruction code interface block of FIG. 12.

FIG. 13 is a state diagram for the request state machine 164. The "late" state is a state that is occupied if the current FCLK1 cycle is the FCLK1 cycle after the FCLK1 cycle in which a read request was made, and if the instruction code interface block 46 is busy during this second FCLK1 cycle trying to get the requested instruction. This is the condition in which the FCLK1 is gapped in order to slow the first processor so that the requested instruction can be obtained by the time of the next rising edge of FCLK1. The "taken" state refers to a "taken" signal that is internal to the prefetch FSM block 158.

Figure 14:
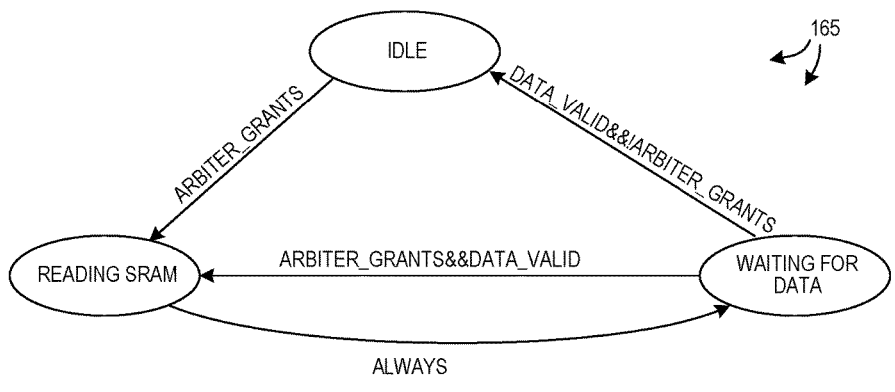
FIG. 14 is a diagram of the fetch state machine of the instruction code interface block of FIG. 12.

FIG. 14 is a state diagram for the fetch state machine 165.

Figure 15:
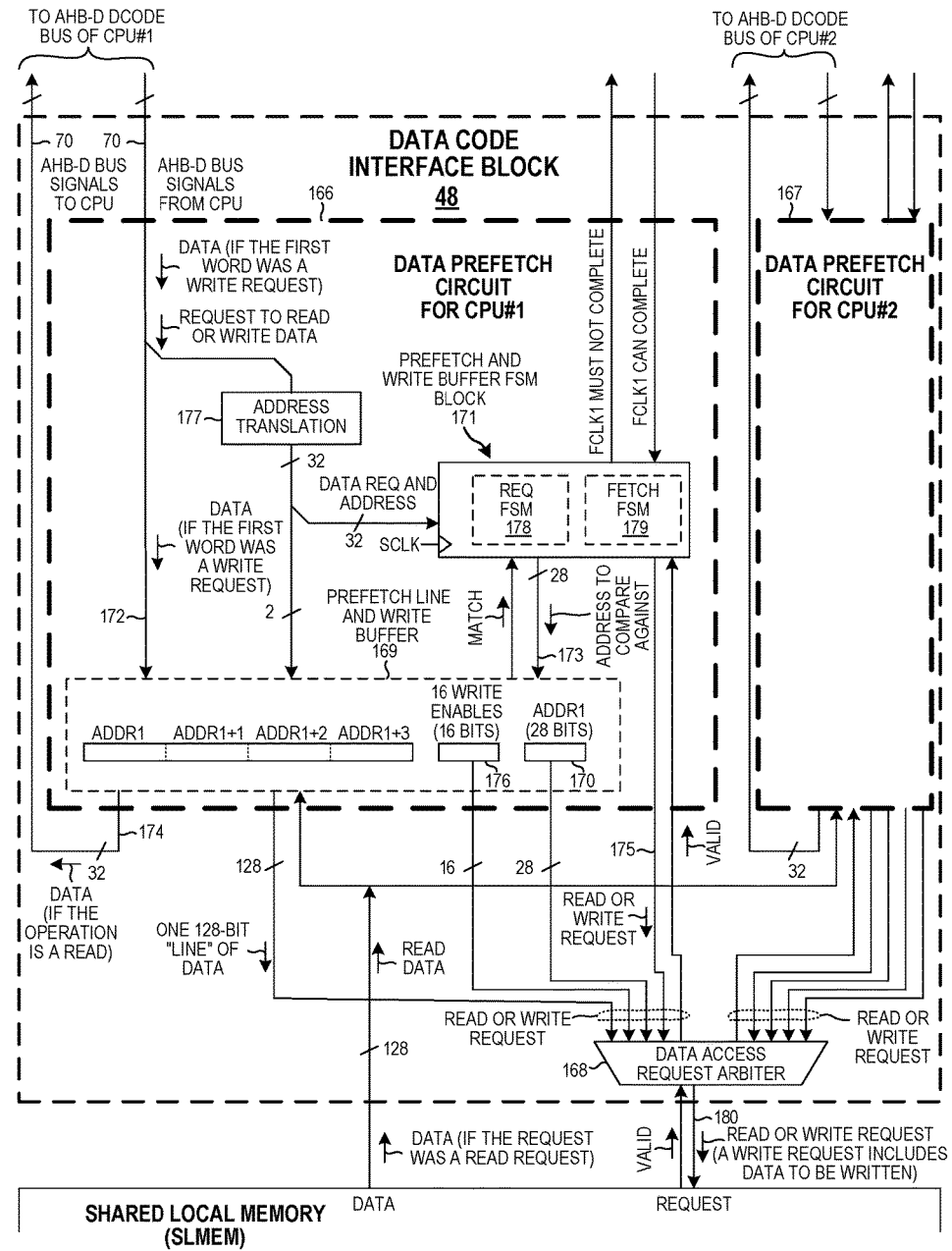
FIG. 15 is a diagram of the data code interface block of the multiprocessor system of FIG. 3.

FIG. 15 is a diagram of the data code interface block 48. The data code interface block 46 includes one data prefetch circuit for each processor. Two such data prefetch circuits 166 and 167 are illustrated in FIG. 12. The internal circuitry of the data prefetch circuit 166 for the first processor 30 is illustrated. In addition to the data prefetch circuits, the data code interface block 46 also includes a data access request arbiter 168. Unlike the instruction code interface block 46, the data code interface block 48 handles write requests as well as read requests. The data code interface block 48 allows one processor to initiate a data read via the data code interface block 48 at the same time that a write operation previously initiated by another processor is being completed.

For an AHB-D bus read operation, the data code interface block 48 operates much like the instruction code interface block 46 operates in the case of an AHB-I bus read operation. The prefetch line and write buffer 169 includes one 128-bit line of four prefetched 32-bit data values. The prefetch line and write buffer 169 also includes a register 170. The register 170 stores the address of the first 32-bit portion of the 128-bit line. In the case of the first 32-bit portion having an address of ADDR1, this ADDR1 value is stored in register 170. The next 32-bit portion of the line has address ADDR1+1, and the next 32-bit portion of the line has address ADDR1+2, and the next 32-bit portion of the line has address ADDR1+3. The data read request that includes the address of the 32-bit portion requested is received via the AHB-D bus 70. The upper 28-bits of the address are supplied to the prefetch and write buffer FSM block 171. The two least significant bits of the address are supplied directly to the prefetch line and write buffer 169 via conductors 172. The prefetch and write buffer FSM block 171 supplies the 28-bits address to the prefetch line and write buffer 169 via conductors 173. The prefetch line and write buffer 169 compares the incoming requested 28-bit address to the 28-bit address stored in register 170 and determines if the requested 32-bit data value is stored in the 128-bit prefetch line. If it is, then the prefetch line and write buffer 169 asserts the match signal. In addition, the prefetch line and write buffer 169 uses the 28-bit address along with the two least significant address bits from conductors 172 to identify the requested 32-bit data value, and to output the requested 32-bit data value onto conductors 174 for communication back to the requesting first processor 30 via the AHB-D bus 70. All this occurs without causing FCLK1 to be gapped. The read request is made in a first AHB-D bus cycle and the requested data is returned to the requesting processor on the next AHB-D bus cycle.

If, on the other hand, the requested 32-bit data value is not present in the 128-bit prefetch line and write buffer 169, then the prefetch line and write buffer 169 desasserts the match signal. The prefetch and write buffer FSM block 171 causes FCLK1 to be gapped by asserting the "FCLK1 must not complete signal". It also outputs a read request via conductors 175 to the data access request arbiter 168. Because there are six processors coupled to the data code interface block 48, there are six data prefetch circuits, and there are up to six such access requests that may be presented to the data access request arbiter 168 at a given time. The data access request arbiter 168 forwards the read data request to SLMEM 50. SLMEM 50 responds by returning 128 bits of data and by asserting the valid signal. The 128 bits of data are loaded into the 128-bit line of the prefetch line and write buffer 169, and the address of the first 32-bit portion of the data is loaded into register 170. At this point, the prefetch line contains the requested data so the match signal is asserted. In response, the prefetch and write buffer FSM block 171 deasserts the "FCLK1 must not complete" signal" so that FCLK1 will no longer be gapped. The requested data is supplied via conductors 174 via the AHB-D bus 70 back to the first processor 30. The requested data on the AHB-D bus 70 is clocked into the requesting first processor 30 on the next rising edge of FCLK1.

A processor, such as first processor 30, may engage in a type of AHB-D bus transaction called a sequential write. In a sequential write, up to four individual bytes of a 128-bit line of data can be individually written in a first AHB-D bus cycle, then up to four other bytes can be written in next AHB-D bus cycle, and then up to four other bytes can be written in next AHB-D bus cycle. To handle this type of sequential write operation without slowing the processor, the prefetch line and write buffer 169 includes sixteen write enable bits 176. These bits record which bytes of the 128-bit prefetch line contain newly written byte values that have not yet been written into SLMEM 50. After the sequential write has been completed as determined by the prefetch and write buffer FSM block 171, the prefetch and write buffer FSM block 171 outputs a write request to write all the flagged bytes at the same time in one write operation into SLMEM 50. The write request to SLMEM 50 includes the address of the first 32-bit portion of the entire 128-bit line, and the 128-bits of data from the prefetch line and write buffer 169, and the sixteen write enable bits indicating which bytes of the line of data should be overwritten in SLMEM 50.

SLMEM 50 responds by writing only the flagged byte values into the corresponding byte locations in the SLMEM. In responding to such an AHB-D write request, the data bytes of each successive AHB-D bus cycle can be written into the prefetch line and write buffer 169 without delay, so FCLK1 need not be gapped.

The same instructions are fetched out of SLMEM 50 and are executed by each of the six processors. If multiple processors were to execute the same instruction that involved their stacks, there would be a conflict. By executing the instruction, one processor would overwrite the contents of the stack of the other processors, and vice versa. Address translation circuit 177 is provided to solve this stack conflict problem. The data prefetch circuit for a given processor is aware of the CPU number of its associated processor. If this data prefetch circuit receives a data access request for a particular address subspace, then the address translator 177 replaces some of the address bits with other address bits. For example, the address of an access request for the stack address subspace received from the first processor is modified so that the stack address subspace starts at SLMEM address 1000, whereas the address of an access request for the stack address subspace received from the second processor is modified so that the stack address subspace starts at SLMEM address 2000, and so forth for the various requesting processors. This modification or translation of the address of an access request is only done for a particular subpart of the address space used to store stack data. Data stored in part of the data address space in the SLMEM is shared between the processors whereas a processor's stack data is not shared with any other processor.

Prefetech and write buffer FSM block 171 includes a request state machine 178 and a fetch state machine 179. The two state machines 178 and 179 are tightly coupled. The two state machines are slightly more complex than the state machines 164 and 165 of the instruction code interface block 46 because the state machines 178 and 179 of the data code interface block 48 handle both reading from and writing to the SLMEM. When a request is received onto the data code interface block 48 from the AHB-D bus, the request is supplied to the state machine 178 which in turn determines whether the incoming AHB-D request is a read request or a write request. If the incoming AHB-D request is a write request, then the write data will be valid in the next cycle and the FCLK1 of the first processor 30 will not be gapped. The fetch state machine 179 handles the prefetch line and write buffer 169 and handles the recording of which bytes of data have been written into the 128-bit prefetch data line. When the request state machine 178 is not requesting access to the prefetch line and write buffer 169, and when there is a WE bit set indicating there exist at least one dirty byte in the prefetch line, then the fetch state machine 179 may output a request to write to the SLMEM so that the data bytes that are indicated as dirty by the WE bits can be written into the SLMEM. Such a write request includes the full 128 bits of data in the prefetch data line but also includes the sixteen WE bits. The fetch state machine 179 determines that it will generate such a write request if any WE bits are set and if after a sequential AHB-D write request into the prefetch data line there is an idle, or if the next AHB-D request is an AHB-D read request, or if the next AHB-D request is write request to a different address.

Figure 16:
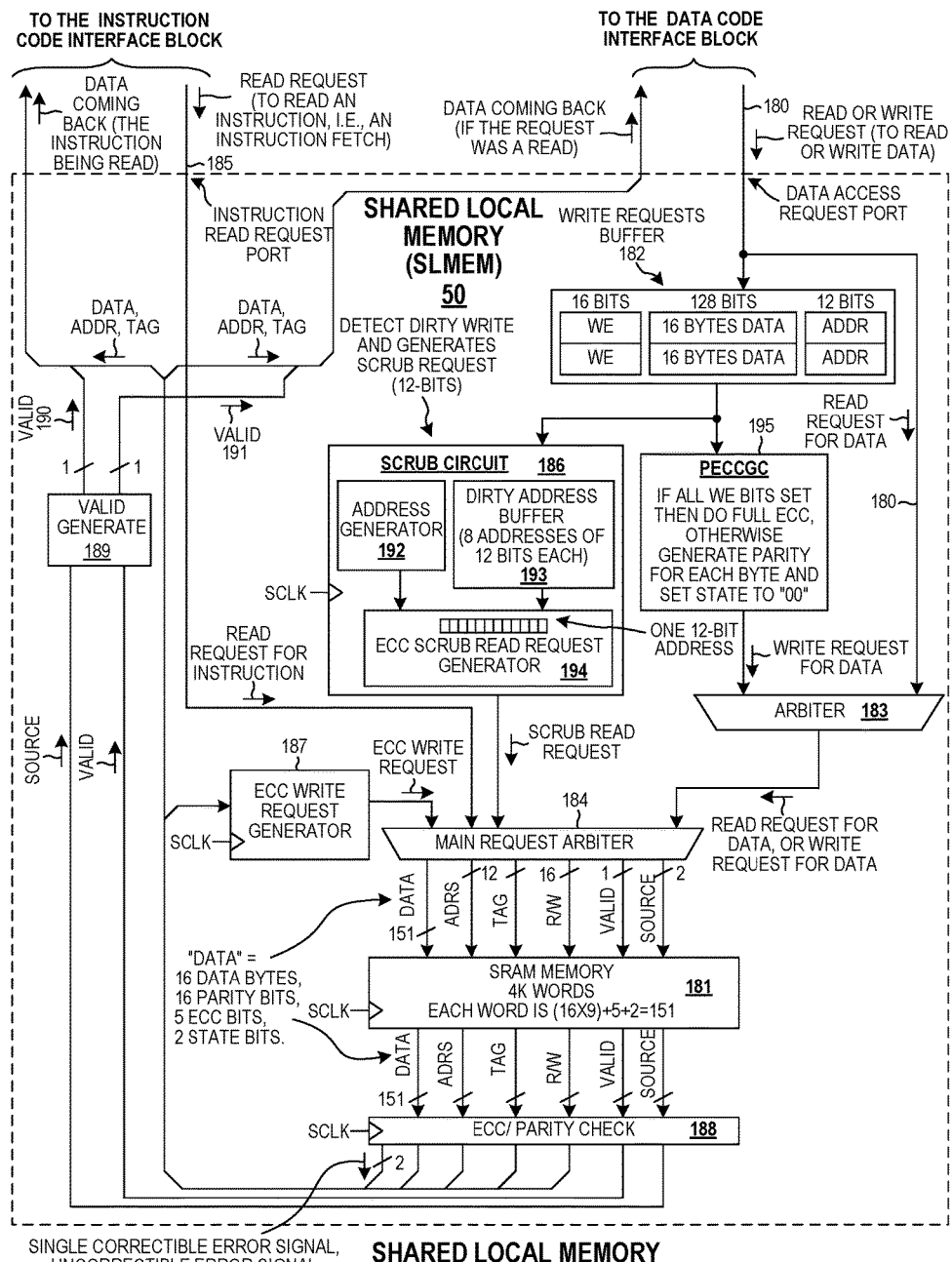
FIG. 16 is a diagram of the Shared Local Memory (SLMEM) block of the multiprocessor system of FIG. 3.

FIG. 16 is a diagram of the Shared Local Memory (SLMEM) 50. If data is stored in the memory over the long term, the SLMEM memory provides what is called "single error detection and correction and double error detection" (SECDED) for each 16-byte line of data stored. SLMEM 50 services read requests and write requests that are received from data code interface block 48. An incoming request from the data code interface block 48 is received via conductors 180. If the request is a read request, then request includes an indicator of read or write along with a 12-bit address. It also includes a tag indicating which processor originally requested the data from the data code interface block 48. In response, SLMEM 50 reads the addressed 128-bit long line of data from its SRAM 181 and returns the data back to the data code interface block 48 so that the data interface block can in turn return it to the processor. An incoming write request from the data code interface block 48 includes the indicator of read or write, along with a 12-bit address indicating where in SRAM 181 the data is to be written, a 128-bit line of data, and sixteen write enable bits. SLMEM 50 is to write the 128 bits of data into the location in SRAM 181 indicated by the 12-bit address. Up to two incoming write requests can be buffered in a write requests buffer 182 at a given time. A write request from the write request buffer 182 is presented to an arbiter 183. Incoming read requests from the data code interface block 48 have higher priority than do write requests, so such a read request passes via conductors 180 past the write requests buffer 182 and directly into arbiter 183. Arbiter 183 outputs a request and supplies that request to the main request arbiter 184.

SLMEM 50 is also to service read requests received from the instruction code interface block 46. An incoming read request from the instruction code interface block 46 is received via conductors 185. Because the request is from the instruction code interface block 46, it is a request to read a line of instruction information. The instruction read request includes a 12-bit bit address, and a tag indicating the processor that originally requested the instruction from the instruction code interface block. The instruction read request and is supplied to the main arbiter 184.

The main request arbiter 184 also receives "scrub read requests" from a scrub circuit 186 as described in further detail below. The main request arbiter 184 also receives "ECC write requests" from an "ECC write request generator" 187 as described in further detail below.

The main request arbiter 184 receives access requests from these sources and outputs access requests to SRAM 181. The main request arbiter 184 grants requests in the following order of priority, from highest to lowest priority: ECC write requests, read requests for instructions, scrub read requests, and access requests (read and write) for data.

An access request as received by SRAM 181 includes: 1) a 12-bit address, a tag that indicates the processor requesting the access (if the request is for information to be returned to a processor), 2) 128 bits of data if the request is a write request, 3) a R/W indicator of whether the request is a read request or a write request, 4) sixteen write enable bits, 5) a valid bit, and 6) a source indicator indicating whether the request was received from the instruction code interface block 46 or from the data code interface block 48. Two SCLK cycles are required for SRAM 181 to perform the read or write. In the event the request is a read request, the SRAM outputs: 1) the 12-bit address, 2) the tag indicating the number of the originating processor, 3) one 151-bit word of data, 4) the R/W indicator, 5) the valid bit, and 6) the source indictor indicating the source of the request.

Figure 17:
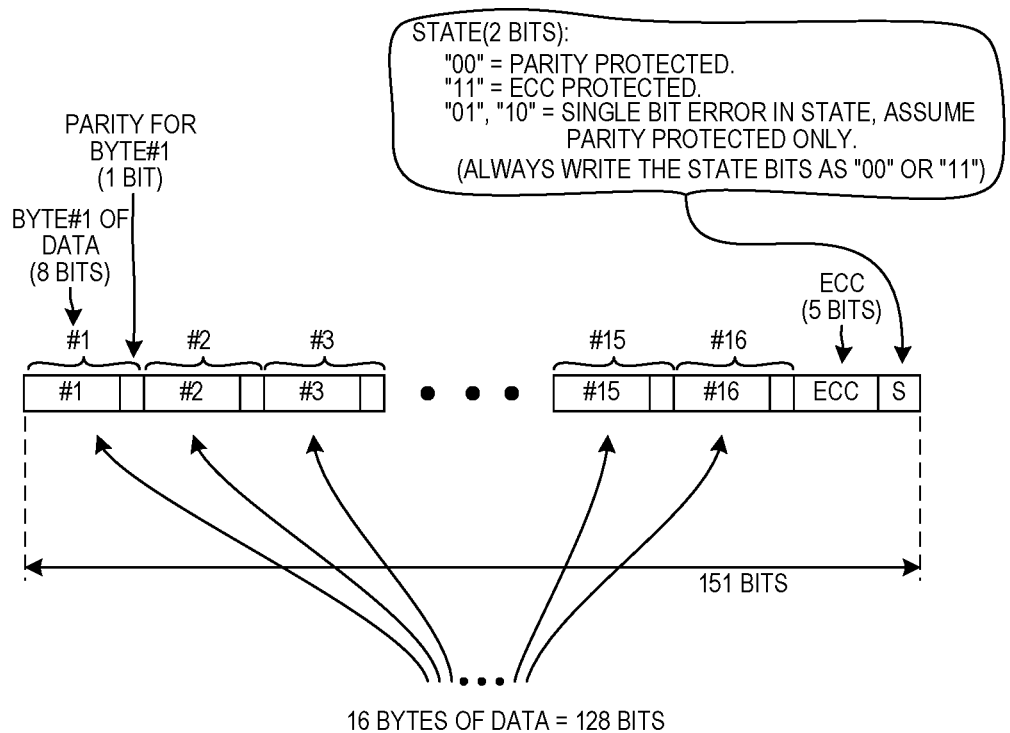
FIG. 17 is a diagram that illustrates one 151-bit word as it is stored in SRAM in the SLMEM of FIG. 16.

FIG. 17 illustrates the form of one 151-bit word as stored in memory 181. The 151-bit word includes: 1) one 128-bit line of data stored as sixteen bytes, 2) sixteen parity bits (one parity bit for each byte of data), 3) five ECC bits, and 4) two state bits. The SRAM 181 includes registers for carrying along the address and other parameters so that when the 151-bit word of data is ready to be output from the SRAM (if the access request is a read) it will be output along with its address and other parameters.

An "ECC/parity check" circuit 188 receives the 151-bit data line and the other information from SRAM 181. It performs error correction and detection and outputs a 151-bit word (a 128-bit line of data, along with 16 parity bits, and 5 ECC bits, and two state bits). It also passes through the 12-bit address, the tag, the R/W indicator, the valid bit, and the source indictor. The ECC/parity check circuit 188, however, also outputs a "single correctible error" bit signal, and an "uncorrectible error" bit signal. If the ECC/parity check circuit 188 detected an error that can be corrected, and if the ECC/parity check circuit 188 then corrected the data and is outputting corrected data, then the "single correctible error" bit is set. If, however, the ECC/parity check circuit 188 detected an uncorrectable error, then the "uncorrectable error" bit is set.

If the read request was received from the instruction code interface block 46, then the 128-bit line of data as it is being output by the ECC/parity check circuit 188 is to be returned to the instruction code interface block 46. The tag that passed through the ECC/parity check circuit 188 along with the read data indicates the particular processor that originated the read request, and therefore is used by the instruction code interface block 46 to identify which one of the "instruction prefetch circuits" (see FIG. 12, there is one for each processor) will load the data. If the read request was received from the data code interface block 48 then the 128-bit line of data and a tag is to be returned to the data code interface block 48. The tag indicates the processor that originated the request, and therefore is used by the data code interface block 48 to identify which one of the data prefetch circuits (see FIG. 13, there is one for each processor) will load the data. The information output from the SLMEM port that is coupled to the instruction code interface block 46 includes a valid bit, which if set indicates that the information on that port is valid and should be loaded into the instruction code interface block 46. Likewise, the information output from the SLMEM port that is coupled to the data code interface block 48 includes a valid bit, which if set indicates that the information on that port is valid and should be loaded into the data code interface block 48. The source indicator that is carried along with the request and that is output by the ECC/party check circuit 188 is supplied to a valid generate circuit 189. The valid generate circuit 189 uses the source indicator to generate the valid signals 190 and 191 that are supplied to the two ports of SLMEM 50. At most one of the valid signals 190 and 191 is asserted at a given time. The one that is asserted indicates the intended destination for the data being output by the ECC/parity check circuit 188. If valid signal 190 is asserted then the data is to be received by the instruction code interface block, whereas if valid signal 191 is asserted then the data is to be received by the data code interface block. As explained above, the tag is used by the interface block to direct the data to the appropriate processor.

Periodically, each 151-bit word of SRAM 181 should be read, and its ECC value used to detect errors and if possible to correct any errors found. If a detected error in a word can be corrected, then the correct 151-bit word should be determined. This correct 128 bits of data (along with the correct five ECC bits and the correct sixteen parity bits and the state bits of "11") should be written back into the SRAM word location pointed to by the address. Scrub circuit 186 initiates such read and writeback operations by outputting scrub read requests. An address generator circuit 192 generates a next sequential 12-bit address so that the addresses generated sequentially over time step through all the word locations in SRAM 181. Every 10 microseconds, scrub circuit 186 outputs a "scrub read request" that is a request to read the next sequential address.

Scrub circuit 186 also outputs another type of scrub read request. If a write from the write requests buffer 182 is to be performed into memory 181 on less than an entire 128-bit line of data, and if the associated 5-bit ECC value is to be calculated using all the bits of the 128-bit line of data, then a read-modify-write operation would conventionally be required. In the read portion of the read-modify-write operation, the portion of the 128-bit line that is not to be changed due to the writing would be read out of the SRAM. This read out portion of the 128 bits of data would then be considered together with the new data to be written, and using this complete 128 bits of data a 5-bit ECC value would be generated. In the write portion of the read-modify-write operation, the entire line of 128 bits of data along with its then known 5-bit ECC value would be written back into the SRAM. Unfortunately, such a read-modify-write involves delay. The delay of having to do such a read-modify-write operation is to be avoided.

In accordance with one novel aspect, if less than one entire 128-bit line of data (sixteen data bytes) is to be written, then the partial write is done into one of the lines in the write requests buffer 182. Each new byte to be written is flagged by setting a corresponding write enable (WE) bit in the write requests buffer 182. Each byte of the 128-bit write buffer has a corresponding WE bit so there are 16 WE bits. If the WE bit of a byte is set, this indicates that the contents of the corresponding byte within the line is to be written into SRAM, whereas if the WE bit of a byte is not set then this indicates that the contents of the corresponding byte in SRAM should not be changed or overwritten. Such a partial write into the 128-bit write buffer (from the "data code interface block") happens in one clock cycle without delay and without forcing the writing device (the "data code interface block" in this case) to perform any read-modify-write operation. Then later the flagged bytes of data are transferred from the write requests buffer 182 and into the addressed word in SRAM 181. Write requests buffer 182 is therefore said to be a coalescing buffer. A parity bit is computed for each new byte to be written into SRAM 181, and the nine bits for the byte are written together (the eight new bits of the data byte and the one parity bit). The five ECC bits for the overall 128-bit line of data are written as zeros, and the last two "state" bits are written to be "00". These "00" state bits indicate that the 151-bit word in SRAM 181 is "dirty". It is "dirty" in that when it was written, its five ECC bits were wrong and were written as all zeros. At the time the 151-bit word was written, a correct 5-bit ECC value could not be generated because the generation of the 5-bit ECC value would have required the ECC generating circuit to know all the 128-bits of the newly written line, and data bytes that were stored in SRAM that were not to be overwritten would not at that time have been known to the ECC generating circuit. Accordingly, when the 151-bit word is written as "dirty" into SRAM 181 in this way, its 5-bit ECC field is written at "00000", and its two state bits are set to "00". State bits of anything other than "11" indicate "dirty".

In addition to writing to the 151-bit word into SRAM 181 and making it "dirty", the address of the "dirty" word in the SRAM is recorded in a "dirty address buffer" 193. The "dirty address buffer" 193 records the address of each such "dirty" SRAM word. At a later time, within about ten SCLK clock cycles, an "ECC scrub read request" circuit 194 pulls one of the addresses out of the dirty address buffer 193 and uses it to output a "scrub read request". The "scrub read request" is a request to read the dirty word out of SRAM. The "source" identifier of the "scrub read request" indicates that the source of the request is scrub circuit 186. Such a "scrub read request" causes SRAM 181 to read and to output the addressed 151-bit word of data, and the word of data comes out of SRAM 181 along with the source indicator indicating that the data is due to a scrub read request.

Upon an SRAM read, the "ECC/parity check" circuit 188 receives the bits from the SRAM (the 128 bits of data, the 16 parity bits, the 5 ECC bits, and the two state bits). If the state bits of the data line are read as "11" and the source indicator indicates that the read request was from the scrub circuit, then the "ECC/parity check" circuit 188 calculates five ECC bits from the data read out of SRAM 181. It compares those calculated five ECC bits with the five ECC bits that were read out of the SRAM. If there is a difference between the computed ECC bits and the stored ECC bits, then the "ECC/parity check" circuit 188 generates 128 bits of corrected data if it can. It also sets the "single correctible error" bit and the "uncorrectable error" bit as appropriate. Provided that no "uncorrectible error" was detected, the "ECC/parity check" circuit 188 outputs 130 bits (the 128 bits of data that is potentially corrected, the "single correctible error" bit, and the "uncorrectable error" bit) along with a valid bit. If, however, the difference between the computed ECC bits and the stored ECC bits indicated the presence of an uncorrectable error, then there is no attempted generation of corrected data and there is no subsequent "ECC write request" generated. The "valid" bit as output by the "ECC/parity check" circuit 188 is not asserted, so the data is not valid to be received either by the "instruction code interface block" or the "data code interface block".

If the state is "11" and the source is other than "scrub" and if the "ECC/parity check" circuit 188 detects an uncorrectable error, then there is no attempted generation of corrected data and there is no subsequent "ECC write request" generated. All that happens is that the data is output from the SLMEM along with the error bits to flag the condition.

If the state is not "11" (still dirty) and the source is "scrub", then the "ECC/parity check" circuit 188 checks each parity bit against its associated byte of data. If there is no error detected using the parity bits, then the "ECC/party check" circuit 188 generates five ECC bits from the 128 bits of data (the parity checks sixteen bytes of data read out of SRAM 181). It then outputs 130 bits (the potentially corrected 128 bits of data, the "single correctible error" bit, and the "uncorrectable error" bit). It also outputs the "state" bits to indicate that a scrub writeback might be required. The ECC/parity check circuit 188 in this instance does not need the incoming parity bits to determine the outgoing parity bits or the outgoing five-bit ECC code. It generates those from the data alone.

If the state is not "11" (still dirty) and the source is not "scrub", then the "ECC/parity check" circuit 188 checks each parity bit against its associated byte of data. If there is no parity error detected, then the "ECC/party check" circuit 188 generates the five ECC bits from the 128 bits of data. It then outputs 130 bits (the 128 bits of data, the "single correctible error" bit asserted only if the state is "01" or "10", and the "uncorrectable error" bit deasserted). The data is output from the SLMEM along with the "single correctible error" bit cleared, and with the "uncorrectable error" bit cleared.

If the state is not "11" (indicating the line is still dirty) and the source is not "scrub" and the parity bits do not check out, then the "ECC/parity check" circuit 188 has detected an uncorrectable error, and there is no attempted generation of corrected data, and there is no "ECC write request" generated. All that happens is that the data is output from the SLMEM along with the error bits set to flag the uncorrectable error condition.

If the state bits are "00" (indicating the line is still dirty) and the source is "scrub" and the parity bits do not check out, then the "ECC/parity check" circuit 188 has detected an uncorrectable error, and there is no attempted generation of corrected data, and there is no "ECC write request" generated. Because the request being serviced derived from the scrub circuit, the valid bit is not set so that the data will not be supplied from the SLMEM to either the "instruction code interface block" or to the "data code interface block".

If there was a scrub read request and in response there was data output from SRAM 181, then the "generate write request for ECC data" circuit 187 may generate an "ECC write request" to write a correct complete 151-bit word (128 bits of correct data, and 16 correct parity bits, and 5 correct ECC bits, and two "11" state bits) into the SRAM at the address associated with the line of data. Both SRAM 181 and the ECC/parity check circuit 188 include pipeline registers to carry the address along with the associated data and other information so that the address will be available on the output of the "ECC/parity check" circuit 188 along with the data read out of SRAM 181. The "generate write request for ECC data" circuit 187 monitors the information coming out of the "ECC/parity check" circuit 188. If the source indicator indicates the data is being output as a result of a scrub read request and if the state bits are not "11" (indicating it is a line of dirty data), or if the "single correctible error" bit is set, then the "generate write request for ECC data" circuit 187 generates an "ECC write request". To generate the ECC write request, the circuit 187 considers the incoming 128 bits of data as being correct (because that data came from the ECC/parity check circuit 188 which would have corrected it if it were wrong). From that data, the circuit 187 generates and outputs sixteen correct parity bits and five correct ECC bits. The "state" bits for the "ECC write request" are set to "11". This all gets written as one entirely correct 151-bit word into SRAM 181 at the associated address. This ensures that the data contains all correct data and parity bit and ECC values, and that the word is not still flagged by its state bits as "dirty". When the ECC write request is being generated as a result of a scrub read request, the source bit as output by the "ECC/parity check" circuit 188 indicates the scrub circuit as the source of the request, so the data of the scrub read is not forwarded out of SLMEM 50 either to the "instruction code interface block" or to the "data code interface block".

In this scheme there is a time when a word is "dirty" and when its contents in SRAM 181 are not protected by an ECC value, but rather are only protected by parity bits. This amount of time is, however, very small and only a very small number of dirty words exist at a given time so the overall reliability of the data storage afforded by SLMEM 50 is very close to the desired SECDED.

FIG. 18 is CDL hardware description language code that defines a part of the "ECC/parity check" circuit 188. There are eight sections of code. Each section defines circuitry that receives and considers one bit of each of the sixteen bytes of the incoming data. Together the eight defined circuits generate the "Sgtr" (signature) value on twenty-one conductors.

Sixteen of the conductors carry the sixteen parity bits (one for each byte of data). Five of the conductors carry the five ECC bits.

FIG. 19 is CDL hardware description language code that defines another part of the "ECC/parity check" circuit 188. The circuit being defined receives the five-bit ECC value as output by the circuit defined by the code of FIG. 18. The circuit also receives the 5-bit ECC value that is being output by the SRAM 181. The circuit compares the two 5-bit ECC values, and from that determines if there is no error detected, a single correctible error detected, or an uncorrectable error detected. If there is a single correctible error detected, then the circuit generates the correct 128-bit data value. The circuit outputs the 128-bit data value (which may be the corrected value if the single correctible error condition was encountered), the sixteen parity bits, and the 5-bit ECC value.

Figure 20:
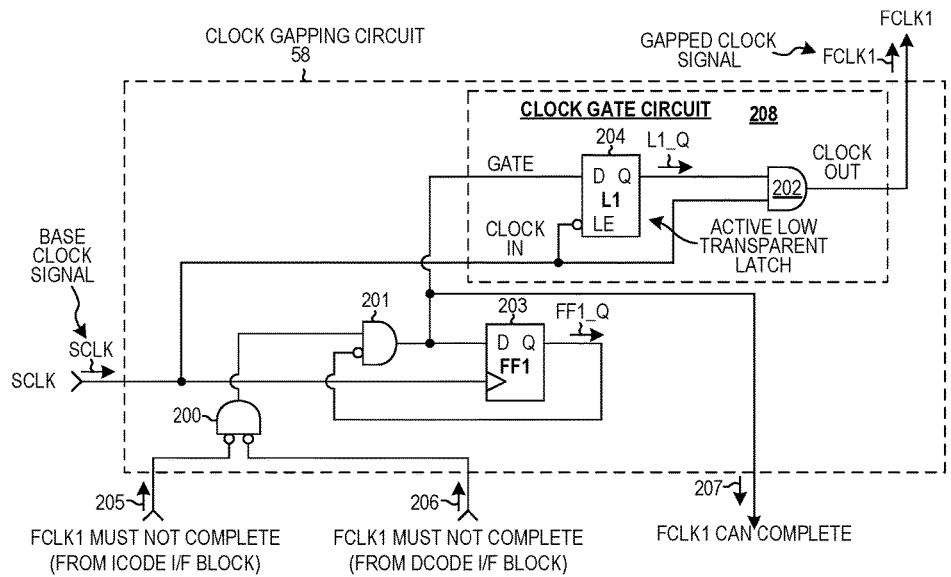
FIG. 20 is a circuit diagram of one example of a clock gapping circuit in the multiprocessor system of FIG. 3.

FIG. 20 is a more detailed diagram of one example of the clock gapping circuit 58 of FIG. 4. It is advantageous to have the processors 30-35 running at half the speed of the memory (the memory is clocked by SCLK) that is supplying instructions and data to the processors. If the memory were to operate at six times the speed of a processor, then one processor of the six would not have to stop to wait for an instruction. Access to the instruction memory could be time-multiplexed, and a processor would never have to wait for access to the instruction memory. Such a system would, however, be wasteful because the instruction memory is 128 bits wide, and an ARM M3 processor consumes on average about twenty bits of instruction per cycle. It is therefore better to run the six processors at half the speed of the instruction memory, and to use a prefetch mechanism on the instruction memory which will keep supplying each ARM processor with instructions at a rate of approximately one instruction per clock tick of the processor's clock signal (a clock frequency of $f_{SCLK}/2$). The instruction code interface block 46 can then prefetch from the instruction memory (SLMEM) an average of one prefetch per every six processor clock ticks which, given the processor is running at about half this speed, is about one instruction prefetch in every twelve system clock ticks. This means that instruction prefetching will consume about one twelfth of the access bandwidth to the instruction memory. The instruction prefetch mechanism will be in the process of loading about fifty percent of the time, and the data prefetching mechanism will be in the process of loading a slightly smaller percentage of the time. Accordingly, access bandwidth to the memory will be better utilized. Even if each of the six ARM processors 30-35 were to be clocked at half the speed of SCLK (half the speed of the instruction memory SLMEM), the six ARM processors 30-35 would together still be able to get more processing done than a single MicroEngine (ME) context could have accomplished. A MicroEngine (ME), such as one of the MEs explained in connection with FIG. 2, can be executing at most eight contexts. Each ME context is therefore running for about one eighth of the time. The clock gapping circuits 58-59, along with the 128-bit wide SLMEM 50 and the prefetching instruction and data interface circuits 46 and 48 are therefore provided in the multiprocessor system 29 of FIG. 3.

Clock gapping circuit 58 includes two AND gates 200 and 201, a flip-flop 203 and a clock gate circuit 208. In one example, the clock gate circuit 208 is a primitive in the standard cell library used to realize the integrated circuit. In the illustrative circuit, clock gate circuit 208 includes an active low transparent latch 204 and an AND gate 202 interconnected as shown. SCLK is the incoming base clock signal, which in this case is an 800 MHz square wave. FCLK1 is the gapped clock signal generated by the clock gapping circuit 58. The "FCLK1 must not complete" signal 205 (received from the instruction code interface block 46) and the "FCLK1 must not complete" signal 206 (from the data code interface block 48) are input control signals. The "FCLK1 can complete" signal 207 is an output signal that, as shown in FIG. 4, is supplied to the instruction code interface block 46, to the data code interface block 48, and to the system interface block 52.

The clock gapping circuit 58 generates clock signal FCLK1 for the first processor 30 such that: 1) FCLK1 can only be high for a maximum one half of a period of SCLK starting at the time SCLK goes high at the beginning of an SCLK period, 2) the maximum frequency of FCLK1 is one half of the frequency of SCLK, and 3) FCLK1 will not go high on a given rising edge of SCLK if either the "FCLK1 must not complete" signal 205 (received from the instruction code interface block 46) is high at the rising edge of SCLK or if the "FCLK1 must not complete" signal 206 (from the data code interface block 48) is high at the rising edge of SCLK. If either the "FCLK1 must not complete" signal 205 (received from the instruction code interface block 46) or the "FCLK1 must not complete" signal 206 (from the data code interface block 48) is high at the rising edge of SCLK, then the FCLK1 signal will be held low throughout the next complete period of SCLK.

Figure 21:
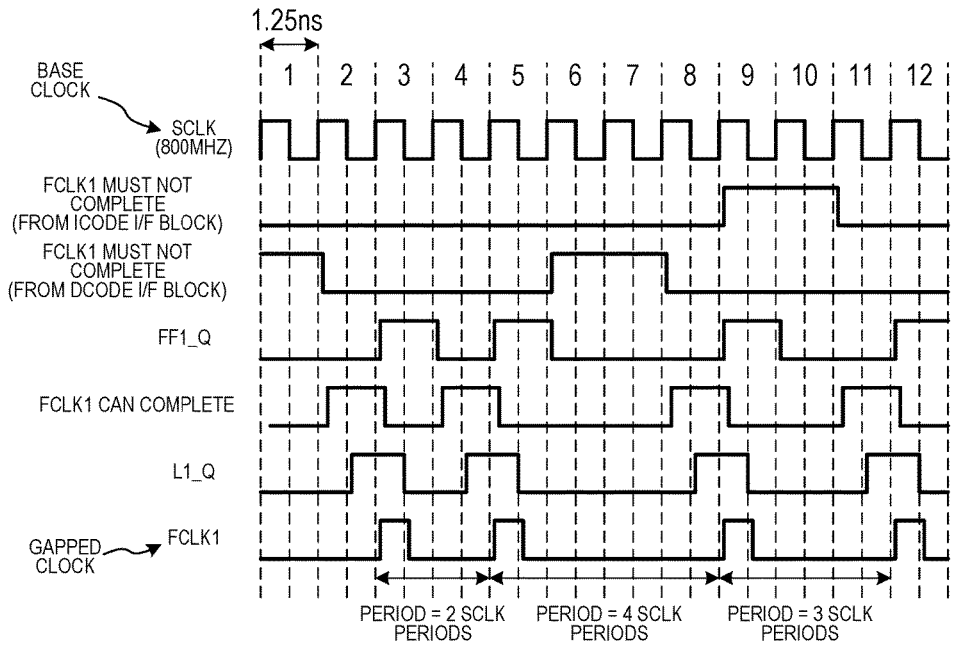
FIG. 21 is a waveform diagram that illustrates an operation of the clock gapping circuit of FIG. 20.

FIG. 21 is a waveform diagram that illustrates operation of the clock gapping circuit 58 of FIG. 20. As shown in the waveform diagram, the amount of time between a given rising edge of FCLK1 and the next rising edge of FCLK1 can be a duration as small as two SCLK periods, or a longer duration equal to three SCLK periods, or a still longer duration equal to another larger integer number of SCLK periods. In the case of a conventional wait state clocking system, the clock signal that would clock the processor would have a maximum frequency, but if the processor were to be delayed by the smallest allowable amount then the processor would be delayed by an amount of time equal to one period of this clock signal because a "wait state" is a period equal to one cycle of the clock signal that is clocking the processor. In the case of the novel clock gapping circuit 58, on the other hand, the clock signal FCLK1 that clocks the processor 30 has a maximum frequency of one half of the frequency of SCLK, but if the processor 30 is to be delayed the smallest permitted amount then the next rising edge of the processor's clock signal FCLK1 is delayed by an additional amount of time equal to one half of the minimum period of the clock signal FCLK1. This delaying of the next rising edge of the clock signal FCLK1 by an amount of time equal to an integer multiple of one half of the minimum period of FCLK1 (as opposed to the amount of time being equal to an integer multiple of one complete minimum period of FCLK1) is referred to here as "gapping" of the clock signal.

Figure 22:
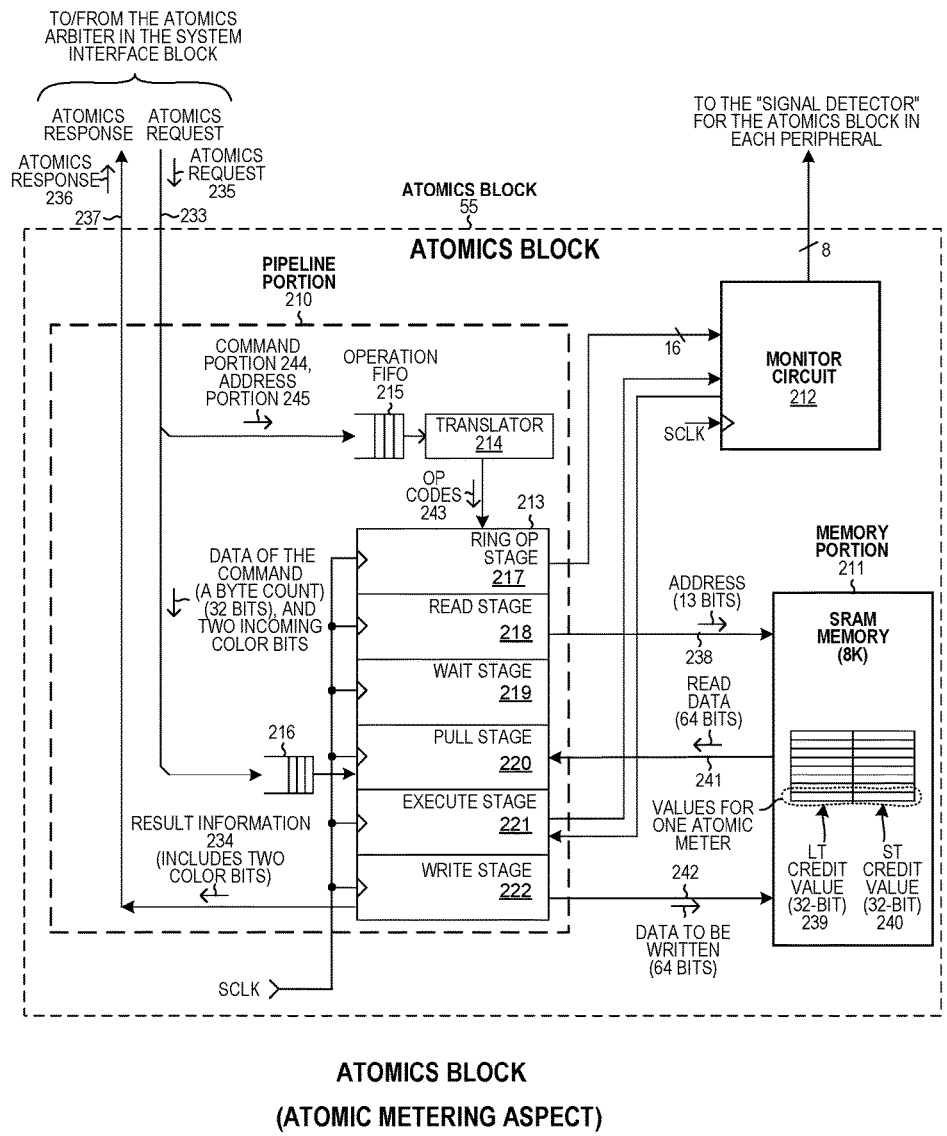
FIG. 22 is a diagram of the atomics block of the multiprocessor system of FIG. 3, where atomic metering operations is highlighted.

FIG. 22 is a more detailed diagram of the atomics block 55. Atomics block 55 includes a pipeline portion 210 and a memory portion 211 and a monitor circuit 212. The pipeline portion 210 in turn includes a pipeline 213, a translator circuit 214, and two FIFOs (First-In-First-Out memories) 215 and 216. Pipeline 213 includes pipeline stages 217-222.

Figure 23:
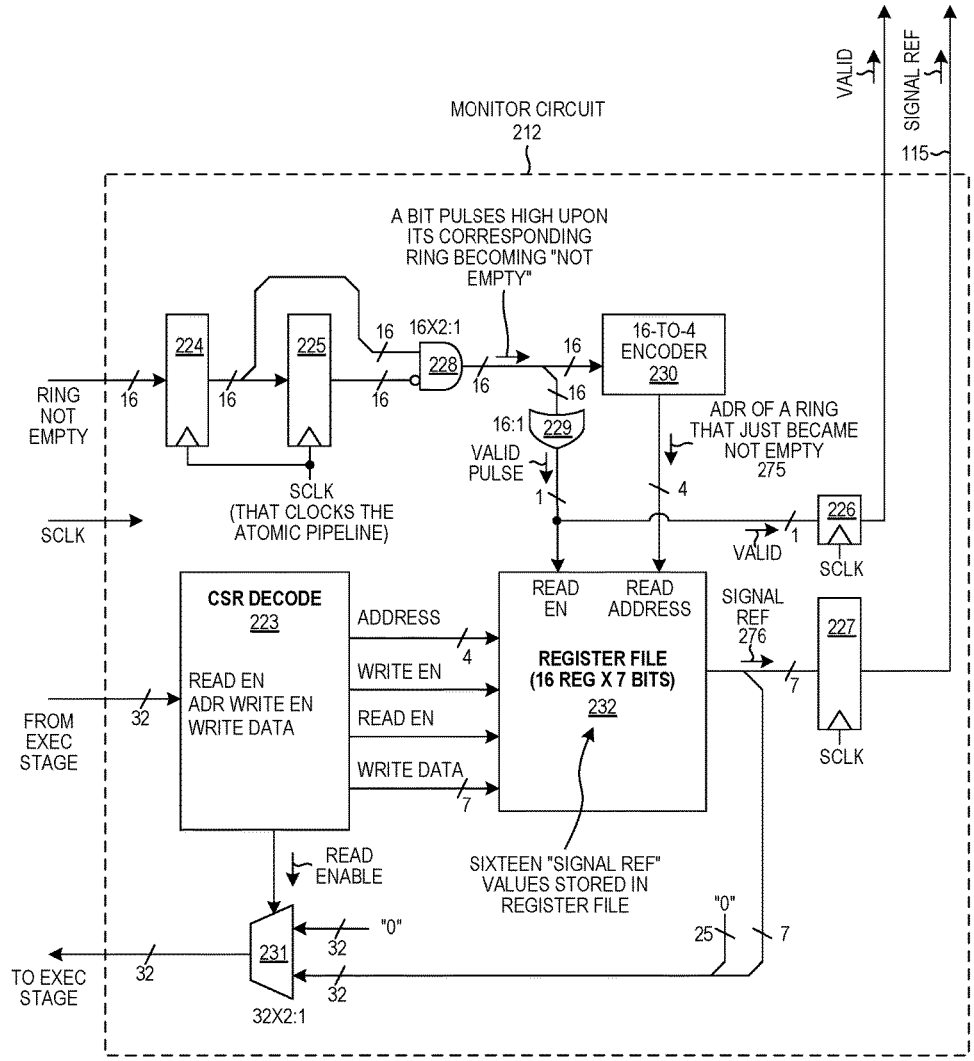
FIG. 23 is a diagram of the monitoring circuit in the atomics block of FIG. 22.

FIG. 23 is a more detailed diagram of the monitor circuit 212 of FIG. 22. Monitor circuit 212 includes a decoding and register access circuit (CSR decode) 223, registers 224-227, gates 228-229, an encoder 230, a multiplexer 231, and a register file 232.

As explained above in connection with the system interface block 52 and FIG. 6, a processor can cause the system interface block 52 to generate a request for the atomics block. This type of request is called an "atomics request". The atomics request includes the following information provided all at the same time in parallel on conductors 233: 1) a valid bit (1 bit), 2) a master type (read, write or command) (2 bits), 3) a processor number (4 bits), 4) four 32-bit portions of data (128 bits), data valid bits (4 bits, one for each 32-bit portion of the data), 5) an address parameters portion (64 bits), 6) a command portion (32 bits). Atomics request 235 is supplied by the system interface block 52 to the atomics block 55 via conductors 233. The atomics request 235 causes the atomics block 55 to perform a particular operation specified by the processor. The command and address portions of the atomics request 235 are converted into a set of opcodes by translator 214. There is one opcode for each stage of pipeline 213. Pipeline 213, in concert with memory portion 211, then carries out the operation as instructed by the opcodes. Result information 234 from the operation is then loaded into the data line 81 of the system interface block 52 so that the processor can then obtain the result information 234 by reading the result information out of the data line 81. The result information 234 is sent from the atomics block 55 to the system interface block 52 as part of an atomics response 236 via conductors 237.

Figure 24:
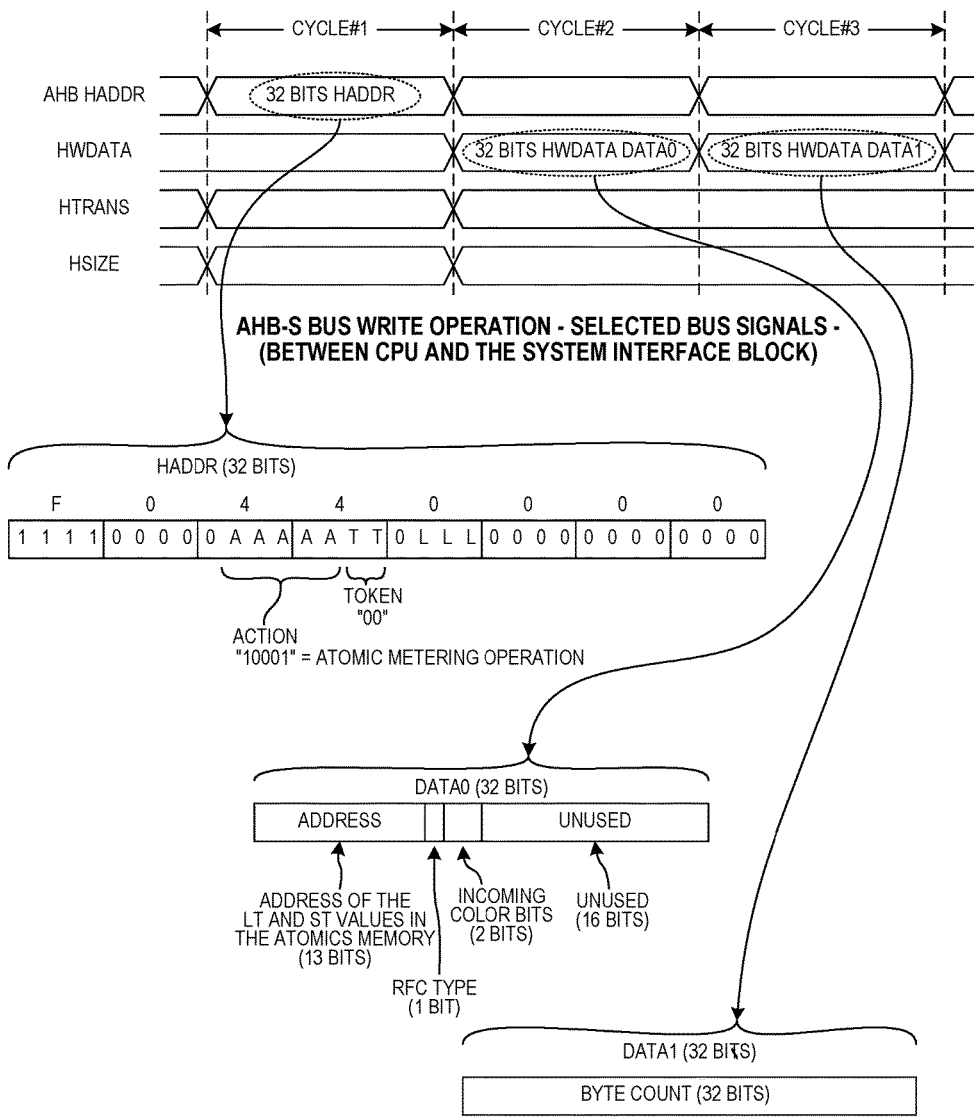
FIG. 24 is a diagram that illustrates how information from an AHB-S bus write operation is converted into a request for the atomics block that in turn causes the atomics block to perform an atomic metering command.

FIG. 24 is a diagram that illustrates how a processor can cause the atomics block 55 to perform one type of atomic operation, called an "atomic metering operation". The upper part of the diagram illustrates signals on the AHB-S bus 71 between the first processor 30 and the system interface block 52. Which particular address it is that the first processor writes to across the AHB-S bus (into the atomics address space from F000.0000 to FFFF.FFFF) determines the type of atomic operation that the atomics block 55 is commanded to perform, and therefore determines the command portion 244 of the ultimate atomic request. In the present case, the five action bits of the address value of the first AHB-S bus cycle are "10001", and this indicates that the desired atomics operation is the "atomic metering operation". The data portion data0 of the second cycle of the AHB-S bus write operation is a 32-bit value that includes: 1) a 13-bit address into memory portion 211, 2) an RFC type indicator bit, and 3) a 2-bit incoming color value. The address portion 245 of the atomic request is the 13-bit address that was communicated in the data portion of the second cycle of the AHB-S bus write operation. The address portion indicates the word in memory portion 211 where LT and ST values are found. The address field of the atomic request is a 32-bit field, but only thirteen bits are used (the thirteen bits are right aligned in the field). The data portion data1 of the third cycle of the AHB-S bus write operation is a 32-bit byte count value.

The system interface block 52 transforms these values from the AHB-S bus write operation into the atomics request 235 of the proper format, and sends the atomics request 235 to atomics block 55 via conductors 233. The command portion 244 and the address portion 245 of the atomic request pass through FIFO 215 and to translator 214. Translator 214, from the command and address portions, generates a set of opcodes 243. There is one opcode for each stage of the pipeline 213. These opcodes are supplied to the various stages of the pipeline. The byte count value and the two color indicator bits portions of the atomic request 235 pass through FIFO 216 and are supplied at the correct time to the pull stage 220 of the pipeline 213. The ring op stage 217 performs no operations in this atomic metering command. The read stage 218, in response to its opcode, supplies the address of address portion 245 to memory portion 211 via conductors 238 into order to read one word out of memory portion 211. This word contains the 32-bit LT credit value 239 and the 32-bit ST credit value 240. These two values are returned via conductors 241 to the pull stage 220. Memory portion 211 requires two SCLK cycles to perform the read and to perform an ECC on the output data, so wait stage 219 is provided in the pipeline so that other stages in the pipeline can be kept busy while the memory portion 211 is reading and returning data. When the LT and ST credit values have been supplied by the memory portion 211 to the pipeline 213, the execute stage 221 subtracts the byte count value from the LT credit value 239, thereby determining a TC indictor value. If the result of the subtraction is greater than zero, then the TC indicator value is true, otherwise the TC indicator value is false. The execute stage 221 subtracts the byte count value from the ST credit value 240, thereby determining a TP indictor value. If the result of the subtraction is greater than zero, then the TP indicator value is true, otherwise the TP indicator value is false. The execute stage, based on the TC and TP indicator values and the two color indicator bits as inputs, determines how the LT and ST values should be decremented, if one or both of the indicator values should be changed, as well as an output result color value.

FIG. 25 is a table that sets forth, for each combination of TC indictor, TP indicator, and incoming color value, what the 2-bit output result color value should be as well as how the LT and ST values should be changed. The write stage 222 then writes the updated LT and ST values into the memory via conductors 242 at the address indicated by the original address portion 245. The write stage 22 also outputs the 2-bit output result color value as part of result information 234 via conductors 237 to the system interface block 52. The result information 234 is part of the atomics response 236 to the original atomics request 235. If the processor then performs an AHB-S read across bus 71 from the same address in the atomics address space (the same address of address portion 245 that caused the atomics block to perform the atomic metering operation), then the processor will be supplied the result information 234 from the data line 81 (see FIG. 6). In some atomic operations performed by the atomics block 55, the monitor circuit 212 is not used. The atomic metering operation described above is an example of one such operation.

Figure 26:
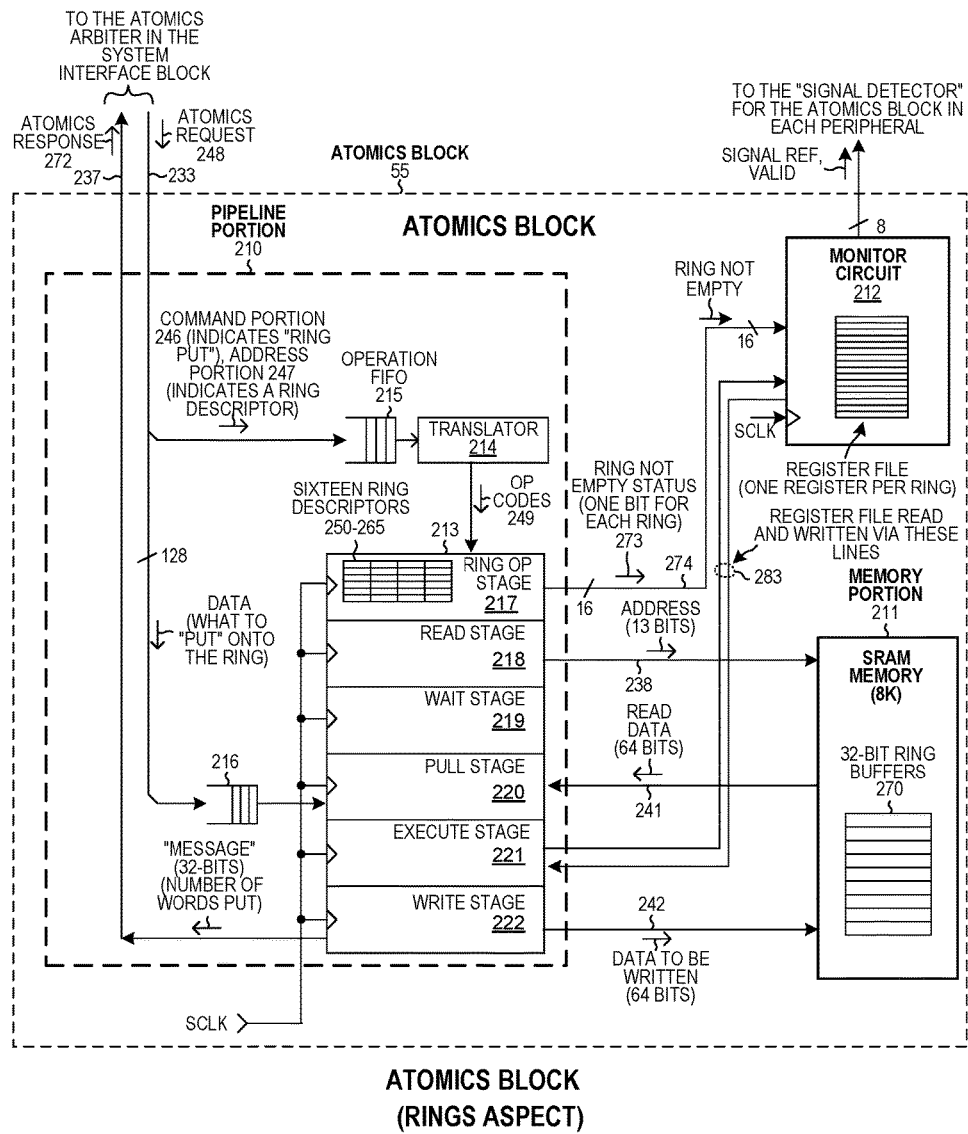
FIG. 26 is diagram of the atomics block of the multiprocessor system of FIG. 3, where "put" in a ring operation is highlighted.

FIG. 26 is a diagram that illustrates how the atomics block 55 carries out a ring "put" operation (also called a "put into ring" operation). A processor causes the ring put operation to be performed by the atomics block 55 by performing an AHB-S bus write operation to another address in the atomics address space (from F000.0000 to FFFF.FFFF). The address portion of the first cycle of the AHB-S bus write operation is a 32-bit value that includes: 1) a command portion 246 that indicates that the desired atomics operation to be performed is a ring "put" operation, and 2) an address portion 247. The address portion 247 is an address that points to a ring descriptor for a particular ring. In this way the address portion is also a ring number. The data portion of the second cycle of the AHB-S bus write operation is a 32-bit data value to be "put" onto the designated ring. The system interface block 52 fashions this information into an atomics request 248. Atomics request 248 is supplied to the atomics block 55 via conductors 233. The command portion 246 of the atomic request and the address portion 247 of the atomics request pass through FIFO 215 and to translator 214. The data to be "put" onto the ring passes through FIFO 216. From the command portion 246 and the address portion 247, translator 214 generates a set of opcodes 249. There is one opcode for each stage of the pipeline 213. The ring op stage 217 maintains a set of sixteen ring descriptors 250-265. There is one ring descriptor for each one of sixteen corresponding rings that the atomics block 55 manages. The address portion 247 is an address that identifies the ring descriptor for the ring onto which the data value is to be "put".

Figure 27:
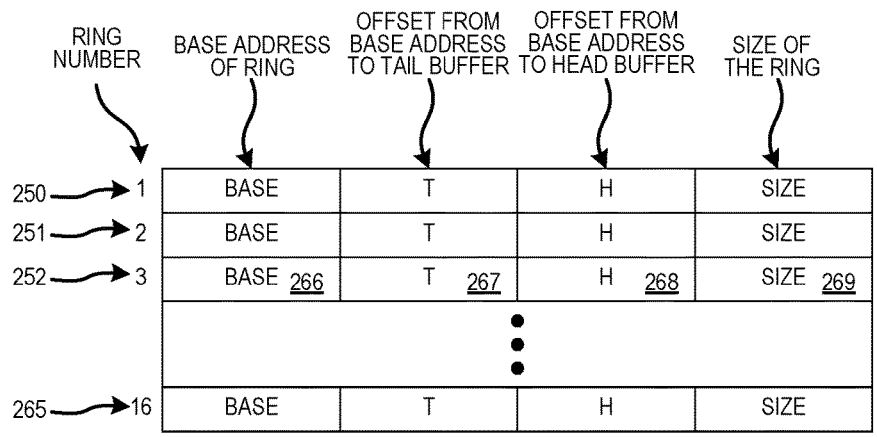
FIG. 27 is a diagram illustrating ring descriptors maintained by the ring op stage of the pipeline of the atomics block of FIG. 26.

FIG. 27 is a diagram of the set of sixteen ring descriptors 250-265 as they are stored and maintained in the ring op stage 217. Each ring descriptor includes the same four values. For example, the ring descriptor 252 for ring 271 (ring number 3) includes: 1) a base address value 266 that indicates a base address of the buffers used by the ring, 2) an offset value 267 that indicates an offset from the base address to where the tail buffer is found, 3) an offset value 268 from the base address to where the head buffer is found, and 4) a size value 269 that indicates the size of the ring. The size value 269 is a size in buffers. This is the number of buffers that can be occupied by the ring. Memory portion 211 maintains and stores a plurality of 32-bit ring buffers. The buffers of a given ring are contiguous buffers in the memory of the memory portion 211.

Figure 28:
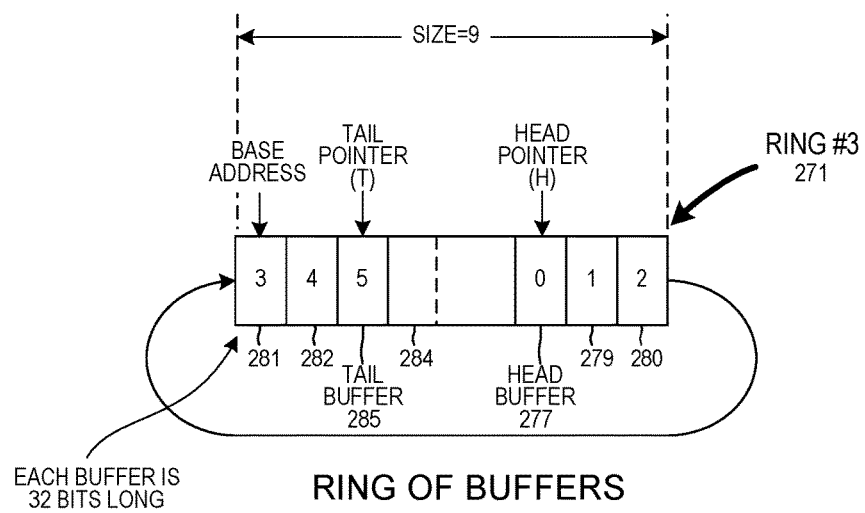
FIG. 28 is a diagram that illustrates a ring of buffers maintained by the atomics block of FIG. 26.

FIG. 28 is an illustration of ring 271. This ring is "ring number 3". One of the buffers of the ring is the current head buffer 277. Another buffer of the ring is the current tail buffer 285. Buffers 277, 279, 280, 281, 282 and 285 contain data. The ring descriptor for this ring is ring descriptor 252 of FIG. 27. The ring 271 has a size of nine ring buffers, so the size value 269 of the ring descriptor is nine. The nine buffers occupy contiguous memory locations in memory portion 211. The head buffer 277 of the ring in memory portion 211 is addressed (is pointed to) by the combination of the base address value 266 and offset value 268. The tail buffer in memory portion 211 is addressed (is pointed to) by the combination of the base address value 266 and the offset value 267. Each buffer is thirty-two bits long.

The ring op stage 217 uses the address portion of the incoming atomics request to identify the ring descriptor 252 for the ring. In this example, there is one 32-bit amount of data to be "put" onto the ring, so the tail pointer (T) will be moved to point to buffer 284. In this way, one additional 32-bit buffer will be added onto the tail of the ring. The tail pointer offset value 267 will be updated so that the offset to the tail pointer (T) will now point to this buffer 284. The read stage 218 supplies the address of the buffer 284 to the memory portion 211 via conductors. The SRAM of memory portion 211 contains 64-bit words, so only half of one 64-bit word will be written with new data in a ring "put" operation. The entire 64-bit word is therefore read out of memory portion 211 and is supplied back to the pull stage 220 of the pipeline via conductors 241. The write stage 222 then outputs the entire 64-bit word back to the memory portion 211 via conductors 242 with the appropriate 32-bit portion of the word replaced with the new data portion that is being "put" onto the ring. At the end of the "put" operation, the data value is written into the buffer 284 (the new tail buffer) in memory portion 211. Also, the ring descriptor 252 for the ring 271 as maintained and stored by the ring op stage 217 has been updated. The write stage 222 also outputs a 32-bit result value or "message" onto conductors 237. This result value or "message" indicates the ring number and the number of words that were actually "put" onto the ring. This result value is made a part of an atomics response 272. The atomics response 272 is communicated via conductors 237 to the system interface block 52 and is loaded into the data line 81. The processor that originally caused the atomics block to perform the ring put operation can then perform a read of the same address via its AHB-S bus, and obtain the result value out of the data line 81.

A ring can be full. If all nine buffers of FIG. 28 were occupied, and the processor were then to attempt to "put" data onto the ring, then an error condition would occur. Nothing would be written into the memory portion 211 and the ring descriptor for ring 271 would not be changed. The number of words that are indicated to have been "put" onto the ring by the result value, however, would be zero. If the processor were then to read the data line 81, the processor could determine from the zero "number of words" written value that the ring "put" operation was not successful.

A ring can also be empty. The atomics block can be made to perform a ring "get" command in much the same way that it can be made to perform the ring" put" command described above. In the case of a ring "get" command, the data value stored in the head buffer 277 is read out of memory portion 211 and is returned by the pipeline 213 as the result value, and the ring descriptor 252 is updated so that the buffer 277 that was previously the head buffer is not used and so that the head pointer (H) 268 now points to the next buffer 279 in the ring. If a processor were to attempt to "get" data from a ring that is empty, then an error condition would occur. The number of words that were retrieved from the ring would be zero, and this "number of words" value would be loaded into the data line 81. The processor could then read the data line 81, and determine from the zero "number of words" retrieved value that the get was not successful.

The ring op stage 217 also uses the ring descriptor values to determine whether each ring is empty. The ring op stage outputs a 16-bit "ring not empty" value 273 onto conductors 274. There is one bit in the sixteen bit "ring not empty" value 273 for each corresponding one of the sixteen rings. The 16-bit "ring not empty" value is supplied to monitor circuit 212. Encoder 230 of monitor circuit 212 (see FIG. 23) outputs a 4-bit value 275 that indicates the number of the ring that just became "not empty". Ring operations are performed one at a time, so there can only one ring that "just became" not empty. The 4-bit value 275 that identifies this ring is used to lookup a corresponding "signal ref" value 276 that has been preloaded into the register file 232. The "signal ref" value 276 is then output from the register file 232, and passes through register 227, and is communicated via conductors 115 to the peripheral circuits 56 and 57 as the "atomics signal delivery". This signal delivery value contains a 4-bit value that identifies a processor and also contains an indication of the ring that just became "not empty". See the 4-bit CPU# in FIG. 11. The 4-bit CPU# value of any of the six processors can made part of the preloaded signal ref value. As described above in connection with FIG. 11, there is one peripheral circuit for each of the six processors. The peripheral circuit for a particular processor only responds to signal delivery values that contain the 4-bit CPU# of its corresponding processor. In this case, the processor to be alerted is not the processor that put a data value onto the ring, but rather is another processor (for example, the second processor 31) that is to be alerted to the fact that the data value has been put onto the ring. Peripheral circuit 57 is the peripheral circuit for the second processor 31. Peripheral circuit 57 therefore receives the signal delivery value from the atomic block, determines that the CPU# of the signal delivery value matches the CPU# of the second processor 31, and if the peripheral circuit 57 has been set up not to mask out such an event, then the peripheral circuit 57 outputs an alert signal to the second processor 31 via conductor 278. As explained in connection with FIG. 11, the alerted processor can be programmed to respond to the alert by reading the status register of its peripheral circuit via its PPB bus, thereby obtaining the status value. From the status value the processor can determine that a particular ring has just become "not empty".

For additional background information on ring put and ring get operations, and on circuits that manage such put and get ring operations for processors, see: U.S. Pat. No. 9,069,602, entitled "Transactional Memory That Supports Put And Get Ring Commands", by Gavin J. Stark, issued Jun. 30, 2015 (the entire subject matter of this application is incorporated herein by reference).

The hardware rings mechanism of the atomics block 55 is a general purpose inter-processor communication resource usable by all the six processors to communicate tasks and/or data between processors. For example, a first processor 30 and a second processor 31 may be programmed to perform different parts of an overall job. The second processor may not have any tasks to perform at a given time, and may therefore execute a WFE instruction and be operating in its low power sleep mode. Meanwhile, the first processor is operating in its normal mode and is performing its part of the overall job. When the first processor is done and wishes to hand the data and task over to the second processor for further processing, the first processor "puts" information onto a ring. The monitor circuit has been setup to output a signal ref value that contains the 4-bit CPU# of the second processor. When the first processor "puts" the information onto the ring, the ring is detected by the monitor circuit 212 to have become "not empty". As a result, the preloaded signal ref value stored in the monitor circuit 212 is output and is supplied to all of the peripheral circuits in the form of a signal delivery value. The peripheral circuit 57 for the second processor 31 detects that the 4-bit CPU# of the signal ref value matches the CPU# of the second processor, so the peripheral circuit 57 responds and outputs an alert signal which is received onto the RXEV terminal of the second processor 57. This alerts signal causes the second processor to wake up (to exit sleep mode operation). The second processor comes out of the sleep mode and reads the status register 131 of the second processor's peripheral circuit 57, and determines from the status value that there is information on a particular ring for the second processor to handle. The second processor then causes the atomics block to do a rings "get" operation from that ring. In this way the second processor obtains the information that the first processor had "put" onto the ring. The second processor can then operate on the data and do its part of the overall task. Advantageously, the second processor is in the low power sleep mode while it is waiting for the first processor to do the first processor's portion of the overall task.

A processor can preload signal ref values into the register file 232 of the monitor circuit 212 using another type of atomics operation. In this other type of atomics operation, a processor can perform an AHB-S bus write operation to write a data value to another address in the atomics block address space, but this AHB-S bus write operation will cause the pipeline 213 to write the data value of the AHB-S bus write operation into an identified register in the register file 232 in the monitor circuit 212. The pipeline 213 performs this write via conductors 283. Using this mechanism, a processor can both read and write each individual register of the register file 232. A processor can use this type of atomic operation to preload the appropriate register with the signal ref value it wants the monitor circuit to output upon the ring becoming "not empty" so that when the monitor circuit detects the ring becoming "not empty" the monitor circuit will output this preloaded signal ref value (in the form of a so-called "signal delivery value") to the peripheral circuits.

Figure 29:
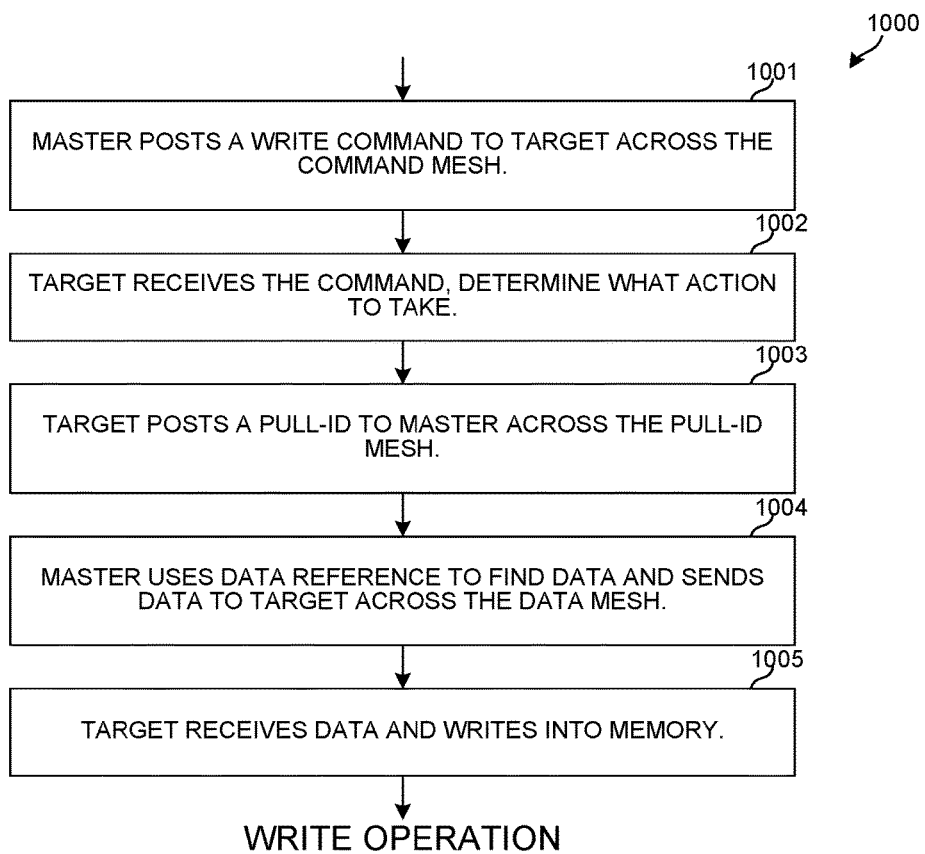
FIG. 29 is a flowchart of a write operation method that might occur across the CPP data bus.

Operation of the CPP bus: FIG. 29 is a flowchart of a write operation method 1000 that might occur across the configurable mesh CPP data bus. In a first step (step 1001), certain functional circuitry in one of the islands uses its data bus interface to output a bus transaction value onto the configurable mesh CPP data bus. This functional circuitry is referred to as the "master" of the write operation. The format of the bus transaction value is as set forth in FIG. 30. A bus transaction value 1006 includes a metadata portion 1007 and a payload portion 1008 as shown. The metadata portion 1007 includes a final destination value 1009 and a valid bit 1010.

The bus transaction value in this case is a write command to write data into functional circuitry in another island. The format of the write command bus transaction value is as set forth in FIGS. 30 and 31. The functional circuitry that receives the bus transaction value and the data to be written is referred to as the "target" of the write operation. The write command is said to be "posted" by the master circuit onto the command mesh. As indicated in FIG. 30, the write command includes a metadata portion and a payload portion. The metadata portion includes the 6-bit final destination value. This final destination value identifies an island by number, where the island identified is the final destination of the bus transaction value. The final destination value is used by the various crossbar switches of the command mesh to route the bus transaction value (i.e., the command) from the master circuit to the appropriate target circuit. All bus transaction values on the data bus that originate from the same island that have the same final destination value will traverse through the configurable mesh data bus along the same one path all the way to the indicated final destination island.

A final destination island may have more than one potential target circuit. The 4-bit target field of payload portion indicates which one of these targets in the destination island it is that is the target of the command. The 5-bit action field of the payload portion indicates that the command is a write. The 14-bit data reference field is a reference usable by the master circuit to determine where in the master the data is to be found. The address field indicates an address in the target where the data is to be written. The length field indicates the amount of data.

In a next step (step 1002) in the method of FIG. 29, the target circuit receives the write command from the command mesh and examines the payload portion of the write command. From the action field the target circuit determines that it is to perform a write action. To carry out this action, the target circuit writes (i.e., posts) a bus transaction value (step 1003) called a pull-id onto the pull-id mesh. The pull-id is also of the format indicated in FIG. 30. The payload portion of the pull-id is of the format set forth in FIG. 32. The final destination field of the metadata portion of the pull-id indicates the island where the master circuit is located. The target port field identifies which sub-circuit target it is within the target's island that is the target circuit of the command. The pull-id is communicated through the pull-id mesh back to the master circuit.

The master circuit receives the pull-id from the pull-id mesh and uses the content of the data reference field of the pull-id to find the data. In the overall write operation, the master circuit knows the data it is trying to write into the target circuit. The data reference value that is returned with the pull-id is used by the master circuit as a flag to match the returning pull-id with the write operation the master circuit had previously initiated.

The master circuit responds by sending (step 1004) the identified data to the target across one of the data meshes data0 or data1 as a "pull" data bus transaction value. The term "pull" means that the data of the operation passes from the master to the target. The term "push" means that the data of the operation passes from the target to the master. The format of the "pull" data bus transaction value sent in this sending of data is also as indicated in FIG. 30. The format of the payload portion in the case of the payload being pull data is as set forth in FIG. 34. The first bit of the payload portion is asserted. This bit being a digital high indicates that the transaction is a data pull as opposed to a data push. The target circuit then receives (step 1005) the data pull bus transaction value across the data1 or data0 mesh. The target circuit writes the content of the data field (the data field of FIG. 34) of the pull data payload portion into target memory at the appropriate location indicated by the address field of the original write command.

Figure 36:
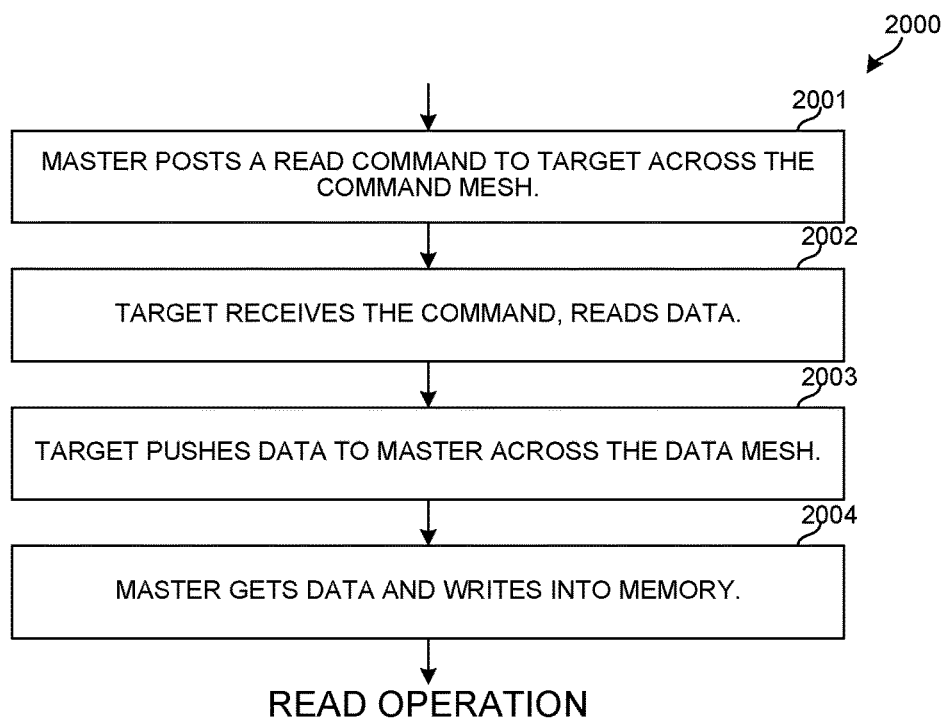
FIG. 36 is a flowchart of a read operation method that might occur across the configurable mesh CPP data bus.

FIG. 36 is a flowchart of a read operation method 2000 that might occur across the configurable mesh CPP data bus. In a first step (step 2001), a master circuit in one of the islands uses its data bus interface to output (to "post") a bus transaction value onto the command mesh bus of the configurable mesh CPP data bus. In this case, the bus transaction value is a read command to read data from a target circuit. The format of the read command is as set forth in FIGS. 30 and 31. The read command includes a metadata portion and a payload portion. The metadata portion includes the 6-bit final destination value that indicates the island where the target is located. The action field of the payload portion of the read command indicates that the command is a read. The 14-bit data reference field is usable by the master circuit as a flag to associated returned data with the original read operation the master circuit previously initiated. The address field in the payload portion indicates an address in the target where the data is to be obtained. The length field indicates the amount of data.

The target receives the read command (step 2002) and examines the payload portion of the command. From the action field of the command payload portion the target circuit determines that it is to perform a read action. To carry out this action, the target circuit uses the address field and the length field to obtain the data requested. The target then pushes (step 2003) the obtained data back to the master circuit across data mesh data1 or data0. To push the data, the target circuit outputs a push bus transaction value onto the data1 or data0 mesh. FIG. 35 sets forth the format of the payload portion of this push bus transaction value. The first bit of the payload portion indicates that the bus transaction value is for a data push, as opposed to a data pull. The master circuit receives the bus transaction value of the data push (step 2004) from the data mesh bus. The master circuit then uses the data reference field of the push bus transaction value to associate the incoming data with the original read command, and from the original read command determines where the pushed data (data in the date field of the push bus transaction value) should be written into the master circuit. The master circuit then writes the content of the data field of the data field into the master's memory at the appropriate location.

Layout and Fabrication Variations: In the description above, the multiprocessor system 29 of FIG. 3 is laid out so that it will have a rectangular shape when it is fabricated as part of the network flow processor integrated circuit die 1 of FIG. 1. The rectangularly-laid-out multiprocessor system 29 of FIG. 3 is a drop-in replacement for the rectangular area 27 of a MicroEngine (ME) island (such as is illustrated in FIG. 2). This is but one layout variation. In another layout variation, the circuitry of the multiprocessor system 29 of FIG. 3 is not laid out to be rigidly confined to a rectangular area of the ME island such that all of the circuitry of the multiprocessor system 29 is disposed within that rectangular area and such that no other circuit of the ME island is disposed within that rectangular area. Rather, the logical function of overall ME island is described in a hardware description language (for example, CDL or Verilog or VHDL). A commercially available hardware synthesis program (for example, Synopsis Design Compiler) is then employed to generate a netlist and digital logic circuitry from the hardware description language. When the ME island is synthesized and then laid out and fabricated in this way, the circuitry of the multiprocessor system 29 may not be confined to any rectangular integrated circuit area that is separate from the remainder of the circuitry of the ME island, but rather there will be overlap between the multiprocessor system circuitry and the circuitry of other parts of the ME island. This is acceptable so long as the parts of the resulting multiprocessor system operate properly and synchronously with respect to SCLK and FCLK, and so long as they meet SCLK and FCLK timing requirements. The circuitry of the multiprocessor system 29 will be generally localized as a result of having to meet these timing requirements, but the circuitry of the multiprocessor system 29 will be to some extent intermixed with other circuitry of the ME island from a spatial layout perspective. The circuitry of the multiprocessor system can be realized as a hard core, as a soft core, or intermixed with other parts of the ME island. In one embodiment, the multiprocessor system 29 is made available by one company as a predesigned block of circuitry that is then incorporated into another company's integrated circuit design as a general purpose block. Such a predesigned block of circuitry is sometimes referred to in the art as a block of "IP". A hardware designer who incorporates the predesigned block of IP into a larger integrated circuit design need not understand or be aware of the internal structure and operation of the pre-designed block, but rather interfaces to the pre-designed block in accordance with an interface description supplied by the original designer of the predesigned block. The multiprocessor system 29 is provided as such a "block of IP". The posted transaction bus interface of the block of IP need not be for coupling the block of IP to a CPP bus, but rather can be for coupling the block of IP to another type of posted transaction bus.

ASCII Text File Listing Appendix: The list below indicates where, for each of the listed blocks in the diagrams, corresponding structure is defined in the CDL hardware description language files in the ASCII text file listing appendix: afpc_group_cdl.txt—whole of FIG. 4; afpc_group_cdl.txt (lines 72-79, 160-167)—Clock Gapping Circuit 58 of FIG. 4; afpc_group_cdl.txt (lines 72-79, 160-167)—Clock Gapping Circuit 59 of FIG. 4; afpc_core_apb_cdl.txt—Peripheral Circuit 56 of FIG. 4; afpc_core_apb_cdl.txt—Peripheral Circuit 57 of FIG. 4; afpc_icode_cdl.txt—Instruction Code Interface Block 46 of FIG. 4; afpc_dcode_cdl.txt—Data Code Interface Block 48 of FIG. 4; afpc_scode_cdl.txt—System Interface Block 52 of FIG. 4; afpc_lmem_cdl.txt—Shared Local Memory Block 50 of FIG. 4—(includes afpc_lmem_ecc_generate_cdl.txt, afpc_lmem_ecc_syndrome_check_cdl.txt); afpc_atomic_cdl.txt—Atomics Block 55 of FIG. 4—(includes afpc_atomic_master_command_fifo_cdl.txt, afpc_atomic_master_hash_fifo_cdl.txt); afpc_cpp_cdl.txt—CPP Interface Block 44 of FIG. 4—(includes afpc_cpp_cmd_fifo_cdl.txt, afpc_cpp_master_cmd_fifo_cdl.txt, afpc_cpp_master_read_fifo_cdl.txt, afpc_cpp_pull_data_fifo_cdl.txt, afpc_cpp_pull_id_fifo_cdl.txt, afpc_cpp_push_data_fifo_cdl.txt); se_sram_srw_2048×39—Shared Memory 74 of FIG. 4 (no source—library component); afpc_icode_cdl.txt (lines 284-333)—Instruction Fetch Request Arbiter 155 of FIG. 12; afpc_icode_cdl.txt (lines 362-394)—Prefetch Lines Block 156 of FIG. 12; afpc_dcode_cdl.txt (lines 244-303)—Data Access Request Arbiter 168 of FIG. 15; afpc_dcode_cdl.txt (lines 304-257)—Prefetch Line and Write Buffer 169 of FIG. 15; afpc_lmem_cdl.txt (lines 468-563)—Write Requests Buffer 182 of FIG. 16; afpc_lmem_cdl.txt (lines 563-821)—Scrub Circuit 186 of FIG. 16; se_sram_srw_4096×36_bwe4/se_sram_srw_4096×10—Memory 181 of FIG. 16 (no source—library component); afpc_lmem_cdl.txt (lines 824-933)—Arbiters 183 and 184 of FIG. 16; afpc_lmem_cdl.txt (lines 743-782)—ECC Write Request Generator 187 of FIG. 16; afpc_atomic_cdl.txt (lines 757-1173)—Pipeline 213 of FIG. 22; afpc_atomic_sram_4096×64ecc_cdl.txt—Memory 211 of FIG. 22; afpc_core_apb_cdl.txt—Monitor Circuit 212 of FIG. 22. Parts of the CDL-described multiprocessor that are not included (library components) in the ASCII text files include: 1) se_sram_srw_2048×39 (2 k by 39 synchronous SRAM); 2) se_sram_srw_4096×36_bwe4 (4 k by 36 synchronous SRAM with 9-bit write-enables); 3) se_sram_srw_4096×10 (4 k by 10 synchronous SRAM); 4) ecc32_7_39_generate (Standard 7-bit ECC generation from 32 bits of data); 4) ecc32_7_39_correct (Standard 7-bit ECC correction from 39 bits of data+ECC); 5) generic_fifo (Standard generic synchronous FIFO).

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. An integrated circuit comprising a plurality of rectangular islands disposed in a two-dimensional array, wherein the rectangular islands are intercoupled by a posted transaction bus, wherein one of the rectangular islands comprises:
a first processor;
a second processor that executes the same instruction set that the first processor executes; and
an interface means for receiving addresses from the first processor via a first bus and for receiving addresses from the second processor via a second bus and for interfacing to the posted transaction bus, wherein neither the first bus nor the second bus is a posted transaction bus, wherein an address received by the interface means via the first bus is an address in shared address space shared by the first and second processors, wherein the interface means generates a posted transaction bus read command from the address received via the first bus and causes a posted transaction bus read transaction to occur using the generated posted transaction bus read command such that read data is obtained from the posted transaction bus and is then stored into a shared memory in the interface means at a memory location indicated by the first processor.

2. The integrated circuit of claim 1, wherein the read data is received from outside said one rectangular island and onto said one rectangular island via the posted transaction bus as a result of the posted transaction bus read transaction.

3. The integrated circuit of claim 1, wherein the address received by the interface means via the first bus is part of a write operation performed by the first processor using the first bus.

4. The integrated circuit of claim 1, wherein the interface means is for converting information of a write operation initiated by the first processor into the posted transaction bus read command.

5. The integrated circuit of claim 1, wherein the address received by the interface means via the first bus has a field, wherein a value of the field indicates a target on the posted transaction bus that will be the target of the posted transaction bus read transaction.

6. The integrated circuit of claim 1, wherein the address received by the interface means via the first bus has a field, and wherein a value of the field indicates an action of a plurality of selectable posted transaction bus actions.

7. The integrated circuit of claim 1, wherein the address received by the interface means via the first bus has a field, wherein a value of the field is an address of the memory location in the shared memory where the read data is stored.

8. The integrated circuit of claim 1, wherein the interface means includes a signal reference value in the posted transaction bus read command.

9. The integrated circuit of claim 1, wherein the interface means is also for receiving an address as part of a read operation across the first bus and for returning the read data from the memory location back to the first processor via the first bus in order to complete the read operation.

10. The integrated circuit of claim 1, wherein the interface means is also for detecting an occurrence on the posted transaction bus read transaction and for upon said detecting sending an alert signal to the first processor.

11. The integrated circuit of claim 1, wherein the interface means is also for detecting a completion of a posted transaction bus transaction, and for using a signal reference value in a posted transaction bus transaction value received from the posted transaction bus to identify a processor, and for sending an alert signal to the identified processor.

12. A method comprising:
(a) receiving a memory address from one of a plurality of processors onto an interface circuit, wherein each of the processors has an instruction code bus interface, a data code bus interface and a system code bus interface;
(b) outputting a read command from the interface circuit onto a posted transaction bus;
(c) receiving data from the posted transaction bus onto the interface circuit;
(d) causing the data to be stored into a memory in the interface circuit at the memory address of (a), wherein each of the processors of the plurality of processors can read from and write to an amount of shared memory space in the memory, and wherein the memory address is in the shared memory space; and
(e) sending an alert signal from the interface circuit to said one of the plurality of processors, wherein (a) through (e) are performed by the interface circuit.

13. The method of claim 12, wherein the processor stops executing instructions after the memory address is received in (a), and wherein the alert signal of (e) causes the processor to start executing instructions again.

14. The method of claim 12, wherein the processor stops fetching instructions after the memory address is received in (a), and wherein the alert signal of (e) causes the processor to start fetching instructions again.

15. The method of claim 12, wherein the memory address received in (a) is a part of a larger address value, wherein the larger address value includes a field, wherein a value of the field indicates a target on the posted transaction bus.

16. The method of claim 12, wherein the memory address received in (a) is received by the interface circuit as part of an Advanced High-performance Bus System Code (AHB-S) write operation initiated by the processor, wherein the AHB-S write operation is a write into the shared memory space in the memory in the interface circuit, and wherein the AHB-S write operation causes the interface circuit to initiate a read operation on the posted transaction bus.

17. An integrated circuit comprising a plurality of multi-processor systems, wherein the multiprocessor systems are intercoupled by a posted transaction bus, wherein one of the multiprocessor systems comprises:
 a first processor having an instruction code bus interface, a data code bus interface and a system code bus interface;
 a second processor having an instruction code bus interface, a data code bus interface and a system code bus interface, wherein the second processor executes the same instruction set that the first processor executes; and
 an interface means that is coupled to the first processor via a first system code bus and that is coupled to the second processor via a second system code bus, wherein neither the first system code bus nor the second system code bus is a posted transaction bus, wherein an address received by the interface means via the first system code bus as part of a write operation includes an address value, wherein the interface means uses the address to generate a posted transaction bus read command and causes a posted transaction bus read transaction to occur using the generated posted transaction bus read command such that read data is obtained from the posted transaction bus from outside the multiprocessor system and is then stored into a shared memory in the interface means at a memory location indicated by the address value.

18. The integrated circuit of claim 17, wherein the interface means is also for detecting completion of the posted transaction bus read transaction and in response for outputting an alert signal.

19. The integrated circuit of claim 17, wherein the first processor can read from the memory location in the shared memory by initiating a read operation on the first system code bus, and wherein the second processor can also read from the memory location in the shared memory by initiating a read operation on the second system code bus.

20. The integrated circuit of claim 16, wherein a transaction value on the posted transaction bus includes a signal reference value, and wherein the interface means is for using the signal reference value to determine to which processor an alert signal should be sent.

* * * * *